US009678580B2

(12) United States Patent
    Patel

(10) Patent No.: US 9,678,580 B2
(45) Date of Patent: Jun. 13, 2017

(54) HUMAN-TO-COMPUTER INTERFACES

(75) Inventor: Sanjay Patel, Thornton Heath (GB)

(73) Assignee: Keypoint Technologies (UK) Limted (GB)

( * ) Notice: Subject to any disclaimer, the term of this patent is extended or adjusted under 35 U.S.C. 154(b) by 1622 days.

(21) Appl. No.: 10/593,833

(22) PCT Filed: Mar. 23, 2005

(86) PCT No.: PCT/GB2005/001111
    § 371 (c)(1),
    (2), (4) Date: Sep. 22, 2006

(87) PCT Pub. No.: WO2005/093555
    PCT Pub. Date: Oct. 6, 2005

(65) Prior Publication Data
    US 2007/0216651 A1    Sep. 20, 2007

(30) Foreign Application Priority Data

Mar. 23, 2004    (GB) .................................. 0406451.5

(51) Int. Cl.
    *G06F 3/023*    (2006.01)
(52) U.S. Cl.
    CPC .................................. *G06F 3/0237* (2013.01)
(58) Field of Classification Search
    CPC .................................................... G06F 3/0237
    (Continued)

(56) References Cited

U.S. PATENT DOCUMENTS 3,226,712 A    12/1965 Lens et al.
3,557,927 A    1/1971 Wright ........................... 400/94
    (Continued)

FOREIGN PATENT DOCUMENTS

AU    2005225796    3/2005
AU    2004200059    7/2005
    (Continued)

OTHER PUBLICATIONS

Hobday, "A keyboard to increase productivity and reduce postural stress," Paper presented at: The Annual International Industrial Ergonomics and Safety Conference, Jun. 8-10, 1988, New 0rleans. *Trends in Ergonomics/Human Factors* V 321-330 http://www.maltron.com/recognitia/script.html.
(Continued)

*Primary Examiner* — Gene W Lee
(74) *Attorney, Agent, or Firm* — Brinks Gilson & Lione

(57) ABSTRACT

The invention relates to an improved keyboard and keyboard driver for facilitating a reduction in the number of key presses required to create or delete a given data string (i.e. mnemonics, abbreviations, words, sentences, paragraphs etc.). The keyboard includes an array of keys having multi-character indicia and an interface system comprising data storage means; data processing means; and data display means, wherein the data processing means reduces key presses by filtering data stored within the data storage means by initial character, as determined by the character or characters ascribed to a data input key initially pressed by a user, and prioritizing the filtered data in real-time according to user-configurable prioritization parameters (using qualitative and/or quantitative information relating to each data string stored within the storage means). The invention also provides improved calculator functionality and function-lock keys. Taken together, the keyboard and keyboard driver of the invention (which may be implemented in isolation or together) promotes ease of use, reduced user-interactivity, elevated efficiency and thus enhanced productivity that in turn yields improved accuracy and flexibility.

35 Claims, 47 Drawing Sheets

(58) Field of Classification Search
USPC .................................. 345/168–172; 715/816
See application file for complete search history.

(56) References Cited

U.S. PATENT DOCUMENTS

| | | | | |
|---|---|---|---|---|
| 3,648,245 | A | * 3/1972 | Dodds et al. | 345/157 |
| 3,929,216 | A | 12/1975 | Einbinder | 197/100 |
| 3,940,758 | A | 2/1976 | Margolin | 340/337 |
| 4,459,049 | A | 7/1984 | Howell | 400/98 |
| 4,483,634 | A | 11/1984 | Frey et al. | 400/489 |
| 4,824,268 | A | 4/1989 | Diernisse | 400/486 |
| 4,931,935 | A | * 6/1990 | Ohira | G06F 17/271 |
| | | | | 704/8 |
| 5,017,030 | A | 5/1991 | Crews | 400/485 |
| 5,031,206 | A | 7/1991 | Riskin | |
| 5,073,050 | A | 12/1991 | Andrews | 400/82 |
| 5,122,786 | A | 6/1992 | Rader | 340/711 |
| 5,137,384 | A | 8/1992 | Spencer et al. | 400/489 |
| 5,178,477 | A | 1/1993 | Gambaro | 400/489 |
| 5,187,644 | A | 2/1993 | Crisan | 361/393 |
| 5,210,689 | A | 5/1993 | Baker et al. | 364/419 |
| 5,318,367 | A | 6/1994 | Braun et al. | 400/82 |
| 5,332,322 | A | 7/1994 | Gambaro | 400/489 |
| 5,360,280 | A | 11/1994 | Camacho et al. | 400/489 |
| 5,372,441 | A | 12/1994 | Louis | 400/489 |
| 5,397,189 | A | 3/1995 | Minogue | 400/489 |
| 5,426,449 | A | 6/1995 | Danziger | 345/168 |
| 5,503,484 | A | 4/1996 | Louis | 400/489 |
| 5,543,790 | A | 8/1996 | Goldstein | 341/22 |
| 5,553,953 | A | 9/1996 | Herman et al. | 400/489 |
| 5,610,602 | A | 3/1997 | Hargreaves | 341/22 |
| 5,612,691 | A | 3/1997 | Murmann et al. | 341/22 |
| 5,620,267 | A | 4/1997 | Klauber | 400/486 |
| 5,660,488 | A | 8/1997 | Miller | 400/486 |
| 5,673,040 | A | 9/1997 | Hargreaves et al. | 341/22 |
| 5,680,511 | A | * 10/1997 | Baker | G10L 15/1815 |
| | | | | 704/257 |
| 5,689,253 | A | 11/1997 | Hargreaves et al. | 341/22 |
| 5,716,149 | A | 2/1998 | Mensick | 400/489 |
| 5,731,808 | A | 3/1998 | Gaither | 345/168 |
| 5,775,822 | A | 7/1998 | Cheng | 400/489 |
| 5,788,195 | A | 8/1998 | Rice | 248/118.5 |
| 5,788,386 | A | 8/1998 | Hayashi et al. | 400/489 |
| 5,790,103 | A | 8/1998 | Willner | 345/168 |
| 5,805,911 | A | 9/1998 | Miller | |
| 5,818,437 | A | 10/1998 | Grover et al. | 345/326 |
| 5,828,323 | A | 10/1998 | Bartet | 341/22 |
| 5,829,000 | A | * 10/1998 | Huang et al. | 704/252 |
| 5,896,321 | A | 4/1999 | Miller et al. | |
| 5,952,942 | A | 9/1999 | Balakrishnan et al. | |
| 5,959,629 | A | 9/1999 | Masui | |
| 5,959,948 | A | 9/1999 | Oshima | |
| 5,971,636 | A | 10/1999 | Mensick | 400/489 |
| 5,995,084 | A | * 11/1999 | Chan et al. | 345/173 |
| 6,005,495 | A | 12/1999 | Connolly et al. | 341/22 |
| 6,005,496 | A | 12/1999 | Hargreaves et al. | 341/22 |
| 6,011,495 | A | 1/2000 | Chen | 341/22 |
| 6,022,156 | A | 2/2000 | Blish | 400/472 |
| 6,031,469 | A | 2/2000 | Dodd | 341/22 |
| 6,084,576 | A | 7/2000 | Leu et al. | 345/168 |
| 6,088,022 | A | 7/2000 | Rakoski | 345/168 |
| 6,114,977 | A | 9/2000 | Smith et al. | 341/22 |
| 6,132,118 | A | 10/2000 | Grezeszak | 400/489 |
| 6,147,673 | A | 11/2000 | Zarek | 345/168 |
| 6,198,474 | B1 | 3/2001 | Roylance | 345/168 |
| 6,204,848 | B1 | 3/2001 | Nowlan et al. | 345/352 |
| 6,224,279 | B1 | 5/2001 | Nielsen et al. | 400/495 |
| 6,286,064 | B1 | 9/2001 | King et al. | 710/67 |
| 6,573,844 | B1 | * 6/2003 | Venolia | G06F 3/04886 |
| | | | | 341/22 |
| 6,616,703 | B1 | 9/2003 | Nakagawa | |
| 6,712,534 | B2 | 3/2004 | Patel | 400/486 |
| 6,801,190 | B1 | 10/2004 | Robinson et al. | |
| 7,124,080 | B2 | * 10/2006 | Chen | G06F 17/2775 |
| | | | | 704/231 |
| 7,165,019 | B1 | * 1/2007 | Lee | G06F 17/2715 |
| | | | | 704/10 |
| 7,296,229 | B2 | * 11/2007 | Berstis | 715/259 |
| 7,475,343 | B1 | 1/2009 | Mielenhausen | |
| 7,503,001 | B1 | 3/2009 | Lekutai | 715/534 |
| 7,912,706 | B2 | 3/2011 | Sparre | |
| 7,953,692 | B2 | 5/2011 | Bower et al. | |
| 8,036,878 | B2 | 10/2011 | Assadollahi | |
| 8,073,835 | B2 | 12/2011 | Lowles et al. | |
| 8,188,978 | B2 | 5/2012 | Fux et al. | |
| 8,713,432 | B2 | 4/2014 | Assadollahi | |
| 8,930,181 | B2 | 1/2015 | Parikh | |
| 9,020,935 | B2 | 4/2015 | Lowles et al. | |
| 9,274,551 | B2 | 3/2016 | Su et al. | |
| 2001/0009009 | A1 | * 7/2001 | Iizuka | G06F 17/274 |
| | | | | 715/259 |
| 2002/0038207 | A1 | * 3/2002 | Mori | G10L 15/19 |
| | | | | 704/9 |
| 2002/0186883 | A1 | * 12/2002 | Roman | 382/181 |
| 2003/0011574 | A1 | * 1/2003 | Goodman | G06F 3/0237 |
| | | | | 345/172 |
| 2003/0016985 | A1 | 1/2003 | Patel | 400/489 |
| 2003/0017844 | A1 | 1/2003 | Yu | |
| 2003/0023420 | A1 | * 1/2003 | Goodman | G06F 17/276 |
| | | | | 704/1 |
| 2003/0093263 | A1 | * 5/2003 | Chen | G06F 17/2715 |
| | | | | 704/10 |
| 2003/0104839 | A1 | 6/2003 | Kraft et al. | 455/566 |
| 2003/0195904 | A1 | * 10/2003 | Chestnut et al. | 707/204 |
| 2003/0197736 | A1 | * 10/2003 | Murphy | 345/780 |
| 2004/0021691 | A1 | 2/2004 | Dostie | 345/773 |
| 2004/0140956 | A1 | 7/2004 | Kushler et al. | 345/168 |
| 2004/0153975 | A1 | 8/2004 | Williams et al. | |
| 2004/0169635 | A1 | * 9/2004 | Ghassabian | 345/156 |
| 2004/0201607 | A1 | 10/2004 | Mulvey et al. | 345/708 |
| 2005/0017954 | A1 | 1/2005 | Kay et al. | |
| 2005/0114770 | A1 | 5/2005 | Sacher et al. | |
| 2005/0192792 | A1 | 9/2005 | Carus et al. | |
| 2005/0210020 | A1 | 9/2005 | Gunn et al. | |
| 2005/0210402 | A1 | 9/2005 | Gunn et al. | |
| 2005/0246365 | A1 | 11/2005 | Lowles et al. | 707/102 |
| 2006/0156233 | A1 | 7/2006 | Nurmi | |
| 2007/0040813 | A1 | 2/2007 | Kushler et al. | |
| 2007/0061301 | A1 | 3/2007 | Ramer et al. | |
| 2007/0216651 | A1 | 9/2007 | Patel | 345/168 |
| 2007/0233463 | A1 | 10/2007 | Sparre | |
| 2008/0266263 | A1 | 10/2008 | Motaparti et al. | |
| 2008/0313182 | A1 | 12/2008 | Vasa | |
| 2009/0055732 | A1 | 2/2009 | Motaparti et al. | |
| 2009/0150322 | A1 | 6/2009 | Bower | |

FOREIGN PATENT DOCUMENTS

| | | |
|---|---|---|
| AU | 2005225796 | 10/2005 |
| BR | PI 0509071 | 8/2007 |
| CA | 2561218 | 3/2005 |
| CA | 2 454 028 | 6/2005 |
| CA | 2561218 | 10/2005 |
| CA | 2601303 | 3/2006 |
| CA | 2601305 | 3/2006 |
| CA | 2601303 | 9/2006 |
| CA | 2601305 | 9/2006 |
| CL | 1997956 | 7/2007 |
| CN | 200580009571 | 3/2005 |
| DE | 34 09 980 | 9/1985 |
| DE | 43 04 470 | 8/1994 |
| EP | 0 538 329 | 4/1993 |
| EP | 0 768 598 | 4/1997 |
| EP | 0 810 513 | 12/1997 |
| EP | 2005729287 | 3/2005 |
| EP | 1861768 | 10/2005 |
| EP | 2006726508 | 3/2006 |
| EP | 20067265038 | 3/2006 |
| EP | 1861769 | 9/2006 |
| EP | 1733298 | 12/2006 |
| FR | 2 655 911 | 6/1991 |
| GB | 2 154 948 | 9/1985 |
| GB | 2 378 420 | 12/2003 |

(56) References Cited

FOREIGN PATENT DOCUMENTS

| | | |
|---|---|---|
| GB | 0406451 | 2/2004 |
| GB | 0505942 | 3/2005 |
| IL | 177965 | 3/2005 |
| IL | 177965 | 12/2006 |
| JP | 2007504476 | 3/2005 |
| JP | 2007/531098 | 11/2007 |
| KR | 1020067019663 | 3/2005 |
| KR | 1020060134118 | 12/2006 |
| MX | A/a/2006/010814 | 3/2005 |
| MX | PA 06010814 | 5/2007 |
| NZ | 549779 | 3/2005 |
| PH | 12006501887 | 3/2005 |
| RU | 2006133906 | 3/2005 |
| WO | WO 92/00851 | 1/1992 |
| WO | WO98/33111 | 7/1998 |
| WO | WO 01/27732 | 4/2001 |
| WO | WO 03/060451 | 7/2003 |
| WO | WO 2004/010323 | 1/2004 |
| WO | WO 2004/010323 A2 | 1/2004 |
| WO | PCT/GB2005/001111 | 3/2005 |
| WO | WO 2005/093555 | 10/2005 |
| WO | PCT/GB2006/001090 | 3/2006 |
| WO | PCT/GB2006/001097 | 3/2006 |
| WO | WO 2006/100505 | 9/2006 |
| WO | WO 2006/100509 | 9/2006 |
| ZA | 200607604 | 3/2005 |
| ZA | 200607604 | 6/2008 |

OTHER PUBLICATIONS

Gorokhov,. "Radio electronics glossary, Moscow," Russian Language, p. 181, D3 (1993).
Official Action, Application No. RU2006133906, filing date, Sep. 22, 2006, applicant, Keypoint Technologies (UK) Limited.
International Search Report and Written Opinion for PCT/GB2006/001090 date mailed Mar. 5, 2007.
International Search Report for PCT/GB2006/001097 date mailed Mar. 5, 2007.
Non-Final Rejection issued on Mar. 14, 2011 for U.S. Appl. No. 11/887,023, filed Mar. 17, 2008 (Inventor—Motaparti et al.).
Hasselgren et al. "HMS: A Predictive Text Entry Method Using Bigrams." *TextEntry '03: Proceedings of the 2003 EACL Workshop on Language Modeling for Text Entry Methods*, (2003): pp. 43-49.
Költringer et al. "Comparing the Immediate Usability of Graffiti 2 and Virtual Keyboard." *CHI '04: CHI '04 Extended Abstracts on Human Factors in Computing Systems*, (2004).
Stocky et al. "A Commonsense Approach to Predictive Text Entry." *CHI '04: CHI '04 Extended Abstracts on Human Factors in Computing Systems*, (2004).
"Associative Array," Wikipedia, Feb. 24, 2004, downloaded Nov. 27, 2012 from http://en.wikipedia.org/w/index.php?title=Associative_array&oldid=2823416, pp. 1-4.
Acknowledgement of Receipt of EPO Form 2008+2906, Preparation for oral proceedings—Instructions to Support Service, and Summons for Oral Proceedings, dated May 3, 2012 by the European Patent Office for European Patent Application No. 05729287.2 (European Publication No. 1733298) filed Mar. 23, 2005 (Applicant—Keypoint Technologies // 1st Named Inventor—Patel), 8 pages.
Amendment after Final Rejection filed Mar. 15, 2012 with the USPTO for U.S. Appl. No. 11/887,023, filed Mar. 17, 2008 (1st Named Inventor—Motaparti), 14 pages.
Amendment and Response to Office Action filed Apr. 5, 2012 to the United States Patent and Trademark Office for U.S. Appl. No. 11/887,019, filed Mar. 17, 2008 (Applicant—Keypoint Technologies // 1st Named Inventor—Motaparti, et al.;), 18 pages.
Amendment and Response to Office Action filed Nov. 21, 2012 to the United States Patent and Trademark Office for U.S. Appl. No. 11/887,019, filed Mar. 17, 2008 (Applicant—Keypoint Technologies // 1st Named Inventor—Motaparti, et al.;), 55 pages.
Burgess and Lund, Modelling Parsing Constraints with High-Dimensional Context Space, Language and Cognitive Processes, 1997, 12(2/3), 177-210 (18 pages).
C. E. Shannon, A Mathematical Theory of Communication, The Bell System Technical Journal, vol. 27, pp. 379-423, 623-656, July, Oct. 1948 (55 pages).
Claims Amendment filed Dec. 12, 2006 with the European Patent Office for EP 1 733 298 filed Mar. 23, 2005 (Applicant—Keypoint Technologies // 1st Named Inventor—Patel), 3 pages.
Communication pursuant to Article 94(3) EPC issued Apr. 27, 2010 by the European Patent Office for European Patent Application No. 06726503.3 (European Publication No. 1861768) filed Mar. 23, 2006 (Applicant—Keypoint Technologies // 1st Named Inventor—Motaparti), 3 pages.
Communication pursuant to Article 94(3) EPC issued Apr. 27, 2010 by the European Patent Office for European Patent Application No. 06726508.2 (European Publication No. 1861769) filed Mar. 23, 2006 (Applicant—Keypoint Technologies // 1st Named Inventor—Motaparti), 3 pages.
Communication pursuant to Article 94(3) EPC issued Sep. 28, 2009 by the European Patent Office for European Patent Application No. 05729287.2 (European Publication No. 1733298) filed Mar. 23, 2005 (Applicant—Keypoint Technologies // 1st Named Inventor—Patel), 5 pages.
Reasons for failure of Main Request to comply with EPC and Annex to EPO Form 2004, Communication pursuant to Rule 71(3) EPC issued Jan. 23, 2013 by the European Patent Office for European Patent Application No. 05729287.2 (European Publication No. 1733298) filed Mar. 23, 2005 (Applicant—Keypoint Technologies // Inventor—Patel), pp. 1-4.
Decision on the request for further processing under Rule 135(3) EPC issued Mar. 9, 2011 by the European Patent Office for the European Patent Application No. 06726503.3 (European Publication No. 1861768) filed Mar. 23, 2006 (Applicant—Keypoint Technologies // 1st Named Inventor—Motaparti), 1 page.
Decision on the request for further processing under Rule 135(3) EPC issued Mar. 9, 2011 by the European Patent Office for the European Patent Application No. 06726508.2 (European Publication No. 1861769) filed Mar. 23, 2006 (Applicant—Keypoint Technologies // 1st Named Inventor—Motaparti), 1 page.
Examination Report issued Dec. 18, 2008 by the Intellectual Property Office of New Zealand for Patent Application No. NZ 549779 filed Mar. 23, 2005 (Applicant—Keypoint Technologies // 1st Named Inventor—Patel), 2 pages.
Examination Report issued May 22, 2007 by the Intellectual Property Office of New Zealand for Patent Application No. NZ 549779 filed Mar. 23, 2005 (Applicant—Keypoint Technologies // 1st Named Inventor—Patel), 2 pages.
Examination Report issued Nov. 26, 2008 by the Intellectual Property Offie of New Zealand for Patent Application No. NZ 549779 filed Mar. 23, 2005 (Applicant—Keypoint Technologies // 1st Named Inventor—Patel), 2 pages.
Final Rejection issued May 22, 2012 by the United States Patent and Trademark Office for U.S. Appl No. 11/887,019, filed Mar. 17, 2008 (Applicant—Keypoint Technologies // 1st Named Inventor—Motaparti, et al.;), 23 pages.
Final Rejection mailed Nov. 16, 2011 by the USPTO for U.S. Appl. No. 11/887,023, filed Mar. 17, 2008 (1st Named Inventor—Motaparti), 20 pages.
Maintenance/Change of Date/ Cancellation of oral proceedings arranged for day 19.09.12 at 09.00 hrs, dated Aug. 20, 2012 by the European Patent Office for European Patent Application No. 05729287.2 (European Publication No. 1733298) filed Mar. 23, 2005 (Applicant—Keypoint Technologies // 1st Named Inventor—Patel), 2 pages.
Communication under Rule 71(3) EPC with Amendments to the Application, , issued Jan. 23, 2013 by the European Patent Office for European Patent Application No. 05729287.2 (European Publication No. 1733298) filed Mar. 23, 2005 (Applicant—Keypoint Technologies // Inventor—Patel), pp. 1-137.
International Preliminary Report on Patentability issued Jul. 26, 2007 by the International Bureau for PCT/GB2006/001090 filed

(56) References Cited

OTHER PUBLICATIONS

Mar. 23, 2006 and published as WO 2006/100505 on Sep. 28, 2006 (Applicant—Keypoint Technologies // 1st Named Inventor—Motaparti), 14 pages.
International Preliminary Report on Patentability issued Jul. 26, 2007 by the International Bureau for PCT/GB2006/001097 filed Mar. 23, 2006 and published as WO 2006/100509 on Sep. 28, 2006 (Applicant—Keypoint Technologies // 1st Named Inventor—Motaparti), 16 pages.
International Preliminary Report on Patentability issued Sep. 26, 2006 by the International Bureau for PCT/GB2006/001111 filed Mar. 23, 2005 and published as WO 2005/093555 on Oct. 6, 2005 (Applicant—Keypoint Technologies // 1st Named Inventor—Patel), 6 pages.
International Search Report issued Nov. 9, 2005 by the International Searching Authority for PCT/GB2005/00111 filed Mar. 23, 2005 and published as WO 2005/093555 on Oct. 6, 2005 (Applicant—Keypoint Technologies // 1st Named Inventor—Patel), 2 pages.
International Search Report issued Sep. 11, 2005 by the International Searching Authority for PCT/GB2005/001111 filed Mar. 23, 2005 and published as WO 2005/093555 on Oct. 6, 2005 (Applicant—Keypoint Technologies // 1st Named Inventor—Patel), 2 pages.
International Search Report issued Sep. 23, 2007 by the International Searching Authority for PCT/GB2006/001090 filed Mar. 23, 2006 and published as WO 2006/100505 on Sep. 28, 2006 (Applicant—Keypoint Technologies // Inventor—Motaparti), pp. 1-3.
Minutes of the Oral Proceedings issued Dec. 18, 2012 by the European Patent Office for European Patent Application No. 05729287.2 (European Publication No. 1733298) filed Mar. 23, 2005 (Applicant—Keypoint Technologies // Inventor—Patel), pp. 1-16.
Non-Final Rejection issued Dec. 6, 2012 by the United States Patent and Trademark Office for U.S. Appl. No. 11/887,023, filed Mar. 17, 2008 (Applicant—Keypoint Technologies // Inventor—Motaparti et al.;), pp. 1-15.
Non-Final Rejection issued Oct. 5, 2011 by the United States Patent and Trademark Office for U.S. Appl. No. 11/887,019, filed Mar. 17, 2088 (Applicant—Keypoint Technologies // 1st Named Inventor—Motaparti, et al.;), 22 pages.
Notice of Allowance dated Dec. 15, 2015 for Canadian Patent Application No. 2,601,305, 1 page.
Noting of loss of rights pursuant to Rule 69(1) EPC, issued Feb. 5, 2007 by the European Patent Office for European Patent Application No. 05729287.2 (European Publication No. 1733298) filed Mar. 23, 2005 (Applicant—Keypoint Technologies // 1st Named Inventor—Patel), 1 page.
Noting of loss of rights pursuant to Rule 112(1) EPC, issued Dec. 14, 2010 by the European Patent Office for European Patent Application No. 06726503.3 (European Publication No. 1861768) filed Mar. 23, 2006 (Applicant—Keypoint Technologies // 1st Named Inventor—Motaparti), 1 page.
Noting of loss of rights pursuant to Rule 112(1) EPC, issued Dec. 14, 2010 by the European Patent Office for European Patent Application No. 06726508.2 (European Pubilcation No. 1861769) filed Mar. 23, 2016 (Applicant—Keypoint Technologies // 1st Named Inventor—Motaparti), 1 page.
Office Action dated Feb. 3, 2015 for Canadian Patent Application No. 2,561,218, 8 pages.
Office Action dated Feb. 15, 2014 for Indian Patent Application No. 5300/DELNP/2006, 2 pages.
Office Action dated May 12, 2015 for Indian Patent Application No. 7606/DELNP/2007, 3 pages.
Office Action dated May 26, 2015 for Indian Patent Application No. 7608/DELNP/2007, 3 pages.
Office Action dated Nov. 3, 2015 for Canadian Patent Application No. 2,601,303, 2 pages.
Office Action dated Oct. 8, 2014 for Canadian Patent Application No. 2,601,305, 5 pages.
Examination Report issued Feb. 2, 2009 for Singapore Patent Application No. 200606600-5 filed Mar. 23, 2005 (Applicant—Keypoint Technologies // st Named Inventor—Patel), 5 pages.
Russian Office Action issued Mar. 18, 2009 by the Russian Patent Office for Russian Patent Application No. 2006133906/09 (036880) entered into national stage on Sep. 22, 2006 from PCT/GB2005/001111 filed on Mar. 23, 2005 (Applicant—Keypoint Technologies // 1st Named Inventor—Patel) (both Russian language Office Action (pp. 1-3) and the English translation (pp. 4-7) are provided), 7 pages.
Plew, Donald et al., "The Database Normalization Process," informIT, Jan. 24, 2003, 9 pages.
Preliminary Amendment filed Sep. 24, 2007 to the United States Patent and Trademark Office for U.S. Appl. No 11/887,019, filed Mar. 17, 2008 (Applicant—Keypoint Technologies // 1st Named Inventor—Motaparti, et al.;), 12 pages.
Preliminary Amendment filed Sep. 24, 2007 with the USPTO for U.S. Appl. No. 11/887,023, filed Mar. 17, 2008 (1st Named Inventor—Motaparti), 18 pages.
Reply to Communication from the Examining Division filed Apr. 8, 2010 to the European Patent Office for European Patent Application No. 05729287.2 (European Publication No. 1733298) filed Mar. 23, 2005 (Applicant—Keypoint Technologies // 1st Named Inventor—Patel), 19 pages.
Request for Further Processing dated Feb. 23, 2011 submitted to the European Patent Office (received at the EPO on Feb. 24, 2011) for European Patent Application No. 06726508.2 (European Publication No. 1861769) filed Mar. 23, 2006 (Applicant—Keyboard Technologies // 1st Named Inventor—Motaparti), 22 pages.
Request for Further Processing dated Feb. 23, 2011 with the European Patent Office for European Patent Application No. 06726503.3 (received at the EPO on Feb. 24, 2011) (European Publication No. 1861768) filed Mar. 23, 2006 (Applicant—Keypoint Technologies // 1st Named Inventor—Motaparti), 21 pages.
Response to Non-final Rejection filed Aug. 9, 2011 with the USPTO for U.S. Appl. No. 11/887,023, filed Mar. 17, 2008 (1st Named Inventor—Motaparti), 15 pages.
Response to Official Action dated Apr. 8, 2015 for Canadian Patent Application No. 2,601,305, 8 pages.
Response to Official Action filed Jul. 31, 2015 for Canadian Patent Application No. 2,561,218, 6 pages.
Response to Office Action filed Sep. 22, 2014 for Indian Patent Application No. 5300/DELNP/2006, 10 pages.
Submission in Preparation to Oral Proceedings dated Aug. 17, 2012 to the European Patent Office for European Patent Application No. 05729287.2 (European Publication No. 1733298) filed Mar. 23, 2005 (Applicant—Keyboard Technologies // 1st Named Inventor—Patel), 18 pages.
Consultation by Telephone issued Feb. 6, 2007 by the European Patent Office for European Patent Application No. 05729287.2 (European Publication No. 1733298) filed Mar. 23, 2005 (Applicant—Keypoint Technologies // 1st Named Inventor—Patel), 1 page.
Written Opinion issued Nov. 7, 2005 by the International Searching Authority for PCT/GB2005/001111 filed Mar. 23, 2005 and published as WO 2005/093555 on Oct. 6, 2005 (Applicant—Keypoint Technologies // 1st Named Inventor—Patel), 5 pages.
Written Opinion issued Sep. 23, 2007 by the International Searching Authority for PCT/GB2006/001090 filed Mar. 23, 2006 and published as WO 2006/100505 on Sep. 28, 2006 (Applicant—Keypoint Technologies // Inventor—Motaparti), pp. 1-11.
Written Opinion issued Sep. 23, 2007 by the International Searching Authority for PCT/GB2006/001097 filed Mar. 23, 2006 and published as WO 2006/100509 on Sep. 28, 2006 (Applicant—Keypoint Technologies // Inventor—Motaparti), pp. 1-11.
U.S. Patent and Trademark Office, Office Action for U.S. Appl. No. 11/887,023 dated Oct. 18, 2016, 17 pages.
Kenneth Ward Church et al., "Word Association Norms, Mutual Information, and Lexicography" *Computation Linguistics*, vol. 16, No. 1, Mar. 1990, pp. 22-29.

(56) References Cited

OTHER PUBLICATIONS

Amendment after Final Rejection filed Mar. 15, 2012 with the USPTO for U.S. Appl. No. 11/887,023, filed Mar. 17, 2008 (1st Named Inventor—Motaparti) (pp. 1-14).
Final Rejection mailed Nov. 16, 2011 by the USPTO for U.S. Appl. No. 11/887,023, filed Mar. 17, 2008 (1st Named Inventor—Motaparti) (pp. 1-20).
Non-Final Rejection issued Dec. 6, 2012 by the United States Patent and Trademark Office for U.S. Appl. No. 11/887,023, filed Mar. 17, 2008 (Applicant—Keypoint Technologies // Inventor—Motaparti, et al.)(pp. 1-15).
Preliminary Amendment filed Sep. 24, 2017 with the USPTO for U.S. Appl. No. 11/887,023, filed Mar. 17, 2008 (1st Named Inventor—Motaparti) (pp. 1-12).
Response to Non-final Rejection filed Aug. 9, 2011 with the USPTO for U.S. Appl. No. 11/887,023, filed Mar. 17, 2008 (1st Named Inventor—Motaparti) (pp. 1-15).
Amendment and Response to Office Action filed Apr. 5, 2012 to the United States Patent and Trademark Office for U.S. Appl. No. 11/887,019, filed Mar. 17, 2008 (Applicant—Keypoint Technologies // 1st Named Inventor—Motaparti, et al.) (pp. 1-18).
Amendment and Response to Office Action filed Nov. 21, 2012 to the United States Patent and Trademark Office for U.S. Appl. No. 11/887,019, filed Mar. 17, 2008 (Applicant—Keypoint Technologies // 1st Named Inventor—Motaparti, et al.) (pp. 1-55).
Final Rejection issued May 22, 2012 by the United States Patent and Trademark Office for U.S. Appl. No. 11/887,019, filed Mar. 17, 2008 (Applicant—Keypoint Technologies // 1st Named Inventor—Motaparti, et al.) (pp. 1-23).
Non-Final Rejection issue Oct. 5, 2011 by the United States Patent and Trademark Office for U.S. Appl. No. 11/887,019, filed Mar. 17, 2008 (Applicant—Keypoint Technologies // 1st Named Inventor—Motaparti, et al.) (pp. 1-22).
Preliminary Amendments filed Sep. 24, 2007 to the United States Patent and Trademark Office for U.S. Appl. No. 11/887,019, filed Mar. 17, 2008 (Applicant—Keypoint Technologies // 1st Named Inventor—Motaparti, et al.) (pp. 1-12).
Examination Report issued May 22, 2007 by the Intellectual Property Office of New Zealand for patent application No. NZ 549779 filed Mar. 23, 2006 (Applicant—Keypoint Technologies // 1st Named Inventor—Patel) (pp. 1-2).
Examination Report issued Nov. 26, 2008 by the Intellectual Property Office of New Zealand for patent application No. NZ 549779 filed Mar. 23, 2005 (Applicant—Keypoint Technologies // 1st Named Inventor—Patel) (pp. 1-2).
Examination Report issued Dec. 18, 2008 by the Intellectual Property Office of New Zealand for patent application No. NZ 549779 filed Mar. 23, 2006 (Applicant—Keypoint Technologies // 1st Named Inventor—Patel) (pp. 1-2).
International Preliminary Report on Patentability issued Jul. 26, 2007 by the International Bureau for PCT/GB2006/001090 filed Mar. 23, 2006 and published as WO/2006/100505 on Sep. 28, 2006 (Applicant—Keypoint Technologies // 1st Named Inventor—Motaparti) (pp. 1-14).
Communication from the Examining Division issued Apr. 27, 2010 by the European Patent Office for European Patent Application No. 06726503.3 (European Publication No. 1861768) filed Mar. 23, 2006 (Applicant—Keypoint Technologies // 1st Named Inventor—Motaparti) (pp. 1-3).
Decision to Allow Further Processing issued Mar. 9, 2011 by the European Patent Office for European Patent Application No. 06726503.3 filed Mar. 23, 2006 (Applicant—Keypoint Technologies // 1st Named Inventor—Motaparti) (pp. 1-1).
Notice that application deemed to be withdrawn issued Dec. 14, 2010 by the European Patent Office for European Patent Application No. 06726503.3 filed Mar. 23, 2006 (Applicant—Keypoint Technologies // 1st Named Inventor—Motaparti) (pp. 1-1).
Request for Further Processing filed Feb. 23, 2011 with the European Patent Office for European Patent Application No. 06726503.3 (European Publication No. 1861768) filed Mar. 23, 2006 (Applicant—Keypoint Technologies // 1st Named Inventor—Motaparti) (pp. 1-21).
International Preliminary Report on Patentability issued Jul. 26, 2007 by the International Bureau for PCT/GB2006/001097 filed Mar. 23, 2006 and published as WO/2006/100509 on Sep. 28, 2006 (Applicant—Keypoint Technologies // 1st Named Inventor—Motaparti) (pp. 1-16).
Written Opinion issued Sep. 23, 2007 by the International Searching Authority on Mar. 5, 2007 for PCT/GB2006/001097 filed on Mar. 23, 2006 and published as WO/2006/100509 on Sep. 28, 2007 (Applicant—Keypoint Technologies // 1st Named Inventor—Motaparti) (pp. 1-11).
Communication from the Examining Division issued Apr. 27, 2010 by the European Patent Office for European Patent Application No. 06726508.2 (European Publication No. 1861769) filed Mar. 23, 2006 (Applicant—Keypoint Technologies // 1st Named Inventor—Motaparti) (pp. 1-3).
Decision to Allow Further Processing issued Mar. 9, 2011 by the European Patent Office for European Patent Application No. 06726508.2 (European Publication No. 1861769) filed Mar. 23, 2006 (Applicant—Keypoint Technologies // 1st Named Inventor—Motaparti) (pp. 1-1).
Notice that application deemed to be withdrawn issued Dec. 14, 2010 by the European Patent Office for European Patent Application No. 06726508.2 (European Publication No. 1861769) filed Mar. 23, 2006 (Applicant—Keypoint Technologies // 1st Named Inventor—Motaparti) (pp. 1-1).
Request for Further Processing dated Dec. 23, 2011 submitted to the European Patent Office for European Patent Application No. 06726508.2 (European Publication No. 1861769) filed Mar. 23, 2006 (Applicant—Keypoint Technologies // 1st Named Inventor—Motaparti) (pp. 1-22).
International Preliminary Report on Patentability issued Sep. 26, 2006 by the International Bureau for PCT/GB2006/001111 filed Mar. 23, 2005 and published as WO/2005/093555 on Oct. 6, 2005 (Applicant—Keypoint Technologies // 1st Named Inventor—Patel) (pp. 1-6).
International Search Report issued Nov. 9, 2005 by the International Searching Authority for PCT/GB2005/001111 filed Mar. 23, 2005 and published as WO/2005/093555 on Oct. 6, 2005 (Applicant—Keypoint Technologies // 1st Named Inventor—Patel) (pp. 1-2).
Written Opinion issued Nov. 7, 2005 by the International Searching Authority for PCT/GB2005/001111 filed Mar. 23, 2005 and published as WO/2005/093555 on Oct. 6, 2005 (Applicant—Keypoint Technologies // 1st Named Inventor—Patel) (pp. 1-5).
Acknowledgement of a document and Preparation and Summons for Oral Proceedings dated May 3, 2012 by the European Patent Office for European Patent Application No. 05729287.2 (European Publication No. 1733298) filed Mar. 23, 2005 (Applicant—Keypoint Technologies // 1st Named Inventor—Patel) (pp. 1-8).
Claims Amendment filed Dec. 12, 2006 with the European Patent Office for European Patent Application No. 05729287.2 (European Publication No. 1733298) filed Mar. 23, 2005 (Applicant—Keypoint Technologies // 1st Named Inventor—Patel) (pp. 1-3).
Communication from the Examining Division issued Sep. 28, 2009 by the European Patent Office for European Patent Application No. 05729287.2 (European Publication No. 1733298) filed Mar. 23, 2005 (Applicant—Keypoint Technologies // 1st Named Inventor—Patel) (pp. 1-5).
Communication pursuant to Rule 71(3) EPC issued Jan. 23, 2013 by the European Patent Office for European Patent Application No. 05729287.2 (European Publication No. 1733298) filed Mar. 23, 2005 (Applicant—Keypoint Technologies // 1st Named Inventor—Patel) (pp. 1-4).
Findings upon Submissions relating to Oral Proceedings dated Aug. 20, 2012 by the European Patent Office for European Patent Application No. 05729287.2 (European Publication No. 1733298) filed Mar. 23, 2005 (Applicant—Keypoint Technologies // 1st Named Inventor—Patel) (pp. 1-2).
Intention to grant patent issued Jan. 23, 2013 by the European Patent Office for European Patent Application No. 05729287.2 (European

(56) References Cited

OTHER PUBLICATIONS

Publication No. 1733298) filed Mar. 23, 2005 (Applicant—Keypoint Technologies // 1st Named Inventor—Patel) (pp. 1-135).
Minutes of the Oral Proceeding issued Dec. 18, 2012 by the European Patent Office for European Patent Application No. 05729287.2 (European Publication No. 1733298) filed Mar. 23, 2005 (Applicant—Keypoint Technologies // 1st Named Inventor—Patel) (pp. 1-16).
Notice of Loss of Rights issued Feb. 5, 2007 by the European Patent Office for European Patent Application No. 05729287.2 (European Publication No. 1733298) filed Mar. 23, 2005 (Applicant—Keypoint Technologies // 1st Named Inventor—Patel) (pp. 1-1).
Reply to Communication from the Examining Division filed Apr. 8, 2010 to the European Patent Office for European Patent Application No. 05729287.2 (European Publication No. 1733298) filed Mar. 23, 2005 (Applicant—Keypoint Technologies // 1st Named Inventor—Patel) (pp. 1-19).
Submission in Preparation to Oral Proceedings dated Aug. 17, 2012 to the European Patent Office for European Patent Application No. 05729287.2 (European Publication No. 1733298) filed Mar. 23, 2005 (Applicant—Keypoint Technologies // 1st Named Inventor—Patel) (pp. 1-18).
Telephone Interview Summary issued Feb. 6, 2007 by the European Patent Office for European Patent Application No. 05729287.2 (European Publication No. 1733298) filed Mar. 23, 2005 (Applicant—Keypoint Technologies // 1st Named Inventor—Patel) (pp. 1-1).
Office Action issued Mar. 18, 2009 by the Russian Patent Office for Russian Patent Application No. 2006133906/09(036880) entered into national stage on Sep. 22, 2006 from PCT/GB2005/001111 filed on Mar. 23, 2005 (Applicant—Keypoint Technologies // 1st Named Inventor—Patel) (both Russian language Office Action and English translation are provided) (pp. 1-7).
Office Action dated Feb. 2, 2009 by the Intellectual Property Office of Singapore for Singapore Patent Application No. 200606600-5 filed Mar. 23, 2005 (Applicant—Keypoint Technologies // 1st Named Inventor—Patel) (pp. 1-5).
"Associative array," Wikipedia, Feb. 24, 2004, downloaded Nov. 27, 2012 from http://en.wikipedia.org/w/index.php?title=Associative_array&oldid=2823416 (pp. 1-4).
Burgess and Lund. Modeling Parsing Constraints with High-dimensional Context Space. Language and Cognitive Processes, 1997, 12(2/3), 177-210 (pp. 1-18).
C. E. Shannon. A Mathematical Theory of Communication. The Bell System Technical Journal, vol. 27, pp. 379-423, 623-656, Jul., Oct., 1948, (pp. 1-55).

* cited by examiner

| Physical MDP Feature: | Description: | Notes:<br>(Assumes operation in Normal / Default Mode) |
|---|---|---|
| Keys: | QU/Q | Primary qu key-value, secondary q key-value |
| | OF/.tv | Primary of key-value, secondary <dot>tv key-value |
| | OR/.info | Primary or key-value, secondary <dot>info key-value |
| | IN/.org | Primary in key-value, secondary <dot>org key-value |
| | EN/.edu | Primary en key-value, secondary <dot>edu key-value |
| | ES/.gov | Primary es key-value, secondary <dot>gov key-value |
| | RE/.mil | Primary re key-value, secondary <dot>mil key-value |
| | TH/.www. | Primary th key-value, secondary www<dot> key-value |
| | AT/.co | Primary at key-value, secondary <dot>co key-value |
| | ED/.ac | Primary ed key-value, secondary <dot>ac key-value |
| | ER/.ccode | Primary er key-value, secondary user configurable URL country-code key-value |
| | ON/.net | Primary on key-value, secondary <dot>net key-value |
| | AN/.com | Primary an key-value, secondary <dot>com key-value |
| | SPC T/.biz | Primary <space>t key-value, secondary <dot>biz key-value |
| | E SPC/.pro | Primary e<space> key-value, secondary <dot>pro key-value |
| | DUAL | Accesses secondary key-values |
| | DUAL SHIFT | Accesses SHIFT equivalent of secondary key-values |
| | Multi DEL | User configurable left-to-right delete of up to (N characters, words, sentences or paragraphs) |
| | Multi BSPC | User configurable right-to-left delete of up to (N characters, words, sentences or paragraphs) |
| | +/-/Alt Lk | Primary +/- sign operator, secondary ALT LOCK operator |
| | v/Ctrl Lk | Primary Square Root operator, secondary CTRL LOCK operator |
| | %/Seq Lk | Primary Percentage operator, secondary Sequential Typing LOCK operator |
| | C/AC/Dual Lk | Primary Clear Calculator operator, secondary DUAL LOCK operator |
| | MKUP | Percentage Mark Up calculation operator |

*Fig. 2d*

| Physical MDP Feature: | Description: | Notes: (Assumes operation in Normal / Default Mode) |
|---|---|---|
| Buttons | Multi Press | Multi-Press mode ON/OFF (aka Toggle feature) |
|  | Trans − | Translate Minimize (Implode) |
|  | Trans + | Translate Maximize (Explode or Expand) |
|  | Trans Mode | Translate mode ON/OFF (ON/OFF toggle of user configurable Automatic Translate feature) |
|  | MR | Memory Recall |
|  | M+ | Memory Plus |
|  | M− | Memory Minus |
|  | MC | Memory Clear |
|  | Calc Lock | Calculator mode ON/OFF (in combination with NUM LOCK) |
| LCD | LCD | Calculator LCD showing conventional calculator display characteristics (Numerics, Memory indicator, +/− sign, Error indicator etc.) |

*Fig. 2d cont.*

Country codes for the user configurable .ccode MDP key values (default value is .uk).

| | | | |
|---|---|---|---|
| .ac | Ascension Island | .cr | Costa Rica |
| .ad | Andorra | .cu | Cuba |
| .ae | United Arab Emirates | .cv | Cap Verde |
| .af | Afghanistan | .cx | Christmas Island |
| .ag | Antigua and Barbuda | .cy | Cyprus |
| .ai | Anguilla | .cz | Czech Republic |
| .al | Albania | .de | Germany |
| .am | Armenia | .dj | Djibouti |
| .an | Netherlands Antilles | .dk | Denmark |
| .ao | Angola | .dm | Dominica |
| .aq | Antarctica | .do | Dominican Republic |
| .ar | Argentina | .dz | Algeria |
| .as | American Samoa | .ec | Ecuador |
| .at | Austria | .ee | Estonia |
| .au | Australia | .eg | Egypt |
| .aw | Aruba | .eh | Western Sahara |
| .az | Azerbaijan | .er | Eritrea |
| .ba | Bosnia and Herzegovina | .es | Spain |
| .bb | Barbados | .et | Ethiopia |
| .bd | Bangladesh | .fi | Finland |
| .be | Belgium | .fj | Fiji |
| .bf | Burkina Faso | .fk | Falkland Islands (Malvina) |
| .bg | Bulgaria | .fm | Micronesia, Federal State of |
| .bh | Bahrain | .fo | Faroe Islands |
| .bi | Burundi | .fr | France |
| .bj | Benin | .ga | Gabon |
| .bm | Bermuda | .gd | Grenada |
| .bn | Brunei Darussalam | .ge | Georgia |
| .bo | Bolivia | .gf | French Guiana |
| .br | Brazil | .gg | Guernsey |
| .bs | Bahamas | .gh | Ghana |
| .bt | Bhutan | .gi | Gibraltar |
| .bv | Bouvet Island | .gl | Greenland.gm Gambia |
| .bw | Botswana | .gn | Guinea |
| .by | Belarus | .gp | Guadeloupe |
| .bz | Belize | .gq | Equatorial Guinea |
| .ca | Canada | .gr | Greece |
| .cc | Cocos (Keeling) Islands | .gs | South Georgia & South Sandwich Islands |
| .cd | Congo, Democratic Republic of the | | |
| .cf | Central African Republic | .gt | Guatemala |
| .cg | Congo, Republic of | .gu | Guam |
| .ch | Switzerland | .gw | Guinea-Bissau |
| .ci | Cote d'Ivoire | .gy | Guyana |
| .ck | Cook Islands | .hk | Hong Kong |
| .cl | Chile | .hm | Heard and McDonald Islands |
| .cm | Cameroon | .hn | Honduras |
| .cn | China | .hr | Croatia/Hrvatska |
| .co | Colombia | .ht | Haiti |

*Fig. 3*

Country codes for the user configurable .ccode MDP key values (default value is .uk).

| | | | |
|---|---|---|---|
| .hu | Hungary | .mq | Martinique |
| .id | Indonesia | .mr | Mauritania |
| .ie | Ireland | .ms | Montserrat |
| .il | Israel | .mt | Malta |
| .im | Isle of Man | .mu | Mauritius |
| .in | India | .mv | Maldives |
| .io | British Indian Ocean Territory | .mw | Malawi |
| .iq | Iraq | .mx | Mexico |
| .ir | Iran (Islamic Republic of) | .my | Malaysia |
| .is | Iceland | .mz | Mozambique |
| .it | Italy | .na | Namibia |
| .je | Jersey | .nc | New Caledonia |
| .jm | Jamaica | .ne | Niger |
| .jo | Jordan | .nf | Norfolk Island |
| .jp | Japan | .ng | Nigeria |
| .ke | Kenya | .ni | Nicaragua |
| .kg | Kyrgyzstan | .nl | Netherlands |
| .kh | Cambodia | .no | Norway.np  Nepal |
| .ki | Kiribati | .nr | Nauru |
| .km | Comoros | .nu | Niue |
| .kn | Saint Kitts and Nevis | .nz | New Zealand |
| .kp | Korea, Democratic People's Republic | .om | Oman |
| .kr | Korea, Republic of | .pa | Panama |
| .kw | Kuwait | .pe | Peru |
| .ky | Cayman Islands | .pf | French Polynesia |
| .kz | Kazakhstan | .pg | Papua New Guinea |
| .la | Lao People's Democratic Republic | .ph | Philippines |
| .lb | Lebanon | .pk | Pakistan |
| .lc | Saint Lucia | .pl | Poland |
| .li | Liechtenstein | .pm | St. Pierre and Miquelon |
| .lk | Sri Lanka | .pn | Pitcairn Island |
| .lr | Liberia | .pr | Puerto Rico |
| .ls | Lesotho | .ps | Palestinian Territories |
| .lt | Lithuania | .pt | Portugal |
| .lu | Luxembourg | .pw | Palau |
| .lv | Latvia | .py | Paraguay |
| .ly | Libyan Arab Jamahiriya | .qa | Qatar |
| .ma | Morocco | .re | Reunion Island |
| .mc | Monaco | .ro | Romania |
| .md | Moldova, Republic of | .ru | Russian Federation |
| .mg | Madagascar | .rw | Rwanda |
| .mh | Marshall Islands | .sa | Saudi Arabia |
| .mk | Macedonia, Former Yugoslav Republic | .sb | Solomon Islands |
| .ml | Mali | .sc | Seychelles |
| .mm | Myanmar | .sd | Sudan |
| .mn | Mongolia | .se | Sweden |
| .mo | Macau | .sg | Singapore |
| .mp | Northern Mariana Islands | .sh | St. Helena |

*Fig. 3 Cont.*

Country codes for the user configurable .ccode MDP key values (default value is .uk).

.si    Slovenia  
.sj    Svalbard and Jan Mayen Islands  
.sk    Slovak Republic  
.sl    Sierra Leone  
.sm    San Marino  
.sn    Senegal  
.so    Somalia  
.sr    Suriname  
.st    Sao Tome and Principe  
.sv    El Salvador  
.sy    Syrian Arab Republic  
.sz    Swaziland  
.tc    Turks and Caicos Islands  
.td    Chad  
.tf    French Southern Territories  
.tg    Togo  
.th    Thailand  
.tj    Tajikistan  
.tk    Tokelau  
.tm    Turkmenistan  
.tn    Tunisia  
.to    Tonga  
.tp    East Timor  
.tr    Turkey  
.tt    Trinidad and Tobago  
.tv    Tuvalu  
.tw    Taiwan  
.tz    Tanzania  
.ua    Ukraine  
.ug    Uganda  
.uk    United Kingdom  
.um    US Minor Outlying Islands  
.us    United States  
.uy    Uruguay  
.uz    Uzbekistan  
.va    Holy See (City Vatican State)  
.vc    Saint Vincent and the Grenadines  
.ve    Venezuela  
.vg    Virgin Islands (British)  
.vi    Virgin Islands (USA)  
.vn    Vietnam  
.vu    Vanuatu  
.wf    Wallis and Futuna Islands  
.ws    Western Samoa  
.ye    Yemen  
.yt    Mayotte  
.yu    Yugoslavia  
.za    South Africa  
.zm    Zambia  
.zw    Zimbabwe

*Fig. 3 Cont.*

Example 2: When I wish to type www.dti.gov.uk I can do it using the following keystrokes:
Stroke:  1    +2             34 5    6     +7            8    +9
Key:     DUAL+TH/www.  d t i     DUAL+ES/.gov    DUAL+ER/.ccode
Value:        www.      d t i         .gov              .uk
Screen: www.dti.gov.uk

Example 3: When I wish to type www.another.ac.uk I can do it using the following keystrokes:
Stroke:  1    +2             3     4 5    6    TH/www.  ER/.ccode    DUAL+ED/.ac   9    +10
Key:     DUAL+TH/www.  AN/.com   o                                                    DUAL+ER/.ccode
Value:        www.      an       o  th       er                       .ac               .uk
Screen: www.another.ac.uk

*Fig. 4*

|  | Normal Mode | | | | Caps Lock Mode | | | |
|---|---|---|---|---|---|---|---|---|
|  | Letter Key (t,T) | Symbol Key (3,#) | Feature Key (th,TH,www.) | | Letter Key (T,t) | Symbol Key (3,#) | Feature Key (TH,th,WWW.) | |
| Normal | t | 3 | th | | T | 3 | TH | |
| Shift | T | # | TH | | t | # | th | |
| Dual | T | # | www. | | t | # | WWW. | |
| Dual Shift | T | # | WWW. | | t | # | www. | |

*Fig. 6a*

|  | Normal Mode | | | Caps Lock Mode | | |
| --- | --- | --- | --- | --- | --- | --- |
|  | Letter Key (t,T,the) | Symbol Key (qu,QU,q) | Feature Key (th,TH,www.) | Letter Key (T,t,THE) | Symbol Key (QU,qu,Q) | Feature Key (TH,th,WWW.) |
| Normal | t | Qu | th | T | QU | TH |
| Shift | T | QU | TH | t | qu | th |
| Dual | the | q | www. | the | Q | WWW. |
| Dual Shift | THE | Q | WWW. | THE | q | www. |

*Fig. 6b*

| KEY: | NORMAL MODE: | | MDP KEYING: | |
|---|---|---|---|---|
| | Default | Shift | Dual | Dual Shift |
| OF .tv | of | OF | .tv | .TV |
| ED .ac. | ed | ED | .ac. | .AC. |
| ON .net | on | ON | .net | .NET |
| EN .edu | en | EN | .edu | .EDU |
| ES .gov | es | ES | .gov | .GOV |
| RE .mil | re | RE | .mil | .MIL |
| TH www. | th | TH | www. | WWW. |
| AT .co. | at | AT | .co. | .CO. |
| OR .info | or | OR | .info | .INFO |
| AN .com | an | AN | .com | .COM |
| IN .org | in | IN | .org | .ORG |
| ER .ccode | er | ER | .ccode> | .CCODE> |
| SPC T .biz | <space>t | <space>T | .biz | .BIZ |
| E SPC .pro | e<space> | E<space> | .pro | .PRO |
| QU q | qu | QU | q | Q |
| W | w | W | w | W |
| E | e | E | E | E |
| R | r | R | R | R |
| T | t | T | T | T |
| Y | y | Y | Y | Y |
| U | u | U | U | U |
| I | i | I | I | I |
| O | o | O | O | O |
| P | p | P | P | P |

*Fig. 6c*

| KEY: | NORMAL MODE: | | MDP KEYING: | |
|---|---|---|---|---|
| | Default | Shift | Dual | Dual Shift |
| A | a | A | A | A |
| S | s | S | S | S |
| D | d | D | D | D |
| F | f | F | F | F |
| G | g | G | G | G |
| H | h | H | H | H |
| J | j | J | J | J |
| K | k | K | K | K |
| L | l | L | L | L |
| N | n | N | N | N |
| X | x | X | X | X |
| C | c | C | C | C |
| V | v | V | V | V |
| B | b | B | B | B |
| N | n | N | N | N |
| M | m | M | M | M |
| , | , | ⌐ | ⌐ | ⌐ |
| 1 ! | 1 | ! | ! | ! |
| 2 " | 2 | = | = | = |
| 3 £ | 3 | £ | £ | £ |
| 4 $ | 4 | $ | $ | $ |
| 5 % | 5 | % | % | % |
| 6 ^ | 6 | < | < | < |
| 7 & | 7 | & | & | & |
| 8 * | 8 | * | * | * |

*Fig 6c cont.*

| KEY: | NORMAL MODE: | | MDP KEYING: | |
|---|---|---|---|---|
| | Default | Shift | Dual | Dual Shift |
| 9 ( | 9 | ( | ( | ( |
| 0 ) | 0 | ) | ) | ) |
| - _ | - | _ | _ | _ |
| + = | = | + | + | + |
| TAB | TAB | BACKTAB | BACKTAB | BACKTAB |
| [ { | [ | { | { | { |
| ] } | ] | } | } | } |
| : ; | ; | : | : | : |
| @ # | # | @ | @ | @ |
| # ~ | , | ~ | ~ | ~ |
| , < | . | < | < | < |
| . > | / | > | > | > |
| / ? | / | ? | ? | ? |
| \ \| | \ | \| | \| | \| |
| * * | * | * | * | * |
| - - | - | - | - | - |
| + + | + | + | + | + |

*Fig. 6c cont.*

|  | CAPS LOCK MODE: | | MDP KEYING: | |
|---|---|---|---|---|
| KEY: | Default | Shift | Dual | Dual Shift |
| OF .tv | OF | of | .TV | .tv |
| ED .ac. | ED | ed | .AC. | .ac. |
| ON .net | ON | on | .NET | .net |
| EN .edu | EN | en | .EDU | .edu |
| ES .gov | ES | es | .GOV | .gov |
| RE .mil | RE | re | .MIL | .mil |
| TH www. | TH | th | WWW. | www. |
| AT .co. | AT | at | .CO. | .co. |
| OR .info | OR | or | .INFO | .info |
| AN .com | AN | an | .COM | .com |
| IN .org | IN | in | .ORG | .org |
| ER .ccode | ER | er | .<CCODE> | .<ccode> |
| SPC T .biz | <space>T | <space>t | .BIZ | .biz |
| E SPC .pro | E<space> | e<space> | .PRO | .pro |
| QU q | QU | qu | Q | q |
| W | W | w | w | w |
| E | E | e | e | e |
| R | R | r | r | r |
| T | T | t | t | t |
| Y | Y | y | y | y |
| U | U | u | u | u |
| I | I | i | i | i |
| O | O | o | o | o |
| P | P | p | p | p |
| A | A | a | a | a |

*Fig. 6d*

| KEY: | CAPS LOCK MODE: | | MDP KEYING: | |
| --- | --- | --- | --- | --- |
| | Default | Shift | Dual | Dual Shift |
| S | S | s | s | s |
| D | D | d | d | d |
| F | F | f | f | f |
| G | G | g | g | g |
| H | H | h | h | h |
| J | J | j | j | j |
| K | K | k | k | k |
| L | L | l | l | l |
| N | N | n | N | N |
| X | X | x | x | x |
| C | C | c | c | c |
| V | V | v | v | v |
| B | B | b | b | b |
| N | N | n | n | n |
| M | M | m | m | m |
| ,; | , | ; | , | ; |
| 1 ! | 1 | ! | 1 | ! |
| 2 " | 2 | " | 2 | " |
| 3 £ | 3 | £ | £ | £ |
| 4 $ | 4 | $ | $ | $ |
| 5 % | 5 | % | % | % |
| 6 < | 6 | < | < | < |
| 7 & | 7 | & | & | & |
| 8 * | 8 | * | * | * |
| 9 ( | 9 | ( | ( | ( |

*Fig. 6d Cont.*

| KEY: | CAPS LOCK MODE: | | MDP KEYING: | |
| --- | --- | --- | --- | --- |
| | Default | Shift | Dual | Dual Shift |
| 0 ) | 0 | ) | ) | ) |
| - _ | - | _ | | |
| = + | = | + | + | + |
| TAB | TAB | BACKTAB | BACKTAB | BACKTAB |
| [ { | [ | { | { | { |
| ] } | ] | } | } | } |
| ; : | ; | : | | |
| @ ~ | # | @ | @ | @ |
| # ` | , | ` | ` | ` |
| , < | . | < | < | < |
| . > | / | > | > | > |
| / ? | \ | ? | ? | ? |
| \ \| | \ | \| | — | — |
| * | * | * | * | * |
| - + | - + | - + | - + | - + |

*Fig. 6d Cont.*

| KEY: | DUAL LOCK MODE: | | | MDP KEYING: | |
|---|---|---|---|---|---|
| | Default | Shift | | Dual | Dual Shift |
| OF .tv | .tv | .TV | | of | OF |
| ED .ac. | .ac. | .AC. | | ed | ED |
| ON .net | .net | .NET | | on | ON |
| EN .edu | .edu | .EDU | | en | EN |
| ES .gov | .gov | .GOV | | es | ES |
| RE .mil | .mil | .MIL | | re | RE |
| TH www. | www. | WWW. | | th | TH |
| AT .co. | .co. | .CO. | | at | AT |
| OR .info | .info | .INFO | | or | OR |
| AN .com | .com | .COM | | an | AN |
| IN .org | .org | .ORG | | in | IN |
| ER .ccode | .<ccode> | .<CCODE> | | er | ER |
| SPC T .biz | .biz | .BIZ | | <space>t | <space>T |
| E SPC .pro | .pro | .PRO | | e<space> | E<space> |
| QU q | q | Q | | qu | QU |
| W | w | W | | w | W |
| E | e | E | | E | E |
| R | r | R | | R | R |
| T | t | T | | T | T |
| Y | y | Y | | Y | Y |
| U | u | U | | U | U |
| I | i | I | | I | I |
| O | o | O | | O | O |
| P | p | P | | P | P |
| A | a | A | | A | A |

Fig. 6e

| KEY | DUAL LOCK MODE: Default | DUAL LOCK MODE: Shift | MDP KEYING: Dual | MDP KEYING: Dual Shift |
|---|---|---|---|---|
| S | s | S | S | S |
| D | d | D | D | D |
| F | f | F | F | F |
| G | g | G | G | G |
| H | h | H | H | H |
| J | j | J | J | J |
| K | k | K | K | K |
| L | l | L | L | L |
| N | n | N | N | N |
| X | x | X | X | X |
| C | c | C | C | C |
| V | v | V | V | V |
| B | b | B | B | B |
| N | n | N | N | N |
| M | m | M | M | M |
| , | , | ¦ | ¦ | ¦ |
| 1 ! | 1 | ! | ! | ! |
| 2 " | 2 | " | = | = |
| 3 £ | 3 | £ | £ | £ |
| 4 $ | 4 | $ | $ | $ |
| 5 % | 5 | % | % | % |
| 6 ^ | 6 | ^ | < | < |
| 7 & | 7 | & | & | & |
| 8 * | 8 | * | * | * |
| 9 ( | 9 | ( | ( | ( |

*Fig. 6e Cont.*

| KEY: | DUAL LOCK MODE: | | MDP KEYING: | |
|---|---|---|---|---|
| | Default | Shift | Dual | Dual Shift |
| 0 ) | 0 | ) | ) | ) |
| = + | - | + | + | + |
| TAB | TAB | BACKTAB | BACKTAB | BACKTAB |
| [ { | [ | { | { | { |
| ] } | ] | } | } | } |
| : ; | : ; | .. | .. | .. |
| # @ | # | @ | @ | @ |
| ~ | ` | ~ | ~ | ~ |
| V | . | V | V | V |
| ^ | , | ^ | ^ | ^ |
| ? | / | ? | ? | ? |
| — | \ | — | — | — |
| / | / | / | / | / |
| * | * | * | * | * |
| - | - | - | - | - |
| + | + | + | + | + |

*Fig. 6e Cont.*

ENGLISH Language Component Breakdowns and Order of Frequencies

| | |
|---|---|
| Order Of Frequency Of Single Letters | E N A S R I U T O L D C M P V F B G X H Q Y Z J K W |
| Order Of Frequency Of Digraphs | th er on an re he in ed nd ha at en es of or nt ea ti to it st io le i s ou ar as de rt ve |
| Order Of Frequency Of Trigraphs | the and tha ent ion tio for nde has nce edt tis oft sth men |
| Order Of Frequency Of Most Common Doubles | ss ee tt ff ll mm oo |
| Order Of Frequency Of Initial Letters | <space>T O A W B C D S F M R H I Y E G L N P U J K |
| Order Of Frequency Of Final Letters | E<space> S T D N R Y F L O G H A K M P U W |
| One-Letter Words | A, I, |
| Most Frequent Two-Letter Words | of to in it is be as at so we he by or on do if me my up an go no us am |
| Most Frequent Three-Letter Words | the and for are but not you all any can had her was one our out day get has him his how man new now old see two way who boy did its let put say she too use |
| Most Frequent Four-Letter Words | that with have this will your from they know want been good much some time |

FRENCH Language Component Breakdowns and Order of Frequencies

| | |
|---|---|
| Order Of Frequency Of Single Letters | E N A S R I U T O L D C M P V F B G X H Q Y Z J K W |
| Most Common Digraphs | es en nt re on le ou de se an te ai er ne em ed ar ce me it et ie ti el ns ur |
| Most Common Trigraphs | ede les lle que ait eme ion eur ell sse est dan del men des tio ese ans ter ons qui ais ous ent |
| Most Frequent Doubles | ss ll ee nn tt ff cc rr mm pp |
| One-Letter Words | a, y, o |
| Most Common Two-Letter Words | au ce ci de du en et il je la le ma me ne ni on ou sa se si un |

GERMAN Language Component Breakdowns and Order of Frequencies

| | |
|---|---|
| Order Of Frequency Of Single Letters | E N R I S T U D A H G L O C M B Z F W K V P J Q X Y |
| Most Common Digraphs | en ch er ei te ie de ge es in ne st un re be an el di ue se au he it ri tz |
| Most Common Trigraphs | ein ich den der ten cht sch che die ung gen und nen des ben rch |
| Most Frequent Doubles | ee tt ll ss dd mm nn |
| Most Common Two-Letter Words | ab am an da er es ob so wo im in um zu du ja ab |

*Fig. 8*

ITALIAN Language Component Breakdowns and Order of Frequencies

| | |
|---|---|
| Order Of Frequency Of Single Letters | E I A O R L N T S C D P U M G V H Z B F Q J K W X Y |
| Most Common Digraphs | er en re el an on la nt es di ti si al de ra co ta to le li in io ar or |
| Most Common Trigraphs | che ere zio del que ari ato eco edi ide esi idi ero par nte sta men |
| Most Frequent Doubles | ll ss tt ee pp nn bb gg cc |
| One-Letter Words | e a i o |
| Most Common Two-Letter Words | di in ha ho |

SPANISH Language Component Breakdowns and Order of Frequencies

| | |
|---|---|
| Order Of Frequency Of Single Letters | E A O S R I N L D C T U P M Y Q G B H F V J Z K W X |
| Most Common Digraphs | es en el de la os ar ue ra re er as on st ad ai or ta co se ac ec ci ia |
| Most Common Trigraphs | que est ara ado aqu del cio nte osa ede per ist nei res sde |
| Most Frequent Doubles | ee ll rr aa ss cc dd nn |
| One-Letter Words | a e o u y |
| Most Common Two-Letter Words | en la de lo el se |

*Fig. 8 Cont.*

Multi-Press (or Toggle), Translate - (Minimize or Implode), Translate + (Maximise or Explode) MPD Keys, and Trans-Mode keys or buttons.

| Phrase: | Dictionary Type: | Translate | Translate+ | Notes: |
|---|---|---|---|---|
| ruf2c | SMS Texting | ruf2c | are you free to chat | Maximize effect |
| as soon as possible | Abbreviation | asap | as soon as possible | Minimize effect |
| dog | English-French | dog | chien | Language verbatim translation |
| keyboard | Dictionary | keyboard | n. A set of keys, as on a computer terminal, word processor, typewriter, or piano | Normal dictionary providing meaning of words etc. |
| water + carbon dioxide | Chemical | h2o + co2 | water + carbon dioxide | Science oriented |
| gizsum wadda mate | User Defined | gizsum wadda mate | give me some water please | Habitual or behavioural |

Fig. 9

| QWERTY | DVORAK DUAL | DVORAK LEFT | DVORAK RIGHT | MALTRON |
|---|---|---|---|---|
| OF .tv | OF .tv | OF .tv | OF .tv | OF .tv |
| ED .ac. | ED .ac. | ED .ac. | ED .ac. | ED .ac. |
| ON .net | ON .net | ON .net | ON .net | ON .net |
| EN .edu | EN .edu | EN .edu | EN .edu | EN .edu |
| ES .gov | ES .gov | ES .gov | ES .gov | ES .gov |
| RE .mil | RE .mil | RE .mil | RE .mil | RE .mil |
| TH www. | TH www. | TH www. | TH www. | TH www. |
| AT .co. | AT .co. | AT .co. | AT .co. | AT .co. |
| OR .info | OR .info | OR .info | OR .info | OR .info |
| AN .com | AN .com | AN .com | AN .com | AN .com |
| IN .org | IN .org | IN .org | IN .org | IN .org |
| ER .ccode | ER .ccode | ER .ccode | ER .ccode | ER .ccode |
| SPC T .biz | SPC T .biz | SPC T .biz | SPC T .biz | SPC T .biz |
| E SPC .pro | E SPC .pro | E SPC .pro | E SPC .pro | E SPC .pro |
| QU q | @ | ; ; | 5 % | QU Q |
| W | , < | QU Q | 6 ^ | P |
| E | . > | B | QU Q | Y |
| R | P | Y | . > | C |
| T | Y | U | O | B |
| Y | F | R | R | V |
| U | G | S | S | M |
| I | C | O | U | U |
| O | R | . > | Y | Z |
| P | L | 6 ^ | B | L |
| A | A | - | 7 & | A |

Fig. 11

| QWERTY | DVORAK DUAL | DVORAK LEFT | DVORAK RIGHT | MALTRON |
|---|---|---|---|---|
| S | O | K | 8 * | N |
| D | E | C | Z | I |
| F | U | D | A | S |
| G | I | T | E | F |
| H | D | H | H | D |
| J | H | E | T | T |
| K | T | A | D | H |
| L | N | Z | C | , |
| N | :; | @ | 9 ( | ? |
| X | QU Q | X | 0 ) | J |
| C | J | G | X | G |
| V | K | V | ., | E |
| B | X | W | L | J |
| N | B | N | N | J |
| M | M | , | W | W |
| ,< | ,; | ,; | ,; | ,; |
| 1 ! | 1 ! | [ { | 1 ! | 1 + |
| 2 @ | 2 | ] } | 2 | 2 ^ |
| 3 # | 3 £ | / ? | 3 £ | 3 £ |
| 4 $ | 4 $ | P | 4 $ | 4 $ |
| 5 % | 5 % | F | J | 5 ( |
| 6 ^ | 6 ^ | M | L | 6 ) |
| 7 & | 7 & | L | M | 7 & |
| 8 * | 8 * | J | F | 8 @ |
| 9 ( | 9 ( | 4 $ | P | 9 % |

*Fig. 11 Cont.*

| QWERTY | DVORAK DUAL | DVORAK LEFT | DVORAK RIGHT | MALTRON |
|---|---|---|---|---|
| 0 ) | 0 ) | 3 £ | / ? | 0 = |
| - _ | [ { | 2 @ | [ { | { < |
| = + | ] } | 1 ! | ] } | } > |
| TAB | TAB | TAB | TAB | TAB |
| [ { | / ? | 5 % | ; : | ESC |
| ] } | = + | = + | = + | [ * |
| ; : | S | 8 * | K | O |
| @ | - _ | 7 & | - _ | R |
| # ~ | # ~ | # ~ | # ~ | ; : |
| , < | W | , < | V | K |
| . > | V | 0 ) | G | - _ |
| / ? | Z | 9 ( | @ | X |
| \ \| | \ \| | \ \| | \ \| | \ \| |

*Fig. 11 Cont.*

| | | | | | |
|---|---|---|---|---|---|
| Next | generation | of | adaptive | intelligence | interfaces |
| Nextel | day | delivery | forward | thinking | meeting |
| | time | will be | meet | proposal | dinner |
| | step | statistics | for | 10:10am | morning |
| | level | we | the | way | for |

HUMAN-TO-COMPUTER INTERFACES

CROSS REFERENCE TO RELATED APPLICATIONS

The present application claims priority to Great Britain Patent Application No. 0406451.5, filed Mar. 23, 2004, which application is incorporated herein fully by this reference.

The present invention relates to human-to-computer interfaces and particularly, but not exclusively, to an interface system and data input apparatus, both for facilitating a reduction in the number of physical keying events required to create or delete a given data string (i.e. mnemonics, abbreviations, words, sentences, paragraphs etc.) and for providing improved calculator functionality.

The industry standard keyboard layout that possesses a virtually complete monopoly is the QWERTY keyboard. The QWERTY keyboard is a throwback to the days of mechanical typewriters and was designed to maximize the separation of the most frequently used key combinations in order to reduce jamming of the typewriter mechanism. Consequently, the keys that are most frequently used in combination are not arranged with ease of accessibility in mind and productivity is adversely affected.

Alternative keyboard models to the QWERTY layout are available, e.g. the DVORAK and MALTRON® models. These alternatives have sought to overcome the problems associated with QWERTY by respectively re-positioning the most frequently used letters of the English language in the "home row" and by curving the keyboard to fit natural finger movements. Whilst these alternative models have succeeded in increasing typing speed and reducing muscle related fatigue and stress, they have remained in the minority due to the difficulties associated with users relearning or adjusting to an unfamiliar keyboard orientation. Consequently, keyboards have continued to develop predominantly around the familiar QWERTY layout.

No alternative keyboard targeted for either the main (mass) market or specific (niche) markets actually reduces the amount of typing, and to this day, still require the same amount of typing as does a conventional QWERTY keyboard.

The growing demand for rapid data entry into computers and the increase in complex combinations of keystrokes required by modern software applications have been the driving factors behind the development of ergonomic keyboards that maximize user comfort. Several attempts have been made to achieve this goal for both able and disabled users through the appropriate positioning of keys, manipulation of keyboard consoles (i.e. splitting the console into left-hand and right-hand portions) and the implementation of ergonomic contours for comfortable hand and finger placement.

Such improvements to keyboard design have succeeded to a limited extent in improving user comfort but to date have failed to couple this with significant improvements to keystroke efficiency and flexibility. Comfort is a palliative benefit. The only effective way to improve ergonomics and prevent injury is to do less of any activity, e.g. to reduce the amount of keyboard typing.

Computer keyboard drivers are essential in all operating system (OS) environments, their function being to convert keystrokes to OS language tables, thus bridging or translating required notation within all human-to-computer interfaces. It is important to note that the keyboard driver is a critical element to keyboard function and operation.

Conventional keyboard drivers merely map key legends to OS language tables with little or nothing in the way of sophisticated extensions or add-ons to improve performance, versatility and adaptability of the keyboard medium.

According to a first aspect of the present invention there is provided an interface system for a personal computer comprising an array of data input keys having multi-character indicia, said interface system further comprising: data storage means; data processing means; and data display means, wherein the data processing means is adapted to facilitate a reduction in the number of key presses required to create a given data string to less than the number of characters within said data string by:
 (i) filtering data stored within the data storage means by initial character, as determined by the character or characters ascribed to a data input key initially pressed by a user;
 (ii) prioritising said filtered data in real-time according to user-configurable prioritisation parameters; and
 (iii) displaying one or more prioritized data strings on the data display means for subsequent selection by the user.

Preferably, successive key presses act to filter further the number of data strings displayed on the data display means for subsequent selection by the user.

Preferably, the data input keys within the array have multi-character indicia which are selected to accord with a statistical extrapolation of the most used alphanumerical character combinations in a given language, to thus facilitate a further reduction in the number of key presses required to create a given data string.

Preferably, the data input keys having multi-character indicia are composite keys having at least primary and secondary indicia corresponding to primary and secondary key-values or key-functions.

Preferably, the data storage means is defined by one or more data dictionaries in which qualitative and/or quantitative information is stored in relation to each data string.

Preferably, a configuration means is provided to allow a user to selectively enable or disable physical interactivity reduction characteristics of the interface system which facilitate a further reduction in the number of key presses required to create a given data string.

Preferably, the physical interactivity reduction characteristics are selectable from the group comprising:
 (i) entering a space after selection of a data string;
 (ii) limitation of displayed data strings to those having a total number of characters greater than the number of key presses;
 (iii) expanding typed or selected mnemonics, abbreviations or acronyms into their corresponding full data strings;
 (iv) performing two-way translations between data strings and user-configurable dictionary definitions or descriptions.
 (v) enabling the selection of a secondary key-value or key-function by means of double-pressing a data input key;
 (vi) enabling the selection of a different data string stored within the data storage means upon each of a multiple number of presses of a data input key up to n times, said data string having an initial letter or letters corresponding to the key-value of that key; and
 (vii) enabling the right-to-left and/or left-to-right deletion of n characters, words, sentences or paragraphs by means of a single key press.

Preferably, the secondary key-value or key-function obtained by double pressing a data input key is identical with the SHIFT value of that key.

Preferably, each double-press must be completed within a predetermined period of time in order to select the secondary key-value or key-function.

Preferably, the secondary key-value corresponds to the secondary indicia of a composite key having multi-character indicia.

Alternatively, the secondary key-value corresponds to a capitalized conventional key-value.

Alternatively, there is provided at least one function key operable in combination with a composite key and adapted to access the secondary key-value or key-function.

Preferably, once successive multiple presses of a data input key cycle through all data strings retrieved from the data storage means, a further press loops back to the first data string.

Preferably, the ability to select a different data string stored within the data storage means by means of multiple presses of a data input key is disabled upon pressing of the SPACE key, or another non-character key.

Optionally, the length of the data string selectable by each successive multiple press is at least n+1 characters in length.

Preferably, the data strings selectable by each successive multiple press are actively prioritized within the data storage means according to frequency of inputting or selection.

Preferably, the multiple-press functionality overrides the double-press functionality if both are enabled simultaneously by a user.

Preferably, the configuration means also allows a user to selectively adjust the prioritisation parameters according to the desired qualitative and/or quantitative characteristics of the data stored within the, or each, data dictionary.

Preferably, the qualitative and/or quantitative information comprises statistical and/or probability information relating to each data string stored within the data storage means.

Preferably, all qualitative and quantitative information is dynamically updated in real-time.

Optionally, the data processing means maintains lookup chains between two or more data dictionaries such that a given data string in a first data dictionary is mapped to a data string or strings in one or more other data dictionaries for selection by the user.

Preferably, where a given data string in a first data dictionary is mapped to a plurality of data strings in one or more other data dictionaries, said data strings are prioritized via the configuration means for ease of selection by the user.

Preferably, the mapping is performed dynamically.

Optionally, the data processing means maintains associative links between any given data string and up to n other data strings to thus display or project the most relevant longer data string comprised of n+1 data strings for selection by the user.

Optionally, a plurality of the most relevant longer data strings are made available or displayed in a prioritized list for selection by the user.

Optionally, selection of a longer data string induces a repetition of associative linking such that a further one or more relevant longer data strings are displayed for selection by the user.

Preferably, the relevance/prioritisation of the, or each, longer data string is determined according to statistical and/or probability information stored within the, or each, data dictionary.

Preferably, statistical information relates to the historical inputting and/or selection of data strings.

Preferably, the historical inputting and/or selection information can be one or more of the following: (i) frequency of inputting; (ii) frequency of selection (iii) character length; (iv) lexical pattern density; and (v) chronological weighting.

Preferably, probability information can be one or more of the following: (i) occurrence and/or association ratios of two or more data strings within a longer data string; (ii) context ratios determining the likelihood of a given data string being grouped with one or more other data strings to determine the context of a longer data string.

Optionally, the data processing means can selectively bypass or reset the dynamically updated qualitative and quantitative information.

Preferably, the one or more data strings displayed on the data display means for subsequent selection by the user are displayed in list format in descending order of priority.

Preferably, synchronization of data dictionaries between two or more personal computers can be accomplished by means of wired or wireless connectivity.

Alternatively or additionally, synchronization of data dictionaries between two or more personal computers can be accomplished by means of downloading from a common database.

Preferably, the, or each, data dictionary is manually populated.

Alternatively, the population of each data dictionary with data and its corresponding qualitative and/or quantitative information may be accelerated by uploading onto the data storage means data strings resident on a personal computer or a remotely connected device.

Alternatively, the dictionaries are populated by optically scanning external data strings by means of scanning apparatus.

According to a second aspect of the present invention there is provided data input apparatus for a personal computer comprising an array of data input keys having multi-character indicia, said apparatus adapted to facilitate a reduction in the number of key presses required to create or delete a given data string to less than the number of characters within said data string.

Preferably, the multi-character indicia comprise a combination of alphabetic characters.

Preferably, the multi-character indicia include diagraphs.

Alternatively or additionally, the multi-character indicia include tri-graphs.

Alternatively or additionally, the multi-character indicia include tetra-graphs.

Preferably, the keys within the array are arranged such that the most frequently used multi-character combinations in a given language are positioned closest to the home keys.

Preferably, the keys having multi-character indicia are composite keys having at least primary and secondary indicia.

Preferably, the keys having multi-character indicia are provided substantially centrally on a QWERTY keyboard having home keys F and J, respectively.

Alternatively, the keys having multi-character indicia are provided on a DVORAK or MALTRON® keyboard.

Optionally, the array of keys are represented on a graphical touch screen.

Preferably, the multi-character indicia on the graphical touch screen are dynamically updated in real time such that the multi-character combinations keyed most frequently by a user are positioned closest to the home keys.

According to a third aspect of the present invention there is provided data input apparatus for a personal computer having calculator functionality, said apparatus comprising an array of conventional numerical and calculator operator keys, a plurality of calculator control-keys and display means located on the input apparatus, wherein said control-keys are operable in combination with said calculator operator keys and/or said numerical keys to: (i) selectively send calculator-related key values to a computer; and (ii) selectively perform mathematical calculations and display the results of said calculations on the display means and/or send said results to a computer.

Preferably, the calculator operator key values are selectable from the group comprising ., +, −, /, *, %, √, +/−, C/AC, MKUP, SEND and ENTER.

Preferably, the calculator control-keys can toggle between activated and deactivated states.

Preferably, the calculator control-keys comprise: (i) a first control key for selectively displaying the results of calculations performed using the array of numerical and calculator operator keys on the display means; and (ii) a second control key for selectively sending the results of calculations performed using the array of numerical and calculator operator keys to a computer.

Preferably, the second control key is the SEND key which, when pressed, acts to send the value displayed on the display means to the computer.

Preferably, by pressing the ENTER key, the calculator performs the most recent calculation and updates the display means accordingly without sending same to the computer.

Preferably, when both the first and second control keys are in deactivated states the conventional numerical and/or calculator operator key values themselves are sent to a computer without performing mathematical calculations.

Preferably, the apparatus is provided with a retention buffer, which holds a calculation history of n most recent numeric entries, operators and equated values.

Preferably, the retention buffer allows a user to regress, recur and/or rectify calculations from any previous point within the buffer history.

According to a fourth aspect of the present invention there is provided data input apparatus for a personal computer comprising an array of data input keys, said apparatus adapted to facilitate a reduction in the number of key presses required to create a given data string to less than the number of characters within said data string; and wherein the apparatus comprises one or more function-lock keys that are selectable by a user to lock the functionality of the data input keys in one of two modes to maintain said selected mode until a subsequent de-selection of said function-lock key by the user.

Preferably, the function lock keys are chosen from the group comprising: ALT Lock, CTRL Lock, SEQ Lock and DUAL Lock.

Preferably, the SEQ Lock key allows the selection of secondary key-values by means of sequential as opposed to simultaneous key presses.

According to a fifth aspect of the present invention there is provided an interface system for a personal computer comprising data input apparatus according to the second aspect.

Embodiments of the present invention will now be described, by way of example only, with reference to the following drawings in which:

FIG. 2d is a table listing the physical features of the keyboards of FIGS. 2a and 2b;

FIG. 3 is a list of Internet regulated top-level domain (TLD) country codes;

FIG. 4 shows three examples of internet URL addresses typed using the composite keys shown in FIG. 2c;

Figure 2A:
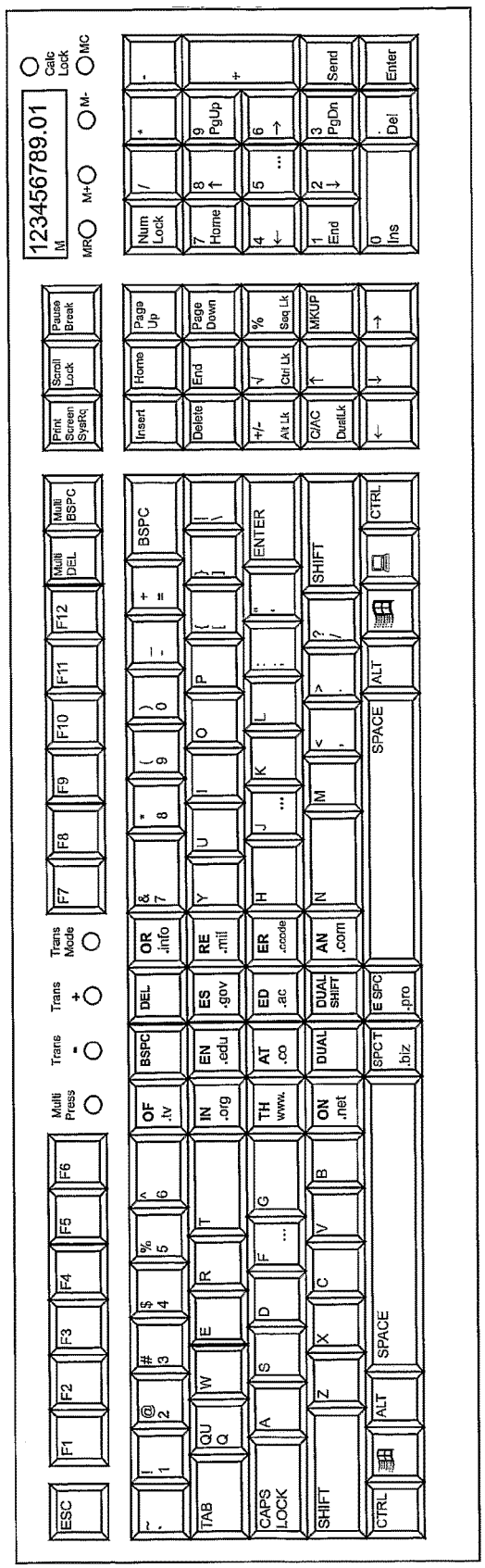
FIGS. 2a and 2b are plan views of an example keyboard according to the second and third aspects of the present invention.
Figure 2B:
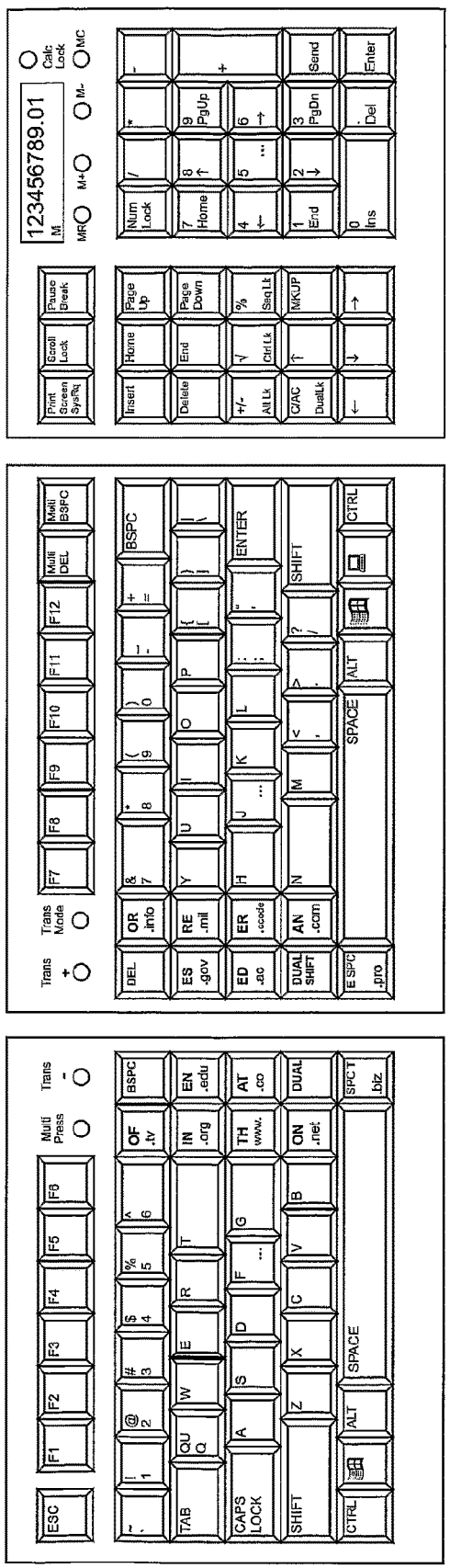
Figure 7:
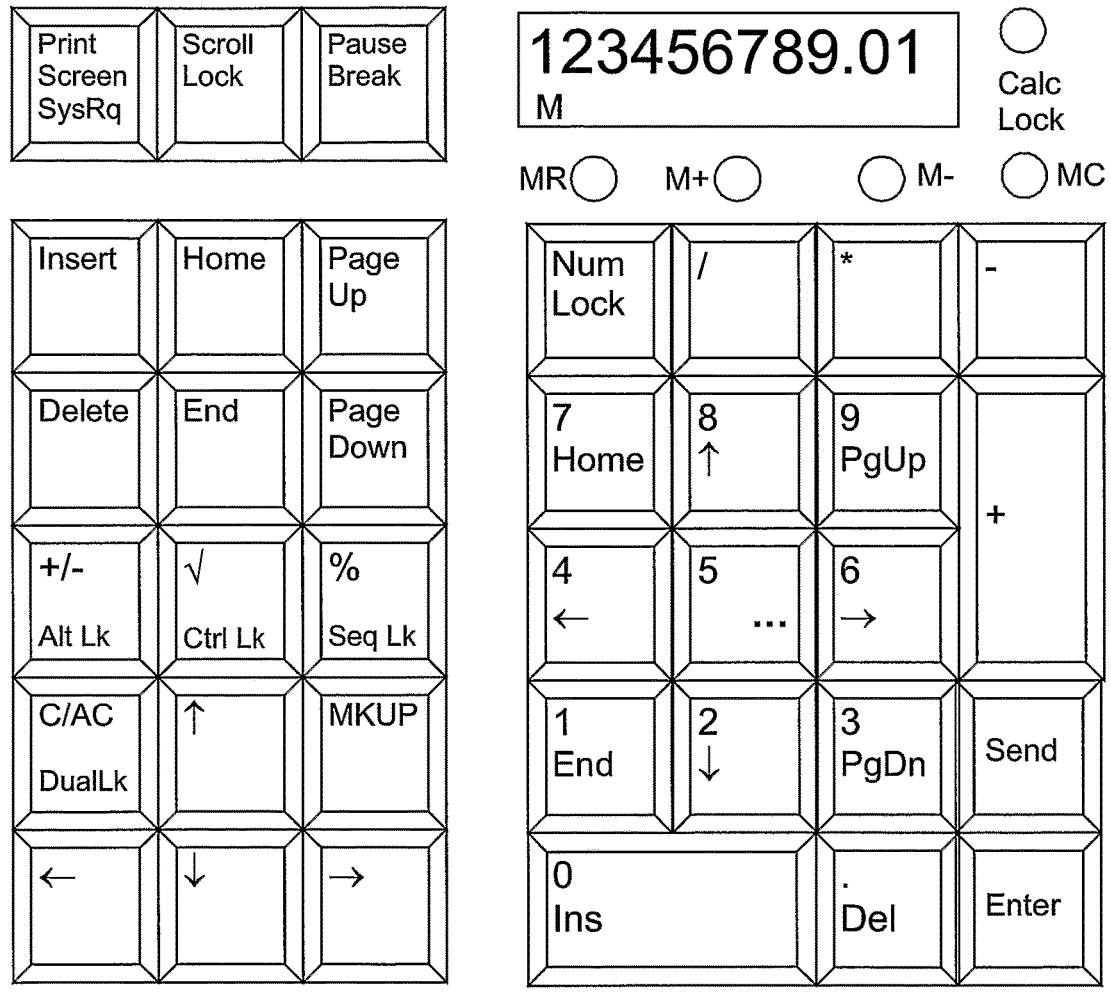
Figure 10:
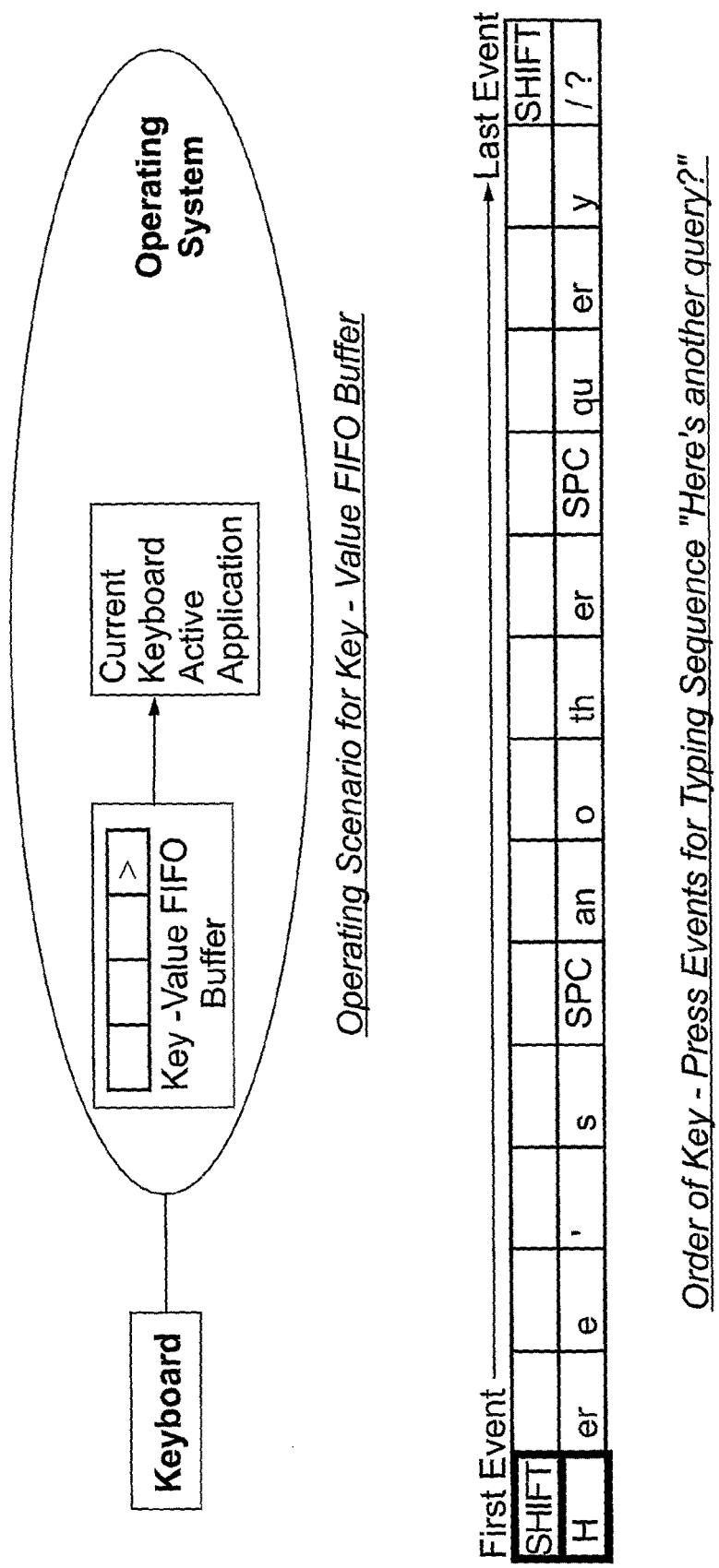
Figure 10:
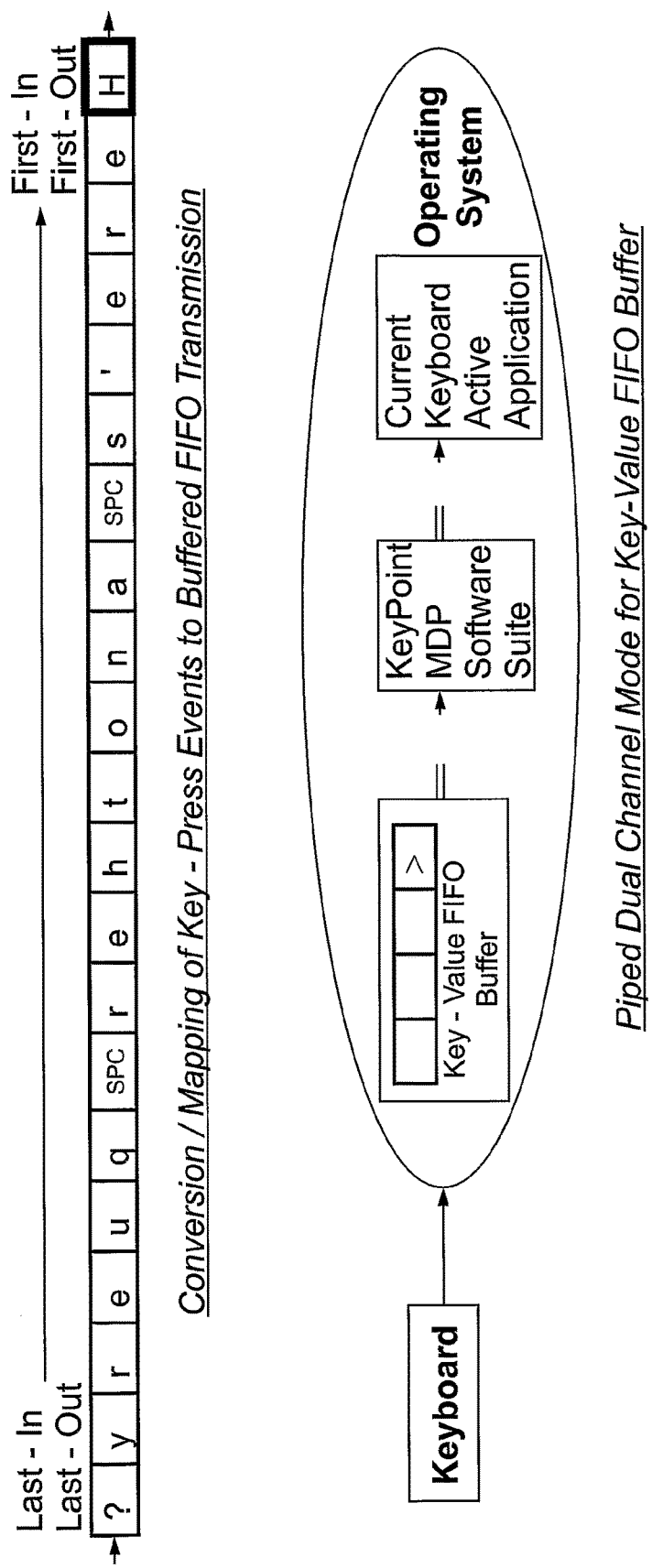
Figure 14:
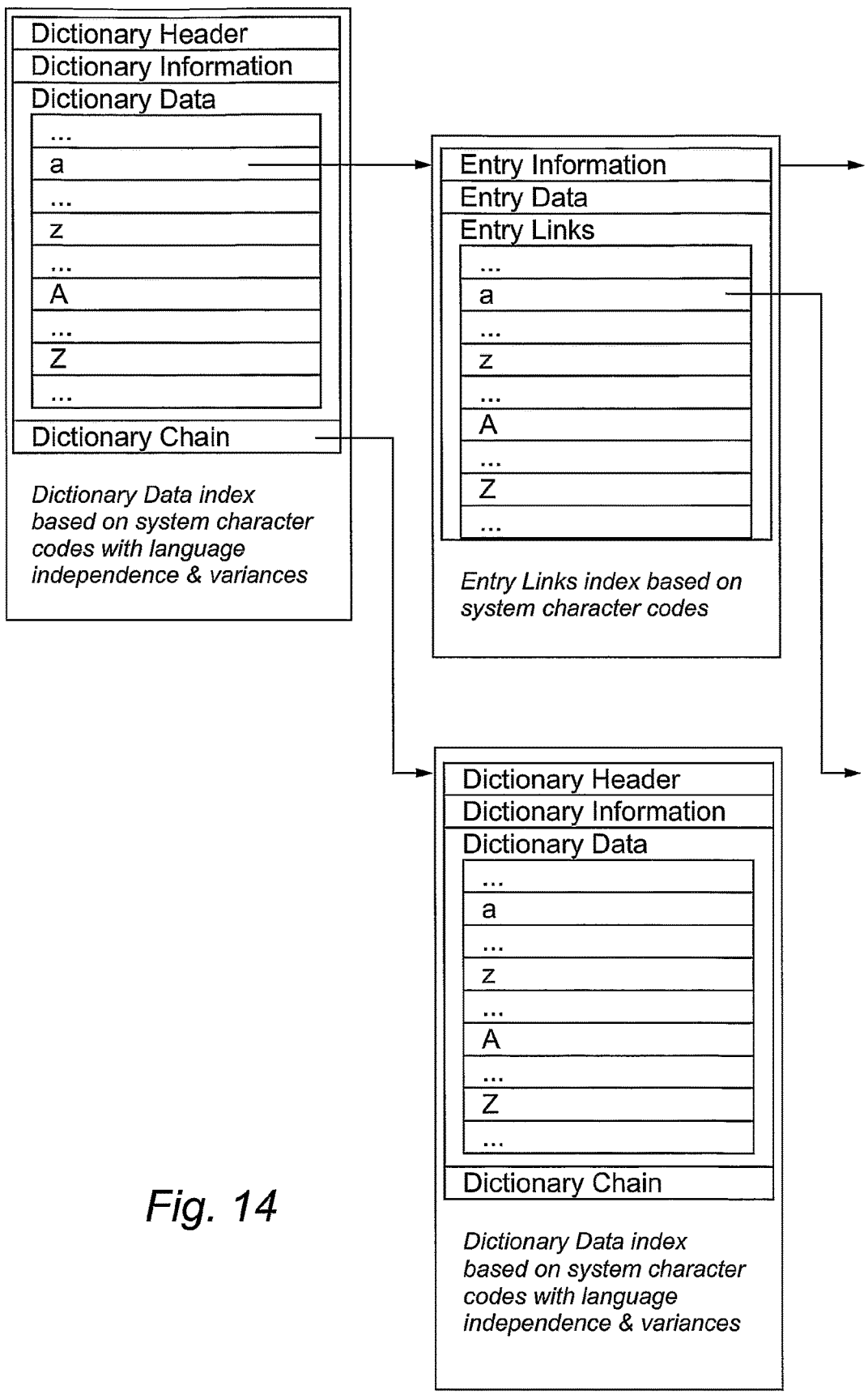
Figure 14:
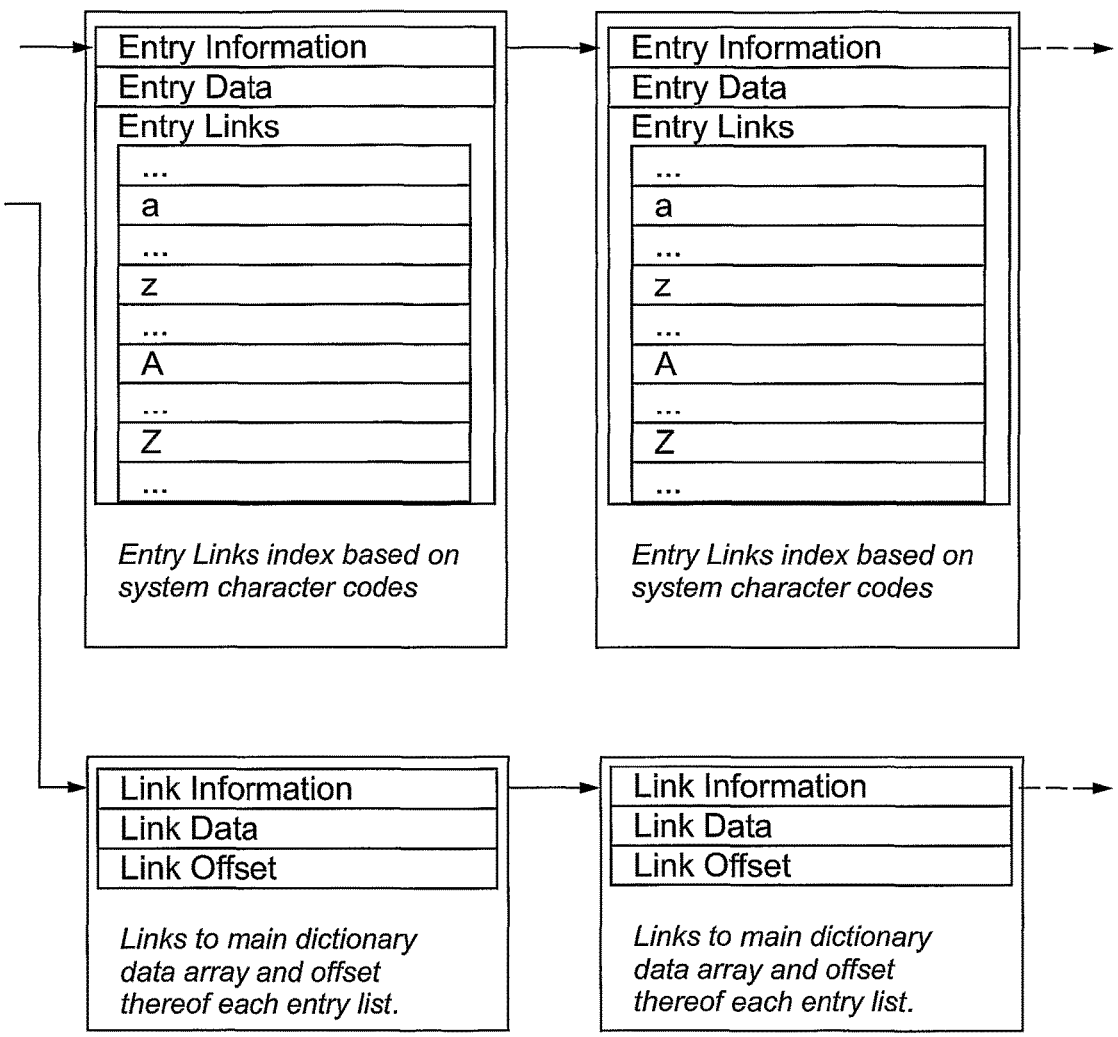

FIGS. 5a-i are graphs showing statistical information relating to the most frequently occurring words and lexical fragments in the English language;

FIGS. 6a-e are tables depicting first and second composite key configurations respectively of the keyboards shown in FIGS. 2a and 2b;

FIG. 7 is a plan view of a calculator portion of the keyboards shown in FIGS. 2a and 2b according to the third aspect of the present invention;

FIG. 8 is a table showing examples of statistical extrapolations of the most commonly occurring language components for the English, French, German, Italian and Spanish languages;

FIG. 9 is a table showing examples of the manual operations and overrides for multi-press mode, translation mode and forward and backward translations where the latter two translator modes are implemented with given or highlighted text;

FIG. 10 shows two tables illustrating the mapping of key press events in a FIFO buffer;

FIG. 11 is a table illustrating the key-value mappings between various keyboard layouts;

FIGS. 12a-d are plan views of alternative embodiments of the invention having alternative key array arrangements;

FIG. 13 shows an example table of associatively linked and prioritized data strings; and FIG. 14 illustrates the chaining of data dictionaries and associative linking.

Figure 15:
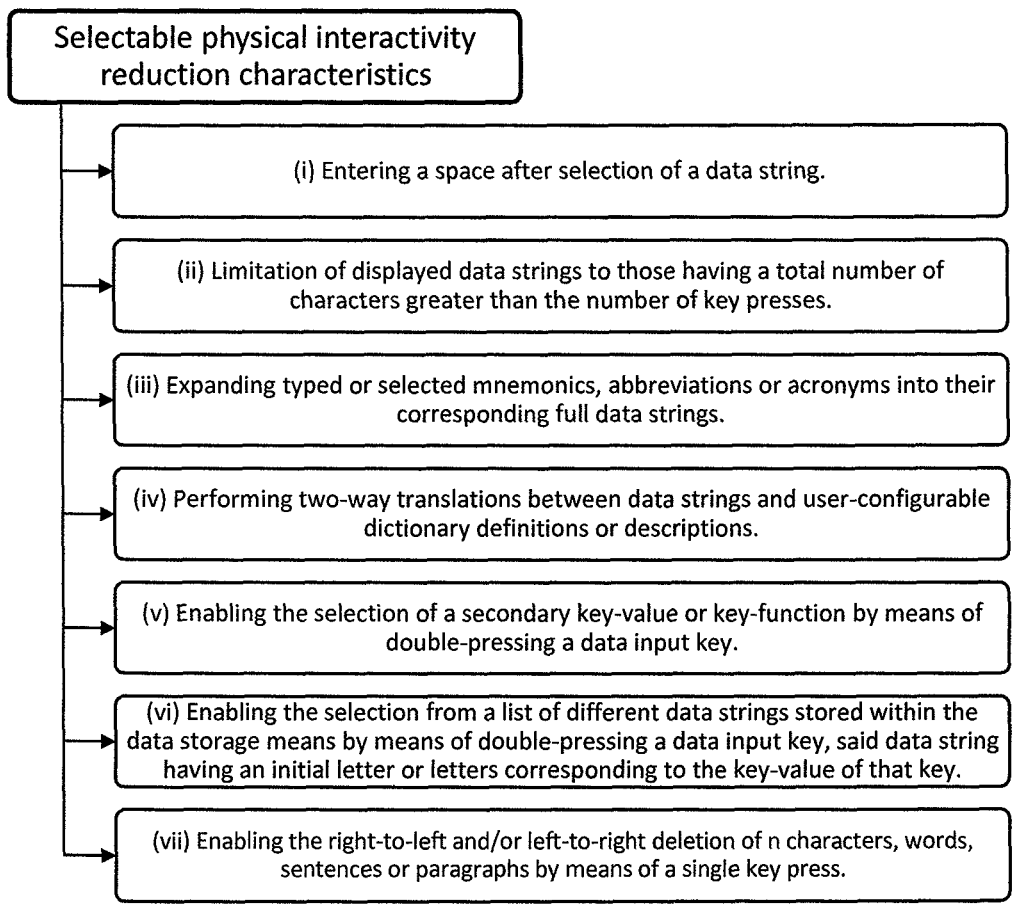

FIG. 15 shows the selectable physical interactivity reduction characteristics.

The present invention is directed to an efficient (productivity), facile (accessibility) and safe (ergonomic) keyboard for single and dual hand, full and limited dexterity, and right or left hand orientation users as a Multi-Dexterous Productivity keyboard system, which among its aims includes: (i) the effective reduction of key-stroking/typing, thereby (ii) increasing efficiency (productivity), (iii) increasing ease of use (accessibility), (iv) increasing safety (ergonomics), and (v) reducing ailments associated with keyboard use.

Figure 1:
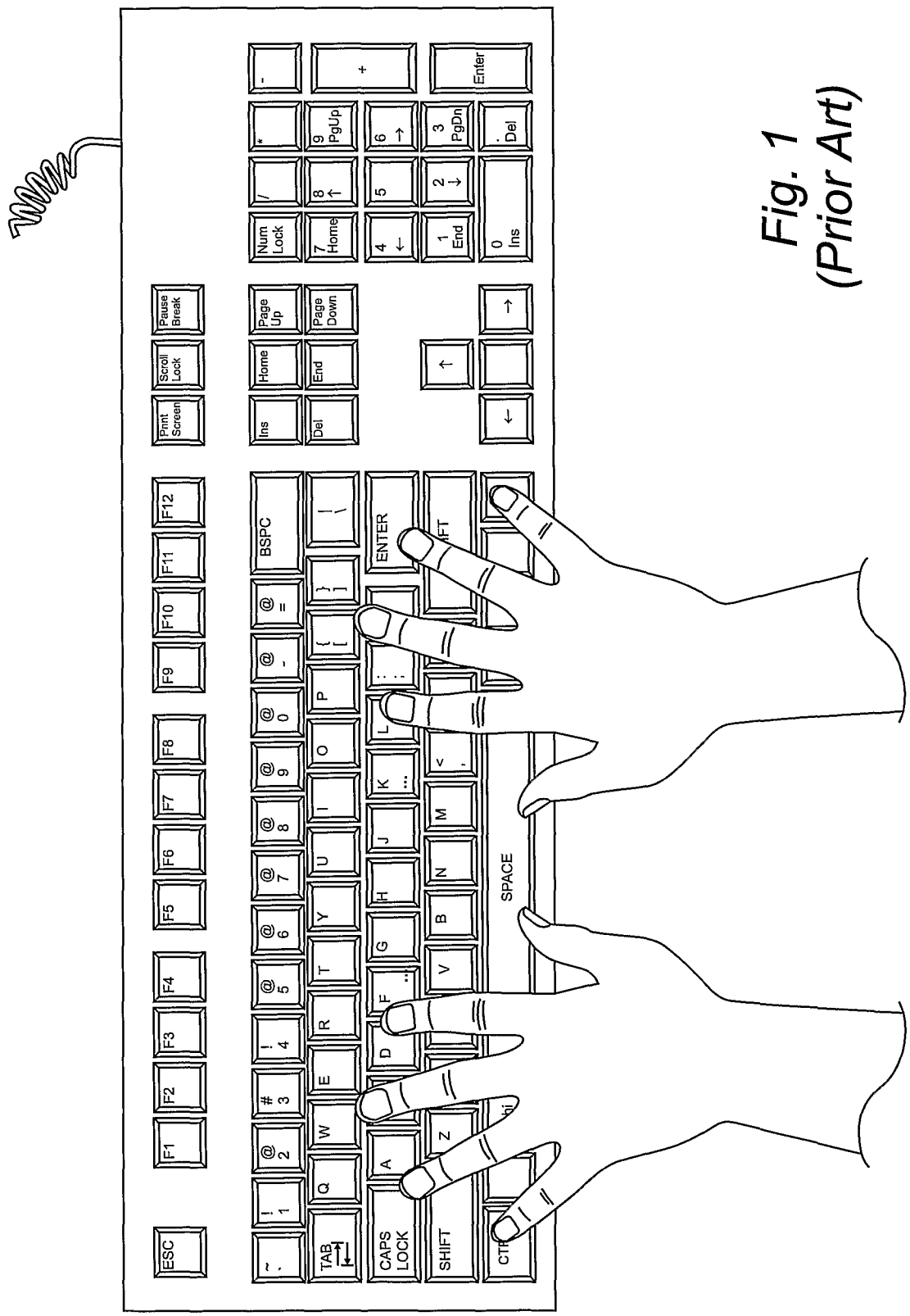
FIG. 1 is a perspective view of a conventional computer keyboard.

FIG. 1 shows a conventional keyboard according to the QWERTY layout standard. The keys are arranged in straight rows with a user's hands shown to illustrate the natural position of the fingers in a relaxed typing position. The tips of the fingers form a natural arc with respect to the keyboard by virtue of the differing lengths of the fingers and thumb of each respective hand. To conform to straight rows of keys of the key board, fingers are forced to be held in an unnatural position while poised over the row of conventionally designated "home keys". This unnatural position causes significant hand discomfort from repetitive key strikes and makes touch-typing more difficult due to the tendency of the fingers to stray or extend from the home row of keys. Thus, the conventional straight line of home keys is a source of ulnar deviation and pronation both of which are causes of Repetitive Strain Injuries (RSI) for regular keyboard users.

A basic keyboard of a personal computer, whether physical or graphically represented, can include further keys that permit a direct reduction in a user's physical interactivity with the device using the fundamentals of etymology. These additional keys provide a means to input diverse patterns based on language or graphics and represent particular lexical fragments or basic components of such languages or graphic systems.

Core lexical components or data string fragments combine to create larger data strings. The phrase "data string" and "character string" are interchangeable throughout the specification unless the context requires otherwise. Similarly, depending upon the context, the term "sub-data string" or "truncated data string" may refer to letters or lexical fragments within a word, or a word within a phrase or sentence, mnemonics, abbreviations, acronyms etc.

For any given language, its core lexical components (letters, numbers and symbols) and its most occurring character string fragments can be used to create larger complete character strings that become contextual by representing meaningful words, phrases, sentences, paragraphs and fuller texts. Such patterns can include the most frequently occurring diagraphs (two-letter combinations forming a single lexical unit, e.g. TH, ER, EN, AN etc.), tri-graphs (three-letter combinations forming a single lexical unit, e.g. ENT, LLY, TCH, ATE etc.), tetra-graphs (four or more letter combinations forming a single lexical unit, e.g. TIVE, ALLY, MENT, ENCE etc.) and sym-graphs (emoticons, e.g. :-) for smiley etc.). The same principles apply to graphic systems by using common and simpler abstract patterns to generate larger, more complex graphic patterns. Those fundamental components occurring with the most frequency in any given language are most useful as key legends or indicia.

The lower the length or size of these core lexical components, the greater their simplicity and the more amplified their cognitive coherence. Cognitive coherence measures a character string's diversity, versatility and breadth of contextualisation in terms of reusability and/or its ability to build larger character strings easily and repeatedly. Letters, numbers and symbols have the highest cognitive coherence since they represent the basic lexical/numerical components and building blocks for any given language. Words, phrases, sentences and fuller texts have lower cognitive coherences the higher one goes up this chain. Digraphs have a particularly high cognitive coherence since they are practically at the bottom of the chain, having a similar cognitive coherence to that of letters. Digraphs can be loosely coupled with other letters and patterns to create larger more meaningful character strings, semantics and contexts.

The use of diagraphs, tri-graphs and tetra-graphs provide easy acclimatization toward their use because of their high cognitive coherences; i.e. they are easily recognizable and easy to place within larger patterns during the construction of meaningful words, phrases, sentences and fuller texts within any context or semantics. Digraphs, tri-graphs and tetra-graphs also reduce the amount of physical interactivity by facilitating a reduction in the number of key presses required to create a given character string. This may be achieved by eliminating key-presses by means of providing data input keys (either physical or graphically represented) having multi-character indicia which correspond with a statistical extrapolation of the most used alphanumerical character combinations (i.e. Letters, numbers and symbols) in a given language by the user.

Modified QWERTY keyboards according to the present invention are shown in FIGS. 2a and 2b.

Advantages of the keyboards of the present invention include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the personal computer itself. Comfort is a palliative benefit. The only effective way to improve ergonomics and prevent injury is to do less of any activity, e.g. reducing the number of key presses involved in typing.

The keyboards and interface system of the present invention improve the overall user experience and interactivity with a personal computer. The apparatus can be used independently of the interface system that forms a first aspect of the present invention (described in detail below), or for maximum benefit, both the keyboards having keys with multi-character indicia and the interface system may be used in combination.

The keyboards of the present invention are arranged with a particular symmetry that enables them to be easily split into three segments (as shown in FIG. 2b) to provide greater flexibility in approach and comfort, thus further enhancing ergonomics. Here, the first split would tend to be between the central two columns of the keys having multi-character indicia (described in detail below) and the other split would tend to be between the main keyboard section and the numeric/calculator section. This applies to all configurations of the keyboard according to the present invention.

Figure 2C:
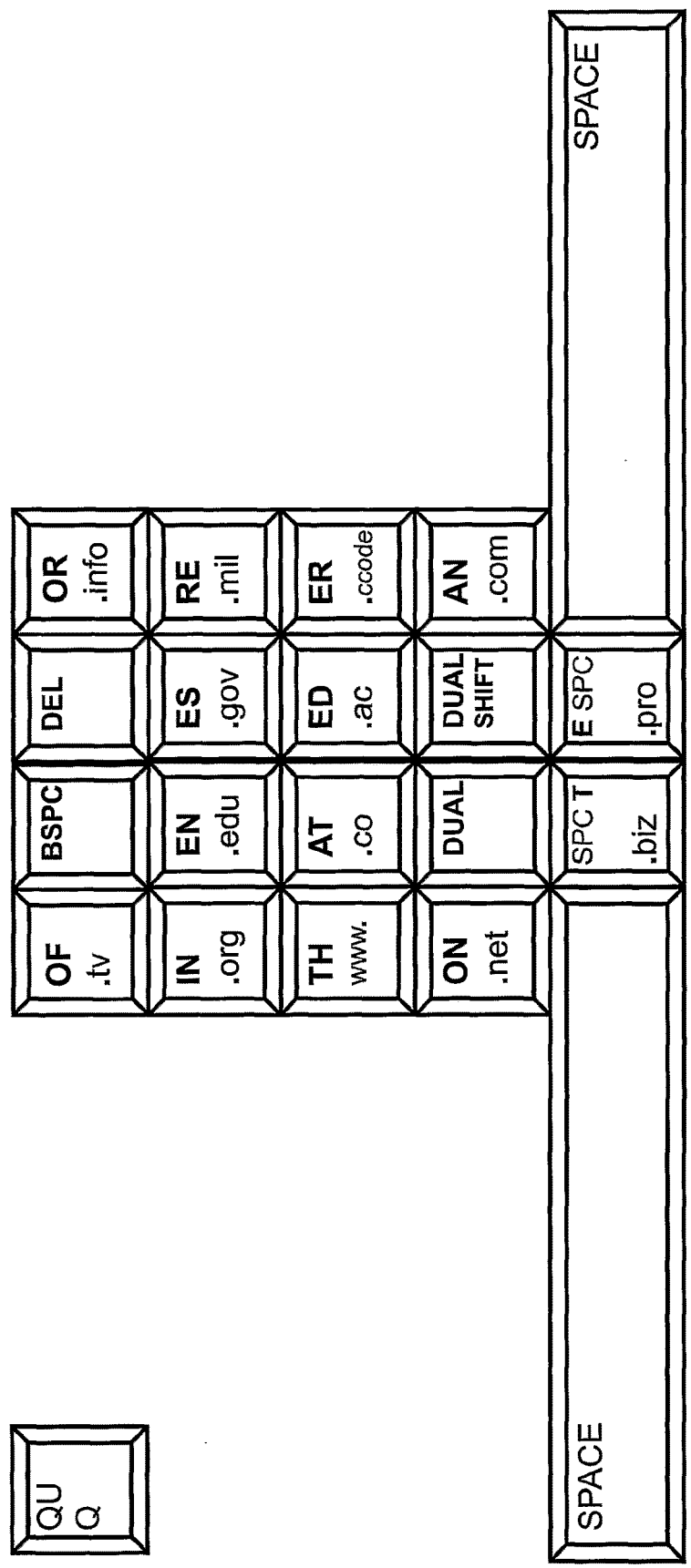
FIG. 2c shows the substantially centrally located keys having multi-character indicia of FIGS. 2a and 2b in isolation.

The keyboard comprises an array of keys having multi-character indicia, shown in isolation in FIG. 2c, arranged substantially centrally between the home keys F and J. The keys within the array are composite keys having at least primary and secondary indicia arranged such that the most frequently used multi-character combinations in a given language are positioned closest to the home keys.

It will be appreciated that the keys having multi-character indicia could equally be provided on a DVORAK or MAL-TRON® keyboard or on an array of keys represented on a dynamically updated graphical touch screen which repositions the multi-character combinations keyed most frequently by a user such that they are positioned closest to the home keys.

Each key within the array of keys having multi-character indicia (hereinafter referred to as MCI keys) has primary and secondary functional indicia disposed on its top surface wherein at least the primary functional indicia is statistically extrapolated (discussed below in more detail with reference to FIGS. 5a-i).

The primary form of functional indicia on each composite productivity key shown in FIGS. 2a and 2b are in the form of diagraphs. However, it will be appreciated that other forms of primary functional indicia are possible and may be in the form of at least one of: characters (single letters, tri-graphs, tetra-graphs), words, word groups and/or special commands all of which serve to alleviate the recognized problem of repetitive key strikes and/or alleviate excessive redundancy, repetitive typing and/or optimize typing productivity based on the most commonly used characters, words, word groups and special functional commands of any given language including (for example, English by default, French, German, Italian Spanish and other EU and international languages).

Each diagraph is selected using the results of a statistical data study of the most commonly used words in the English language. The statistical data study has shown that the following diagraphs (i.e. coupled letters) occur most commonly in the English language: OF, OR, IN, EN, ES, RE, TH, AT, ED, ER, ON and AN. In view of the fact that the Q key is rarely used singularly (according to the statistical studies discussed below) but is often paired with the letter U, a QU diagraph key is provided. However, since this diagraph is less common than the others are, it is not included in the central productivity key array and retains the position of the conventional Q key.

In an alternative embodiment (not shown), each set of characters, words or word groups are taken from a statistical data study of the most commonly used tri-graphs (i.e. three-character combinations) such as QUE, QUA, QUI, THE, ETH, ITH, ION, ONE, TEN, ENT, END, ENV, FOR, TOR, TER, FER, GER, BER, INT, INY, REY, REG, GED, EDY, AND, ANY, ANI, etc. Experimentation has shown that the use of productivity keys using diagraphs and tri-graphs can reduce multiple keystrokes by up to approximately 30%.

Furthermore, the composite productivity keys shown in FIGS. 2a and 2b have secondary indicia of the most used special software application based commands, acronyms and/or mnemonics, by default Internet Top Level Domains (TLD) (i.e. ".tv", ".info", ".org", ".edu", ".gov", "mil", "www.", ".co", ".ccode", ".net" and ".com").

These TLD's are all well known with the exception of the ".ccode" TLD. This secondary key value is user definable during the keyboard driver installation or run-time configuration to correspond with the most commonly used top-level domain (TLD) value. For example, if the keyboard is to be used in the United Kingdom, a user would select the United Kingdom from a list (as shown in FIG. 3) during installation or run-time configuration of the keyboard driver thus assigning the value ".uk" to the ccode key.

The MCI keys are configured to have default linguistic settings that are function key controlled. The primary and secondary productivity key-values are programmable during installation or run-time configuration tools. Whilst in normal mode, the default key-values of the productivity keys shown in FIG. 2c will be the diagraph values. For example, pressing "EN" alone will give "en". Pressing the "SHIFT" function key in combination with key "EN" will produce "EN" in upper case. In Caps lock mode the values summoned would be "EN" and "en" respectively. Further composite keys include DUAL, which accesses secondary key values, and DUAL SHIFT which accesses and shifts on secondary key values. In normal mode the "DUAL" key used in combination with key "EN" summons ".edu" and "DUAL SHIFT" summons ".EDU". Further examples incorporating usage of the .ccode key are shown in FIG. 4.

In the particular example shown in FIGS. 2a, the productivity keys are arranged in substantially the central area of the keyboard in an array comprising two columns, which intersect with two rows in a substantially mutually perpendicular arrangement, each row and column consisting of four productivity keys. The two rows lie adjacent to one another such that the first and fourth keys of the first and second rows intersect with the second and third keys of each column respectively to form an H-shaped array. In other words the first and fourth keys of the first and second rows are shared with the second and third keys of each column.

The H-shaped array means that a single or dual handed user has immediate access to the most commonly used characters and commands at his/her fingertips without unnecessary flexing or extensions beyond conventionally designated home keys. The most used or most frequently occurring MCI keys (derived from any given language statistical extrapolations or of general information) are positioned in order closest to the keyboard home keys F and J. In addition, a user is not presented with the drastic psychological factors of having to relearn how to use an unfamiliar style of keyboard since the familiarity of the QWERTY model is retained and merely modified to improve efficiency and to reduce repetitive key strikes and the like to minimize Repetitive Strain Injuries (RSI).

Additional function keys which are operable in combination with the productivity keys (i.e. the BSPC (Backspace), DEL (Delete), DUAL and DUAL SHIFT keys are added to the array as shown more clearly in FIG. 2c to form an overall array comprising 18 keys (i.e. 4 function keys and 14 productivity keys—excluding the generic QU key but including the <space>T and E<space> keys described below).

The BSPC and DEL keys are well understood and require no further explanation and the DUAL and DUAL SHIFT keys have been described above. However, the "SPC T" and "E SPC" (i.e. <space>T and E<space>) keys are new keys, which contribute to increased typing efficiency. A statistical analysis of the English language has shown that the most common characters that start and end a word in the English language are the letters "T" and "E" respectively (see FIGS. 5b and 5c, respectively). Space (SPC) delimits and/or indicates the start or end of a new word or a previous word respectively. Accordingly, these keys serve to provide a reduction in keystrokes in a similar manner to diagraphs and so are notionally included within the group of MCI keys. These keys have secondary key values .biz and .pro respectively that are accessible using the DUAL keys as described above.

Further functional keys (not shown in the example of FIGS. 2a-c) may also be added to the array. For example, "iBusiness" and "iPersonal" keys are programmable keys via the keyboard driver (during pre and post driver installation). In an alternative example (not shown) these keys replace the BSPC and DEL keys located at the top of the array shown in FIGS. 2-c. The value of the iBusiness key is defaulted to the user's business web site, e.g. www.keypoint-tech.com. The value of the iPersonal key is user-definable and is intended to default to a user's internet home URL setting. During installation or run-time configuration of the keyboard driver these defaults can be amended by the user. URL validation will be made to verify the correctness of the URL format and page access (i.e. the URL is ping-ed). Changing the iPersonal key value will not affect the user's pre-existing internet home URL setting as these are maintained independently of one another. In operation, the keyboard driver will therefore either feed the selected URL value into the internet browser address field (or into any cursor area during cursor/text input mode), or auto-start-up a browser with the selected URL when not in cursor/text input mode.

Yet another pair of functional keys (again not shown in the example of FIGS. 2a-c) can be added to the array. These are the "MULTI DEL" and "MULTI BSPC" keys respectively. Again, these keys contribute towards a reduction in keystrokes by deleting n characters, words, sentences or paragraphs at a time either from left-to-right with MULTI DEL or right-to-left with MULTI BSPC. The user can associate n to characters, words, sentences or paragraphs during keyboard driver installation or run-time configuration.

Optionally, it is envisaged that the MCI keys of the first embodiment could be provided with graphically programmable liquid crystal display (LCD) key-tops (or a touch screen) which are dynamically programmable in real time. The keyboard driver would be adapted to have a two-way channel that dynamically programs the indicia of the keys, or touch screen representations thereof, in real time according to the current software application in use. Alternatively, the user can configure the keys by selecting which indicia should be attributed to each LCD key-top.

It will be appreciated by those skilled in the art that the functionality and layout of the MCI keys will minimize Repetitive Stress Injuries (RSI) such as Carpel Tunnel Syndrome (CTS) and other Cumulative Trauma Disorders (CTD) such as Musculoskeletal Disorders (MSD), Occupational Overuse Syndrome (OOS), Repetitive Motion Injury (RMI), Upper Limb Disorder (ULD), etc. in dual or single handed keyboard users, full or limited dexterity keyboard users and left or right hand oriented keyboard users. The primary difference being that a user now has an optimally arranged set of keys formed with statistically extrapolated indicia or characters and special commands that significantly reduces unnecessary finger extensions and related fatigues beyond a user's hand span. Additionally, workload is reduced thereby reducing or pre-empting stress and/or strain.

Since each language whether English, French, German, etc. has distinct linguistic characteristics inherent to its etymology and principal area of technological or otherwise application of origin, it would be obvious to one skilled in that language to construct special primary commands to provide the necessary functions and language based commands.

In this regard, numerous key orientations are possible, excluding those orientations that minimize typing speed, and detract from preventing repetitive key strikes that can lead to Repetitive Strain Injuries (RSI), and potentially decrease efficiency (productivity). The tables in FIG. 8 show examples of statistical extrapolations of the most commonly occurring language components for the English, French, German, Italian and Spanish languages.

Other defining benefits for other users can be derived by rearranging the inherent factors: key-presses, effort, dexterity, and time that measure efficiency, effectivity and accuracy. This simple exercise provides the foundations to reap 'whatever advantage for who ever'. For example, (i) Time: Military/Critical-path systems; (ii) Productivity: Commercial/Customer services; (iii) Accessibility: Governments/People with disabilities; (iv) Accuracy: Health & Legal/Emergency services; (v) Ergonomics: Trade Unions/Workers injuries; (vi) Growth: Education/Future Markets; and (vii) Change: R&D/Product Diversification etc.

A closer look at statistically extrapolated character, word and/or command data or indicia is shown in FIGS. 5a-i. Through the analysis and weighting of the most common usage in English, lexical fragments such as combinations or subsets of letters, diagraphs, tri-graphs and small words can be extracted. The exclusive union of these categories (frequency, union), filter out duplications of 1 to 3 letters from each respective subset resulting in a compacted optimal mix of combinations that can be used in keyboard design applications to recreate fuller words thereby minimizing repetitive keystrokes and associated injuries. For instance in FIGS. 5a-i, it is shown that the most popular combination of diagraph is TH, for tri-graph it is THE and the most used letter is E. The succinct union of these combinations, in turn are process similarly with other unions and the final remaining contents (superset) listed as the most likely candidates that can be use to reduce key strikes or strokes, repetition and key reaches.

Figure 5A:
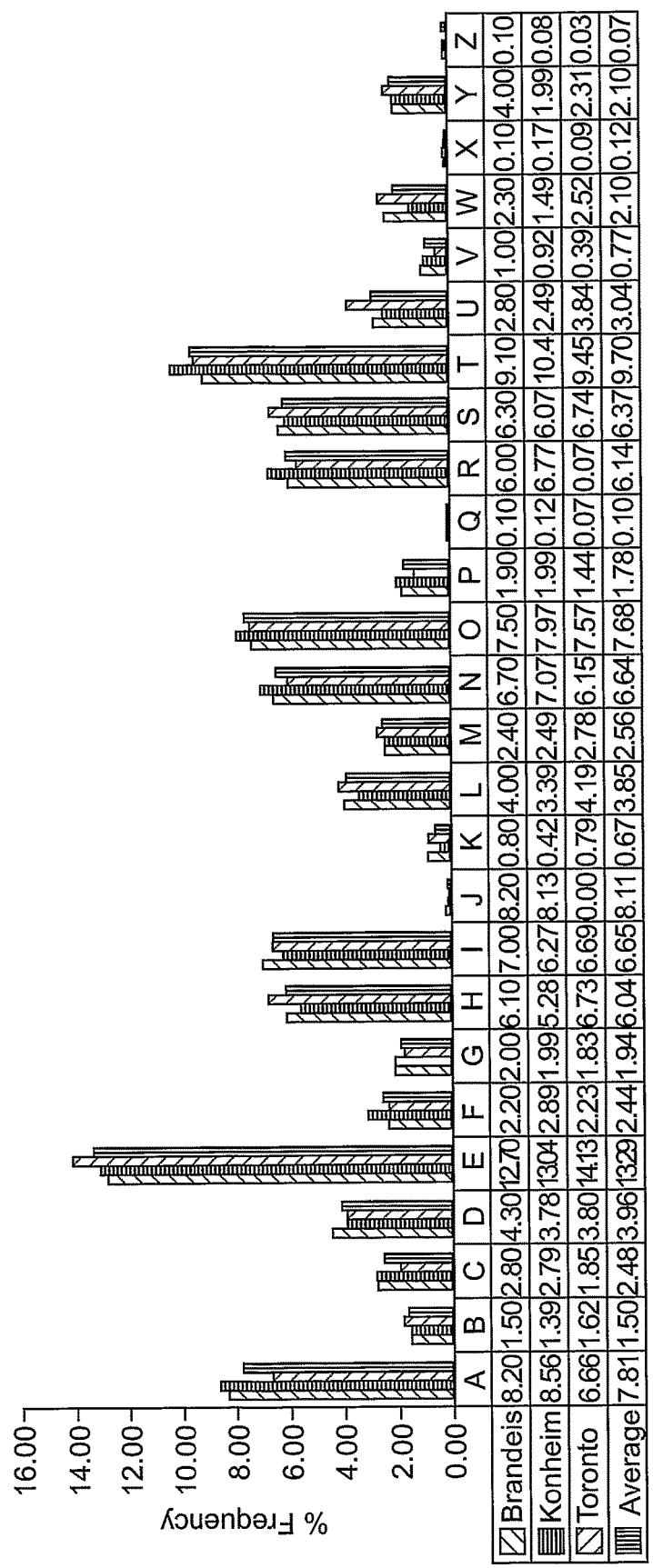
Figure 5B:
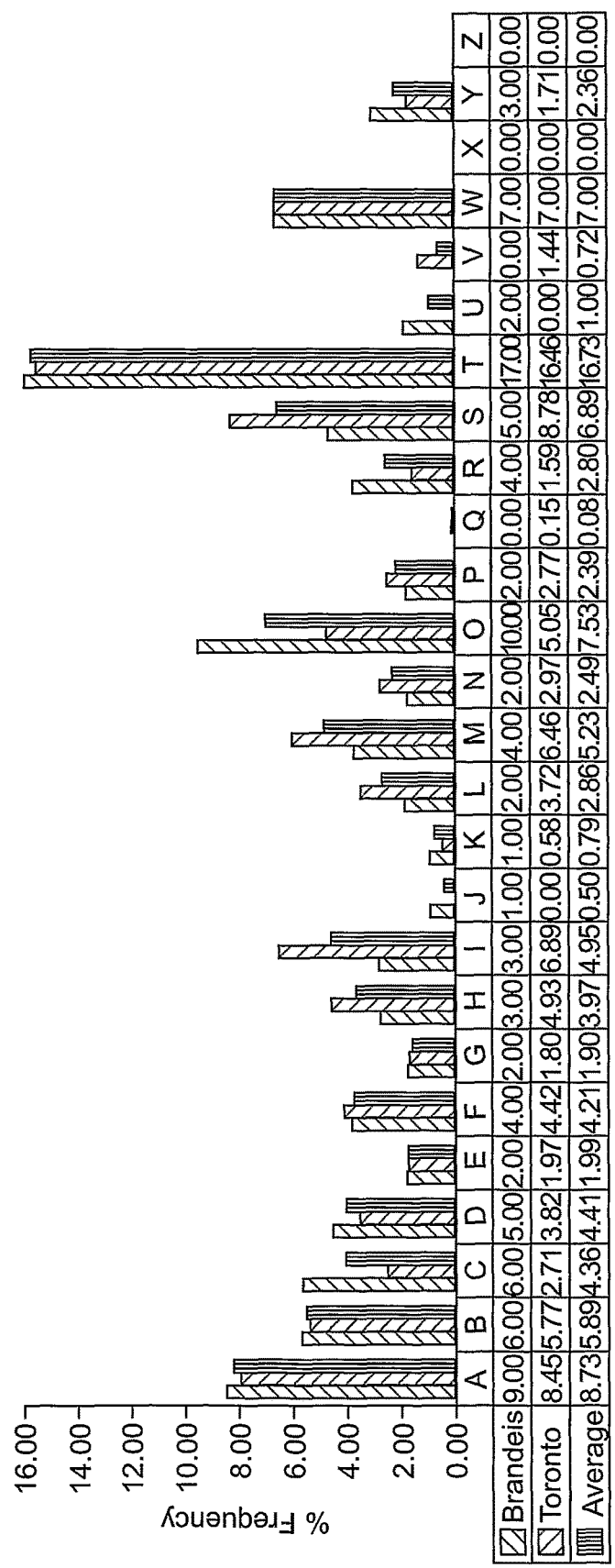
Figure 5C:
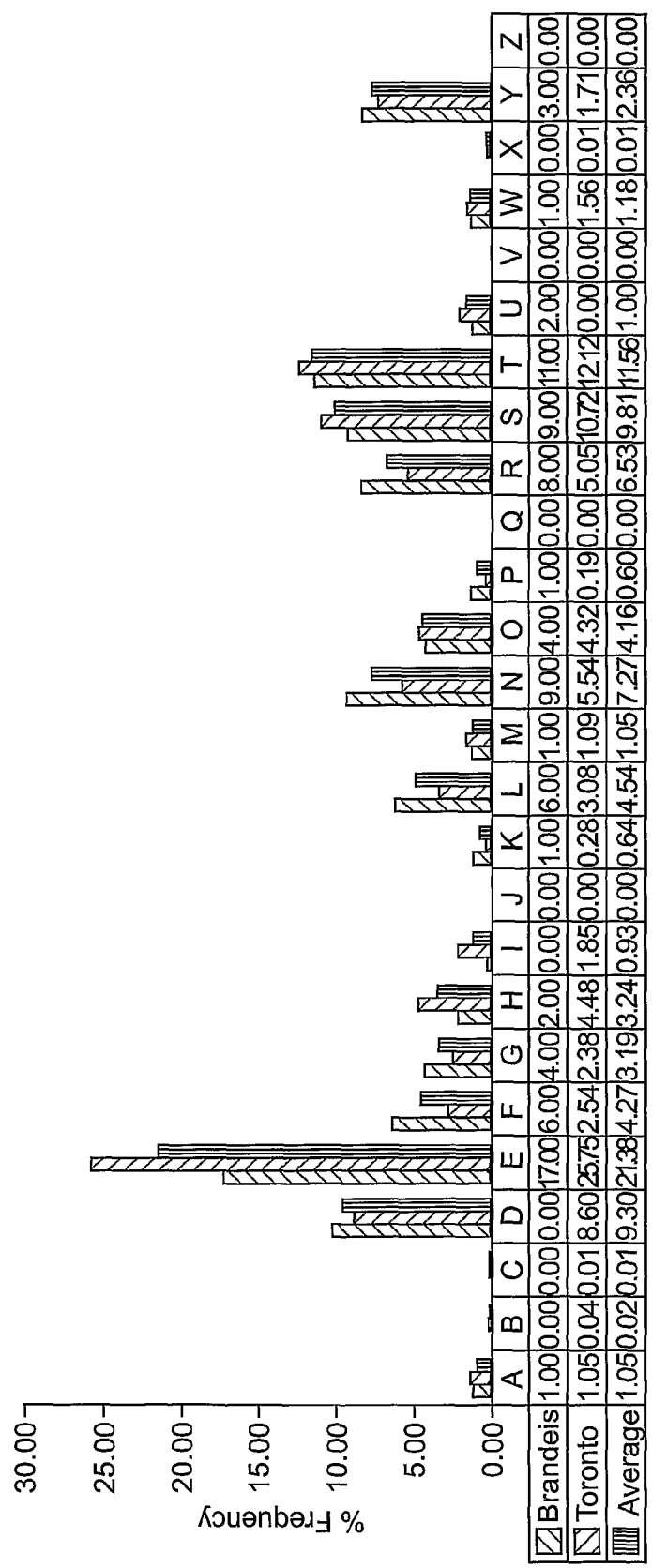
Figure 5D:
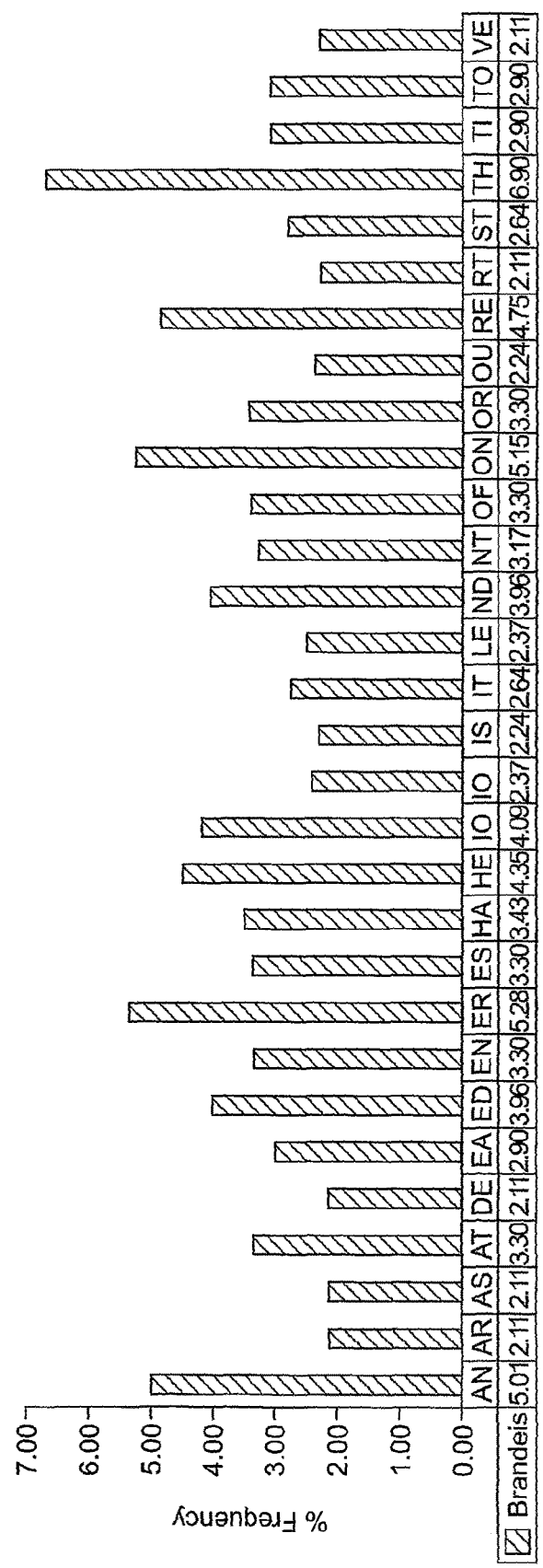
Figure 5E:
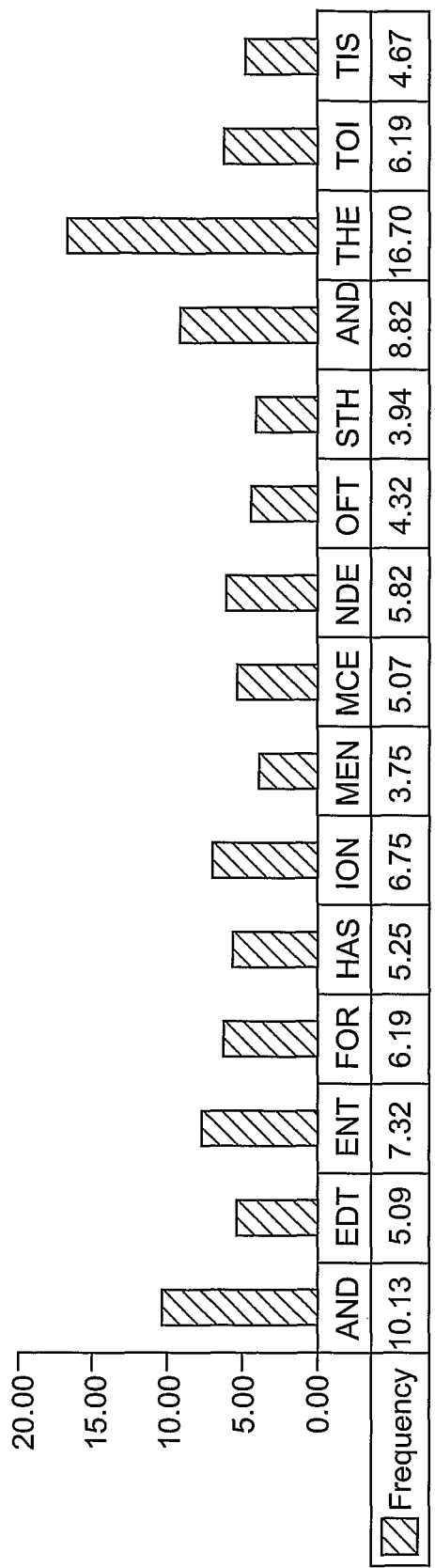

As depicted in FIG. 5a, a table generated from a variety of studies shows the most common weight of letters and there frequency of use. As shown therein the letter E had the highest frequency as the most used letter in the distribution of data. As depicted in FIG. 5b, the table shows the letter T as having the highest percentage frequency of most used letters that start a word. As depicted in FIG. 5c, the table shows that the letter E as having the highest percentage frequency of the most used letters that end a word in English. In order to generate the most effective union of the selective data, a criteria is imposed to systematically eliminate the less frequent letters and leave only the most popular ones. These in turn, are used in the final selection and optimization of a superset. This can be viewed more clearly in the combinations obtained from diagraphs and tetra-graphs depicted in FIGS. 5d and 5e. As shown in the table of FIG. 5e, the three letter word THE is shown as having the highest percentage frequency with AND as next likely candidate for selective combinations. As indicated by the table selecting the most prominent and primary tri-graphs with frequency values greater than 6.10, along with a secondary set with frequency values between 5.00 and 6.10 optimum tri-graph sets can be obtain (e.g. primary set: AND, ENT, FOR, ION, THE, TIO; and secondary set: EDT, HAS).

Figure 5F:
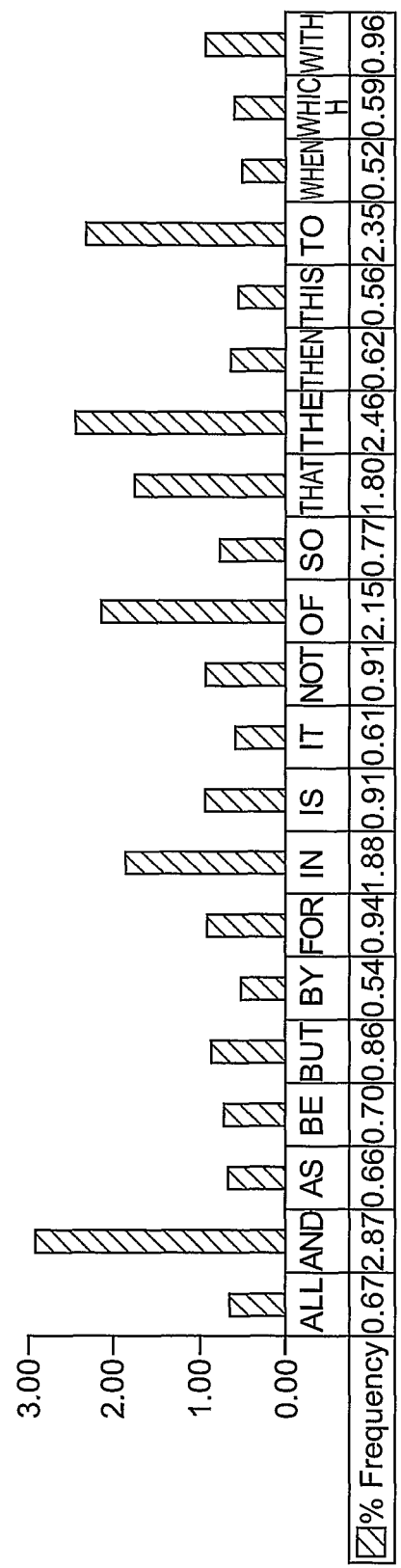
Figure 5G:
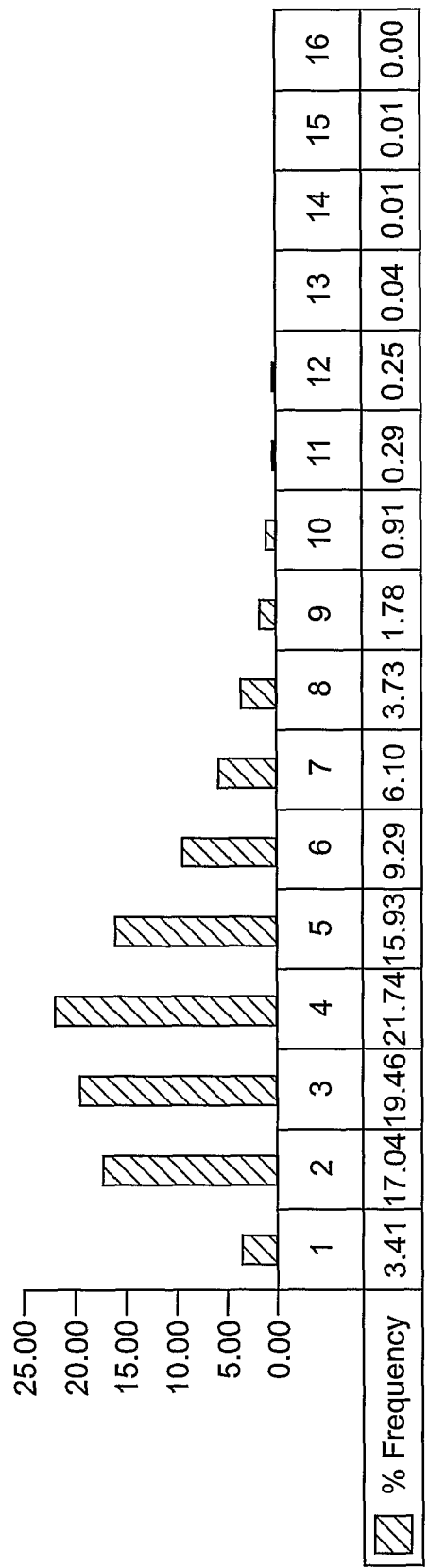

As depicted in FIG. 5f, the table shows the percentage frequency of the most used words of the English language as the sample set wherein words such as AND, IN, OF, THAT, THE, and TO were optimally obtained imposing the criteria of frequency values of greater than 0.9 to obtained the discrete word set. The percentage frequency of words that are two or more letters in length strongly indicates that the bulk of keyboard operations require repetition and multi-strokes. As depicted in FIG. 5g, the recorded data shows a distribution curve that indicates that the main weight in frequency is consumed by words of two to five letters in length, which represents 74.17% of a possible workload. The introduction of the optimized frequency union from letters, diagraphs, tri-graphs and small words significantly reduces this workload by simply eliminating unnecessary typing. Accordingly, this inherently reduces the risks associated with the duration of keyboard operations and subsequently diminishing Repetitive Strain Injuries (RSI) and elevating productivity.

Figure 5H:
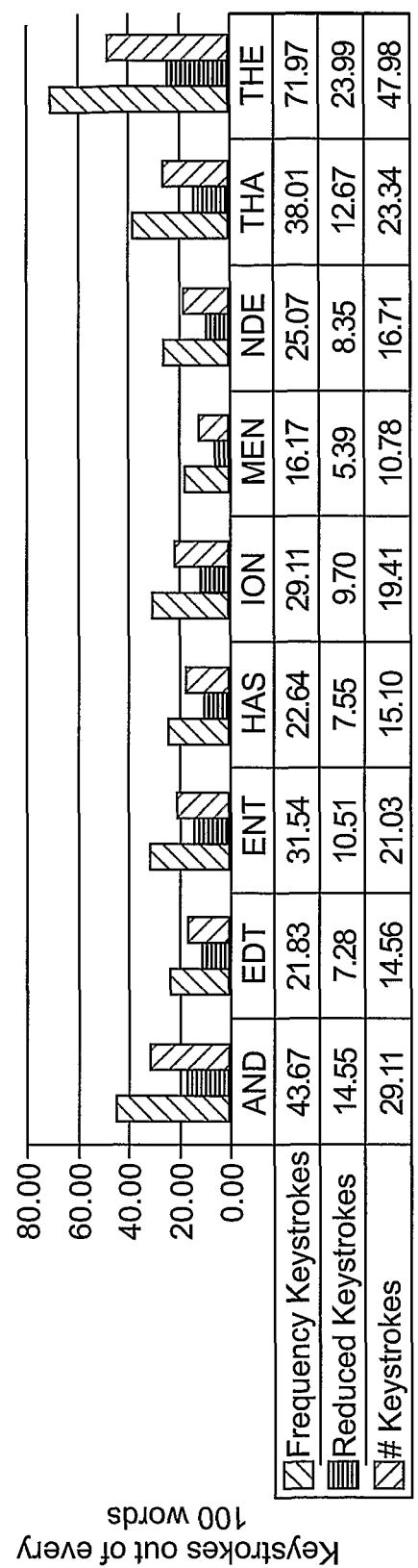
Figure 5I:
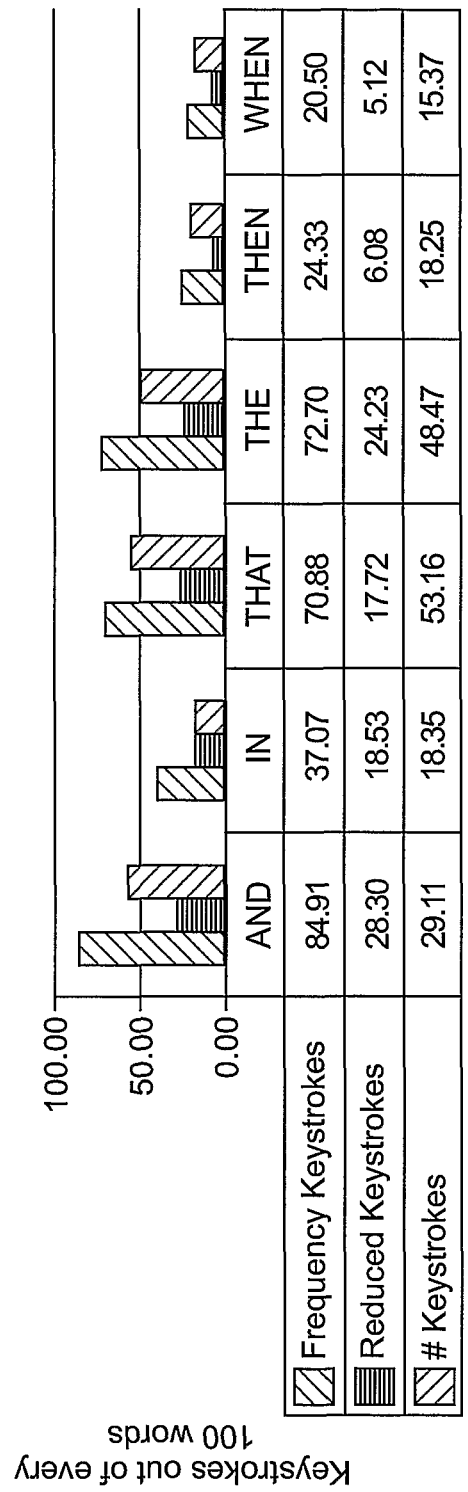

As depicted in FIGS. 5h and 5i, keystroke reduction is shown for the most common tri-graphs and most common words, respectively. The select combination from the frequency union also includes OF, OR, IN, EN, ES, RE, TH, AT, ED, ER, ON and AN. For example, the use of the tri-graph AND indicates a keystroke reduction of 14.55 keystrokes out of a sample of 100 words. Using the most common word groups the same word AND indicates a greater keystroke reduction of 28.30 keystrokes out of a sample of 100 words.

FIGS. 6a and 6b illustrate the composite key operations for various key value combinations of a specific set of data in normal typing mode and utilizing the function keys SHIFT, DUAL and DUAL SHIFT under Normal and Caps Lock mode. As set forth in FIG. 6a, composite key operations performed are tabulated for exemplary letter (t,T), Symbol (3,#), and productivity (th,TH,www.) key sets. These sets represent the default pair of primary and secondary values (and tertiary values for the productivity key), respectively, for their assigned keys in normal typing mode. Note, in capitalization mode the primary and secondary productivity keys are reversed. The Shift key will work normally as used in existing keyboard operations. The Shift key uses the secondary letter key values. The Dual/Dual Shift keys work only with the secondary or tertiary key values. The pair value for the Q key has been changed and reversed since the letter Q is rarely used singularly and is primarily paired with letter U to form the majority if not all, fixed QU words. Thus, the qu is the primary value, QU the secondary value and q the tertiary value. For the MCI key data (th,TH,www.), pressing the MCI key in normal mode summons "th", pressing the SHIFT in combination summons "TH", pressing the DUAL key in combination with the productivity key summons "www." and pressing the Dual Shift key in combination with the productivity key summons "WWW." as the normal mode protocol. In caps lock mode, the results for the productivity key data set are respectively the reverse.

As set forth in FIG. 6b, an enhanced data set is shown wherein the Letter, Symbol and MCI key data sets include three assigned values in normal mode, respectively (t,T,the), (qu, QU, q) and (th,TH,www.). Here the influence is the set (t,T,the), which permits normal keys to also have most used word, phrase, abbreviation, mnemonic or command associated with it as a DUAL or DUAL SHIFT accessed key-value. Similarly, function key utilization according to the above reference protocol can be evaluated by using the key data (t,T,the). In normal mode, pressing the key in normal mode summons "t", pressing the SHIFT in combination summons "T", pressing the DUAL key in combination with the key summons "the" and pressing the DUAL SHIFT key in combination with the key summons "THE" as the normal mode protocol. In caps lock mode, the results for the key data set are also respectively the reverse. The tables in FIGS. 6c-e show full mappings for all other keys.

The primary advantages of the productivity (efficiency) and ergonomic (accessibility) keyboard include the aspects of ergonomics that serve to optimize efficient key access by maximizing comfort and minimizing unnecessary keystrokes. Inherent to these particular factors includes comfort by retaining the most neutral body positions and by encouraging minimal body movements. The primary focus being to substantially reduce the likelihood or probability of acquiring injuries or disorders by minimizing stress and fatigue related various parts and muscle groups of the body such as ligaments, musculoskeletal joints, muscle tendons, hand nerves, and neuromuscular trigger points. In this regard, the invention is directed towards merging the needs of able and disabled persons to provide a keyboard that optimizes efficient keyboard use and levels the keyboard playing field to include an added benefit of diminished Repetitive Strain Injuries (RSI) and elevated productivity (increased work throughput).

To this end, it is important to differentiate between the use of a software application and its purpose. The use of the application is defined by the physical operations or functions available via the application interface, keyboard, and pointing device, which help fulfil the purpose of the application. The purpose of an application is its objective to meet user requirements, and to parameterize its use. Mechanisms that enhance the purpose of applications provide diverse or greater methods of application use. This in turn makes the interface, and its keyboard and pointing device, more efficient and effective.

Conventional keyboards only provide the mechanism to use the applications. The use of the application is determined by the predefined user-permitted operations of the applications that allow it to fulfil its purpose. Thus, conventional keyboards are functional, limited to one-way feeds, from keyboard to application, and do not provide the scope to improve or diversify the application interfaces that would otherwise allow for enhancements to application purpose. For example, in word-processing, all the operations allow one to format and present a document that forms the basis of the applications use. The purpose of the application is to enter text, based on language. Thus, the breakdown of language into its bare lexical components, such as letters, diagraphs and tri-graphs etc., would provide a more efficient and easier mechanism to fulfil the purpose of the application. This also permits the application to diversify its functionality and enhances the versatility of what the application can do with its interface. The same principles can be applied to any software application such as financial trading systems, Internet browsers and the like. The ability of the keyboard and interface system of the present invention to enhance not only application use but also application purpose, via the unique MCI keys, improves user interfaces and permits applications to operate more effectively and efficiently with application diversity and versatility. The ideology of the present invention connects the user with the software applications at the information level, thereby fulfilling more the purpose than the function.

As suggested above, a driver-based approach can be used (either in isolation or in combination with the multi-character indicia aspect of the invention described above) to reduce a user's physical interactivity with a personal computer. Computer keyboard drivers are essential in all operating system (OS) environments, their function being to convert keystrokes to OS language tables, thus bridging or translating required notation within all human-to-computer interfaces. It is important to note that the keyboard driver is a critical element to keyboard function and operation and that the additional features of the keyboard driver of the present invention is also operable with, and can be extended to, all currently available keyboard drivers.

Conventional keyboard drivers merely map key legends to OS language tables with little or nothing in the way of sophisticated extensions or add-ons to improve performance, versatility and adaptability of the keyboard medium.

However, the keyboard driver of the present invention is adapted to implement the enhanced features of the other aspects of the present invention leading to increased typing productivity and keyboard adaptability and versatility. The keyboard driver of the present invention includes a number of optionally activated and configurable modes including a "double-press mode", a "multi-press mode" and a "translator mode" as well as 'mapping mode', 'project mode', 'predict mode', and various attributes governing the control and behavioural aspects of the keyboard driver (operable with a user-configurable dictionary). These modes or features accumulate, grow and maintain all dictionary information, including entry or link statistics, probabilities and analytics (scaling patterns of use: historical usages, contextualization, relative associations and occurrences thereof), as well as dictionary chaining information and various generic counts and operational indicators, which inherently facilitates overall intelligence permitting the MDP to adapt to the user's habits, behaviours and working environment. All modes constitute additional features over conventional keyboard drivers, which results in improvements to typing productivity and adaptability and versatility. The aforementioned modes are described in detail below.

The double-press mode allows a user to select one of two alternative key values/functions depending upon whether a key is pressed once or twice within a predetermined time period (i.e. similar to the double clicking of a mouse). Normally, the two alternative key values will be: (i) the normal key value (i.e. the value obtained when no function key is used in combination with it); and (ii) the SHIFT value of that key. For example, a single press of key "A" yields key value "a" (i.e. lowercase normal key value) whereas a double-press of key "A" yields key value "A" (i.e. upper case—SHIFT-"A" key value). Of course, the keyboard driver could be adapted such that the second press of a key in double-press mode selects any other alternative key value other than the SHIFT value such as, for example, the DUAL or DUAL SHIFT value.

The multi-press mode is a natural extension of the "double press mode and is activated by two successive key presses within a predetermined period of time to generate a list of appropriate character strings from the dictionaries or by other features that also generate lists of appropriations respective of their determining factors and outcomes, where any list is formulated using entry or link statistics, probabilities and analytics (scaling patterns of use: historical usages, contextualization, relative associations, lengths and occurrences thereof), wherein each progressive press of a relative keyboard key up to n times selects the next appropriate character string from the installed dictionaries or from other derived or given lists of n appropriate character strings respectively. Optionally, to gain any productivity benefits from the multi-press mode, successive multi-presses must retrieve character strings which: (i) are actively prioritized by frequency of use (either per session or in real time); and (ii) are of a character length greater than or equal to n+1.

For example, a user can toggle between and/or dynamically integrate different user-installed dictionaries. Dictionaries may consist of mobile texting mnemonics, abbreviations, industry specific jargon such as medical acronyms etc. Prioritization of each word/mnemonic is updated each time it is selected, typed, scanned, or used to event an occurrence thereof. An optional feature is the storage of any new words within the dictionary (with NULL description).

An extension of the multi-press mode is a translation mode, which can be set during installation or run-time configuration to one of the following conditions: OFF, Translate+ (i.e. translate maximize) or Translate− (i.e. translate minimize). When set at Translate+, any character string (for example, a word or mnemonic), whether selected using the multi-press mode or not, will automatically expand into definition/description stored within a dictionary. Alternatively, when set at Translate−, any character string (for example, a phrase or a sentence) will automatically contract into a shortened version (for example, an abbreviation or an acronym) stored within a dictionary. Accordingly, the translation mode performs two-way translations depending upon the particular settings chosen by the user. Examples of the operation of the translation mode are shown in the table in FIG. 9. As illustrated in the table of FIG. 9, translations can be performed using a variety of configurable dictionaries, which are run-time user configurable or downloadable from the internet in real time.

The dictionaries are used to determine user typing habits and behaviour and adapt the MDP keyboard to the user environment dynamically. This reduces excessive repetition and redundancy within typing, thus further improving productivity (efficiency) and accessibility (ergonomics). The dictionaries hold various statistics (basics include frequency, length, pattern density/versatility, chronological weight and direction/operational indicators etc.), probabilities (basics include cognitive coherence, occurrence ratios, context ratios, and associative index etc.) and run-time analytics (scaling patterns of use: historical usages, contextualization, relative associations and occurrences thereof) that are dynamically updated in real-time and in accordance of use for all entries, links and chains maintained within the dictionaries, and further statistical attributes, software control dynamics, entry/link/chain attributes and indicators may evolve in the future. Many dictionaries can be configured at any one time and each can be of a different type. Duplications are handled by prioritising the installed dictionaries where by entries within a higher priority dictionary have precedence or are determined if manual overrides have been put in place by the user during installation or run-time configuration. All dictionaries are dynamic and therefore can be duplicated into various other languages or downloaded from the internet and configured during run-time.

The interface system of the present invention (which will be known under the Trade Marks MT-iDICT™ and/or AdapTex™) provides and maintains an adaptive intelligence data dictionary system. This interface system controls and uses various interactivity dynamics, statistics and full descriptions/translations of each entry (e.g. mnemonics, abbreviations or acronyms) stored within one or more data dictionaries installed within a storage means of the MT-iDICT™ interface system. None, one or more than one dictionary can be installed at any given time. Dictionary installment and configuration thereof can be done in real-time.

Each data dictionary holds qualitative and/or quantitative information relating to a given data string. Examples of qualitative and/or quantitative information are as follows: (i) statistical information relating to a data string's historical usage or selection (i.e. frequency of use/selection, character length, lexical pattern density/versatility, chronological weight and direction/operational indicators etc.); (ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; or other statistical derivatives based on language and user traits such as time-stamp, cognitive coherence, perceptual indices, associative indices, grammar orients, correlative weights, inference ratios and pattern factorization etc.); (iii) run-time analytics (scaling patterns of use, historical usages, contextualization, relative associations and occurrences thereof); (iv) dictionary priority; (v) dictionary chains (where each chain also retains and uses the information in (i), (ii) and (iii) above); (vi) data string links between other data strings (where each link also retains and uses the information in (i), (ii) and (iii) above); and (vii) translations.

All of the qualitative and quantitative information is dynamically updated in real-time and in accordance of use for all entries or data strings, links and chains, translations maintained within the dictionaries (described in further detail below), and further statistical attributes & software control dynamics.

The data dictionaries can be manually populated. Alternatively, the data dictionaries can be automatically populated by use of document or text scanners, which scan data strings and assemble their statistics, probabilities, run-time analytics as well as associative links between data strings. The idea being that such documents or texts written by a user reflect the behavioural use of vocabulary and patterns of the language(s) reflected by the user.

A data string may be in the form of a full data string (i.e. a word, phrase, sentence etc.) or a corresponding truncated data string such as a mnemonic, abbreviation or acronym. The prioritisation of data retrieved from a data dictionary is user-configurable to allow a user to prioritize the ordering of data listed on a display means according to selected qualitative and/or quantitative characteristics. The user configurable parameters include system behavioural parameters, data string statistics, probabilities and analytics (scaling patterns of use: historical usages, contextualization, relative associations and occurrences thereof), and dictionary priorities.

In addition to those mentioned above, further qualitative and/or quantitative characteristics may include: (i) the presence or absence of one or more data string fragments in the form of diagraphs and/or tri-graphs and/or tetra-graphs etc within a full or truncated data string; (ii) the presence or absence of truncated data strings in the form of mnemonics, abbreviations or acronyms which correspond with the full data string; (iii) two-way translations between full data strings and their corresponding truncated data strings; (iv) the frequency of two-way verbatim, correlated and/or inferred translations between two languages (i.e. English to French); (v) the character-length of each full data string or its translation or any corresponding truncated data string; (vi) the frequency of selection by a user of each full data string (i.e. words, numbers, symbols, emoticons etc.) or its translation or any corresponding truncated data string; (vii) the frequency of forward and backward translations between full and truncated data strings; and (viii) the frequency of forward and backward verbatim, correlated and/or inferred translations between two languages. Each data dictionary may also hold indicator flags that dictate and delimit control and use of the stored data by the software, and the level that it pertains to relative software tiers.

Data strings stored within the data dictionaries are selected/accessed using the first character of the data string, and ordered by descending frequency and ascending length for basic default sequencing. The ordering is configurable by the user using any field (qualitative or quantitative) of the data dictionary. Ordering can also be configured to be ascending or descending. The first character is sourced from a single key press or a composite group of first characters obtained from key presses.

A configuration tool permits setting the various behavioural aspects (also known as physical interactivity reduction characteristics) of the MT-iDICT™ interface system. The behavioural aspects (physical interactivity reduction characteristics) are as follows: (i) automatically entering a space after a selected full or truncated data string; (ii) limitation of displayed mnemonics to those having a total number of characters; and (iii) automatically performing forward or backward translations between mnemonics or abbreviations or acronyms and their corresponding full data strings.

Further behavioural aspects include specifying the number of selected entries to be displayed or listed on the display means at any one time, maximizing a mnemonic to become the most frequent of its category with highest priority, editing of entries, or ordering run-time selections based on certain qualitative or quantitative characteristics in ascending or descending order etc.

Further behavioural aspects include specifying a projection of n words or sentences by way of using the associative indices and other qualitative/quantitative statistical derivatives.

The interface system can also determine a user's most frequently used phrases (i.e. full data strings) and automatically abbreviate or implode them into a mnemonic, acronym or other abbreviation (i.e. a truncated data string). This allows a user to have fewer key presses via the truncated data string which can then be manually or auto-translated into its corresponding full data string. See the Trans+ and Trans− buttons on the personal computer of FIG. 2a which can be used to perform manual imploding or exploding of data strings. The personal computer can also be configured to perform this function automatically.

A limited number of most used entries pertaining to a key press can be displayed at any one time. Additional entries can be scrolled through using the navigation means up to a maximum set by the configuration tool.

The diversity of dictionary types is enormous, e.g. one thousand most used words, mnemonics, acronyms, abbreviations, conversions, Short Message Service (SMS) texting data, emoticons or other data specific to the user and/or a user's working environment etc. Data dictionaries can be even more specialized by being departmentalized within specific working environments. For example, in a medical environment the dictionaries can reflect symptoms and remedies, ailments and pharmaceuticals, or simply provide normal medical terms and their definitions. In a reservation environment, the dictionaries can reflect airlines, destinations, flight codes, seating, hotels, prices etc. In an investment trading environment the dictionaries can reflect trading instruments, traders, portfolios, Reuters Instrument Codes (RIC), trader specific RICs, quantities, buy/sell prices and forecast analytics etc.

Dictionaries can also be integrated into any other software and controlled dynamically to reflect changing circumstances to the entries within respective dictionaries. This provides real-time adaptive intelligence relative to the user, working environment and type of system being used adjacent to its purpose.

The real-time maintenance of dictionaries and the dynamics of the MT-iDICT™ interface system allow it to contour towards a user's traits and uses of the device, along with the user's use of language and level of vocabulary. This enables the MT-iDICT™ interface system to be adaptive and intelligent relative to the user's volume, level and type of use of the system. Over time, the data dictionaries will evolve to reflect the most favourable and most appropriate or relevant data strings used by the user and thus adapt and contour the MT-iDICT™ interface system relative to, and more appropriately towards, the user.

As with the multi-character indicia aspect of the present invention, the benefits of the interface system include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the personal computer itself. The combination of both the multi-character indicia aspect of the invention together with the software elements of the interface system provides the greatest benefits in terms of facilitating a reduction in the number of physical key presses required to create a given data string.

Synchronization of users' data dictionaries between personal computers maintains accurate translations, semantics and meanings. Synchronization can occur or be accomplished using infrared, Bluetooth® or other wireless connectivity methods available on personal computers. Alternatively, central repositories or databases can be maintained by the communications service providers that computers can access easily, or they can be maintained and accessed/downloaded via internet web sites. These synchronization mechanisms maintain consistency of dictionaries and their use thereof by groups of users. The central repositories (i.e. internet databases) provide a means to standardise dictionaries for the general population of users.

Once the interface system software and MT-iDICT™ data dictionary facilities are integrated/installed into the computer, the software aspects can use and process MT-iDICT™ data dictionaries using standard systemic logic to achieve optimum utilization, i.e. using best processing methods and techniques to obtain all the efficiency benefits. The configuration tool also permits the scanning of existing messages resident on the personal computer or the downloading/transfer into the computer (i.e. by either Internet, another PC or other compatible device using cable or wireless technologies) of dictionary data in order to acclimatize the MT-iDICT™ data dictionaries relative to the data strings used within the messages.

The interface system software uses the MT-iDICT™ dictionaries according to the key press sequences entered by the user either in passive mode or in active real-time dynamic mode. Various navigation features can be used in parallel or adjacent to the interface system software in order to rapidly access the most frequently used (i.e. typed) information. The interface system software reduces the physical aspects of repetitive and recursive typing thereby enhancing efficiency and ease of use and improving the overall effectivity and experience in using a personal computer.

The present invention includes various physical interactivity reduction features (PIRS) which facilitate a reduction in the number of key presses required to create or delete a given data string.

Screen options or existing physical buttons can be used to perform translations (see the 'Trans+' and 'Trans−' buttons in FIGS. 2a and 2b). Double pressing of a given key on the keyboard accesses the most used word or phrase beginning with the tapped letter or generates a prioritized list of the most frequently used words corresponding to the typed letter or letters. This allows the user to conveniently select the desired word or phrase from the list. Alternatively, double pressing can be configured to simply upper case the typed letter or letters.

The first data string or system option in a Pop-Up Selection List (PSL) is highlighted for selection by the user by default. The highlighted data string or system option is selected/activated by scrolling or using other cursor navigation controls. Highlighted data strings or system options are also automatically selected if any other key is pressed, or via a navigation movement.

Alternatively, the first letter of each data string is underlined whereby pressing the relevant key selects the data string or system option without the need to scroll or navigate to it first. Where there is more than one data string or system option with the same initial character, these are scrolled through in the order presented in the Pop-Up Selection List (PSL).

When the PSL is displayed, the desired data string (for example, a mnemonic) can simply be selected by directly scrolling to it. Alternatively, if the desired data string does not appear in the list, the next letter of the data string is typed to further filter the PSL.

The MT-iDICT™ interface system is not a Predictive Typing Systems (PTS). PTS integration with MT-iDICT™ interface system would allow the PTS to predict more accurately since it is adapting to the users vocabulary in real-time and can presume to hit the users most used data strings (i.e. words, mnemonics, sentences etc.) at every instance.

The MT-iDICT™ interface system formulates logic and, prioritisations derived from the data storage qualitative or quantitative information, methods, frequencies and patterns of behaviour and usages of words/mnemonics of the user. Thus, it becomes adaptive to the user and the user's vocabulary and traits. This provides the most favourable and most appropriate and relevant choices for the user based on the user's actual vocabulary, historic usages, frequencies, patterns of use, methods and prioritisations, each being derived from the qualitative or quantitative information stored in the data storage means. The MT-iDICT™ interface system provides data string choices based on actual usages rather than on guesswork as to what the user is trying to create relative to a static generic dictionary.

Predicting typing systems do not reduce the amount of interactivity as effectively as MT-iDICT™ interface system purely because the former still requires further key-presses to guide its prediction, whereas the latter simply provides discrete choices of full or partial data strings (i.e. shortcuts, whole words, phrases, or partial data strings that can be used to build up or complete fuller data strings, e.g. diagraphs, tri-graphs, tetra-graphs and symbol-graphs).

When the personal computer is in text input mode, PSL's are displayed upon detection of an activating tap and/or appropriate navigations by the user. The PSL's show the most frequently used or most appropriate or relevant data strings for each letter or digit associated with the pressed key.

User typed data strings are entered into the MT-iDICT™ dictionary when no such entry exists. This mechanism allows the device to adapt to a user's usage and a user's environment that dictates the type and level of use. The new entries are immediately accessible by the MT-iDICT™ interface system. Thus, the MT-iDICT™ adapts dynamically in real-time making interaction for the user more familiar and making relative information more apparent to use and/or access.

Software facilities, inserts or application macros can be accessed using the PSL facility also.

An extension to the translation mode is the automatic generation of acronyms, abbreviations and conversions. Here the keyboard driver can dynamically determine acronyms, abbreviations and conversions for such linked associations, thereby providing automated translator shortcuts for the most recurring or commonly used phrases, sentences or texts of n character strings, which can be stored and maintained within any dictionary and made readily available. The user is made aware of such automated acronyms, abbreviations and conversions via the keyboard driver dictionary console, display/reporting and edit features where the user can also create personalized shortcuts and where these shortcuts can include system or device commands and executable instructions/macros.

The interface system is also provided with a 'mapping mode'. Dependent on this mode being activated and various chains between dictionaries being predefined and established by the user during installation or via run-time configuration tools, or automatic chaining being activated, the keyboard driver will perform chained translations of typed or highlighted text. This involves the keyboard driver scanning and mapping appropriate translations from one dictionary to another. Here the keyboard driver maintains lookup chains between any dictionaries such that dynamic mapping can be made from one dictionary to another, and so on. For example, English-to-French (dog, chien) and French-to-German (chien, hund) dictionaries can be chained such that it can infer English-to-German (dog, hund) mapping. More sophisticated dynamic mappings could chain, for example, a symptoms dictionary to a prescriptions dictionary whereby relevant character strings are matched between any dictionary entries and translations to dynamically chain such dictionaries together and induce n ailment to medicine mappings. A single mapping is definitive whereas a list of n mappings are prioritized accordingly and made available via the PSL feature. The number of chained dictionaries is dependent on the number and permutations of installed dictionaries.

The interface system is also provided with a 'project mode'. When activated, the various links between entries-within respective installed dictionaries (the links being predefined or established automatically or manually by the user during installation or run-time) allow the keyboard driver to determine and project the most likely associations between n entries relative to the typed or highlighted text. The most relevant, user contoured and adaptive appropriations spanning n derived sub-data strings are then displayed for selection by a user.

The keyboard driver maintains associative links between data strings within two or more dictionaries, such that these links can be used to dynamically infer relative associations between data strings based on link statistics, probabilities and analytics (scaling patterns of use: historical usages, contextualization, relative associations and occurrences thereof). This allows the keyboard driver to project and retrieve the n most likely appropriations or closely associated data strings from the dictionaries that are relevant, contextual, definitive and user oriented, and each data string being relative to a previous linked association or typed data string.

Optionally, the interface system can dynamically retrieve a list of alternative appropriations relative to each linked association used to induce each of the n respective data strings, whereby each list of alternative appropriations are prioritized and made available via the PSL feature. Once a longer data string is selected from the PSL, this dynamically induces and propagates a further relative projection and retrieval of n further data strings, each being relative to a previous linked association or multi-press selection.

In predict mode, dependent on this mode being activated, the keyboard driver will derive a best match or appropriation relative to the current typed letter or letters, or typed or given/highlighted text pattern, where these letter, letters and/or patterns are the initial letter, letters and/or patterns of entries selected from the dictionaries. Here, the keyboard driver can dynamically best match current typed letter or letters against most likely appropriations from the dictionaries, where the appropriations all begin with the same typed letter or letters. These appropriations are dynamically retrieved based on given priority of each installed dictionary and entry statistics, probabilities and analytics (scaling patterns of use: historical usages, contextualization, relative associations and occurrences thereof). A single best-matched appropriation is definitive where as a list of best matched appropriations are prioritized accordingly and made available via the multi-press feature.

FIG. 13 shows a table of associatively linked and prioritized data strings. The MT-iDICT™ interface system can multi-link dictionary entries to other entries within the same and/or other dictionaries. These links are based on analytics of patterns of use or relativity between the linked entries. These analytics are dynamic because they change priorities and switch context according to patterns of use.

Thus, a user can specify n projections whereby MT-iDICT™ will link entries to give n sequential appropriation lists of up to, say, five subsequent outcomes relative to a previous entry. Each subsequent appropriation list is prioritized and each can then be selected out of the five if required, most likely not since the top entry for each list will be most likely for use.

For example, if the word "Next" is typed then the projected words (sub-data strings) shown in FIG. 13 would appear (i.e. 'generation', 'of', 'adaptive', 'intelligence', 'interfaces'). Each projected word produces a PSL (for example, the word 'generation' produces a list of other words below it) that can be scrolled or otherwise navigated through for selection when a user skips to each projection unless a user accepts the suggested projection. The PSL is in priority order of patterns of use and context switching. The spacing in the table is for clarity only and would not appear on as such on the display.

If a suggested word is altered then the subsequent words would change dynamically, contextually as well as associatively and relative to the new selected word. The user can alternatively type a new word from scratch over any original word selection.

On typing each letter of the word 'Next', appropriate selection lists are derived where the beginning of each list entry reflects the current typed letters. For example, typing the letters 'Ne' would provide a list of say, 'Next, Never, Neither, Neighbour, Nederland'. From such a list the highest weighted entry would be shown, in this particular example 'Next' and the letters 'xt' would be highlighted and available for selection to complete word 'Next'.

The MT-iDICT™ interface system will also appropriate the word as it is typed and dynamically change the projections according to any changes to it. This makes it much more adaptive intelligent than it already is. It is envisaged that future versions will have true syntax, context, semantic and grammar projections derived from LONGMANS, WEBSTERS, COLLINS and OXFORD research dictionary data. An option to highlight only words within a projection that require changing is provided, where remaining unselected words are not dynamically changed.

Continual flow from one selection to subsequent words should be provided such that a SPACE or cursor movement is adequate to perform a selection without the need to use additional select methods, i.e. a cursor movement from a highlight auto-selects the highlighted item unless another mechanism is used to do otherwise.

Optionally, the data processing means can provide manual or automatic spell check features.

Optionally, the data processing means can provide a freeze point enabling the retrieval of static constant appropriations as opposed to dynamic, and which can be based on either most recent or current captured entry statistics, probabilities and analytics (scaling patterns of use: historical usages, contextualization, relative associations and occurrences thereof), or manually intervened prioritisation or overrides.

Duplications are handled by prioritising the installed dictionaries whereby entries within a higher priority dictionary have precedence or are determined if manual overrides have been put in place by the user during installation or run-time configuration.

The following provides an example method to represent dictionary information, indexing and chaining as'shown in FIG. 14. It also depicts an example method to represent dictionary entry information, indexing and linking. Although RDBMS could be used, a dynamic method could use system character code tables or repertoires that come in standard ASCII, ISO and other formats that also include language character variants. The system character codes provide the index to each series of dictionary entries that begin with that code. Subsequent entries of the same code are dynamically generated and linked to the previous entry in the same array for that code. Each entry holds its own statistical derivatives such as (i) timestamp (the date and time the dictionary entry, chain or link was created, last used or accessed; (ii) translation, expansion, frequency, length, cognitive coherence (i.e. measures the versatility & flexibility of patterns, their ease of re-usability and the placement of language based patterns); (iii) perceptual indices (i.e. measures the strength of recognizing patterns and deciphering language based patterns, even when patterns are incorrect or misspelled); (iv) associative indices (i.e. measures the relativity between two or more patterns by calculating the frequency of a combination of words or the relationship between words); (v) grammar orients (i.e. the lexical syntax or placement of patterns and their semantics and contextual positioning of nouns, verbs, adverbs, adjectives etc.); (vi) correlative weights (i.e. measures the semantic relationship or association between two or more patterns where different words mean the same or elaborate other words similar to thesaurus weights); (vii) inference ratios (i.e. measures the likelihood of a semantic relationship or association between two or more patterns by assessing the occurrence of one word or sub-data string within a grouping of other words or longer data strings; (viii) pattern factorization (i.e. measures the ability to create/breakdown larger patterns from/to smaller patterns wherein in a textual or graphic context, letters, numbers & symbols have highest factorization, then diagraphs, tri-graphs, tetra-graphs, 5+ letter words, phrases, sentences, paragraphs, chapters and finally whole texts in this order of factorization).

Additionally entry links are formed to associate entries between themselves, i.e. maintain etymological relationships and statistical derivatives between entries. These entry links again are indexed using system character code tables. The system character codes provide the index to each series of entry links that begin with that code. Subsequent links of the same code are dynamically generated and linked to the previous link in the same array of that code.

Dictionary chaining provides correlation and inference between dictionaries and their entries and links. Entry linking provides inference and association between entries and their links.

This method allows dynamic generation of dictionaries and their variable entries and respective entry links. It also provides an example indexing system for rapid access to entries and their associated or related link entries. The method permits a spatial/multi-dimensional matrix to represent dictionary dynamics.

A unique aspect of the present invention is that it provides mechanisms or Application Programming Interfaces (API) that allows other software systems to utilize and benefit from all the features of this invention, and to enable improved experiences for the user with such software systems. Additional to this, the API allows other software systems data storage or information repositories to be handled by this invention in similar manner to its own dictionaries etc.

Predictive Typing Systems (PTS) do not reduce the amount of interactivity as effectively as the MT-iDICT™ interface system purely because the former still requires further key-presses to guide its prediction, whereas the latter simply provides discrete choices of full or partial data strings (i.e. shortcuts, whole words, phrases, or partial data strings that can be used to build up or complete fuller data strings, e.g. diagraphs, tri-graphs, tetra-graphs and symbol-graphs).

The MT-iDICT™ interface system has a standardized 1000 Most Used Words, SMS text entries, acronyms, conversions and emoticons. However, additional dictionaries can be installed as standard either when the personal computer is shipped or when users pre-install their bespoke dictionaries on setup. These new entries can be edited by the user at will.

The examples shown in FIG. 13 assume that the MT-iDICT™ interface system is in static mode, whereby the sequence/order of displayed letters associated with their respective key is depicted in conventional chronological order. Whenever in text input mode the illustrated Pop-Up selection lists are displayed according to the activating key and appropriate navigations. The Pop-Up selection lists also depict examples of the most frequently used mnemonics based on prioritizations derived from the data storage (dictionary, data string, chain or link etc.) qualitative and/or quantitative information, methods, and patterns of use or numbers relative to each letter or digit associated with its respective key.

User typed words are entered into the MT-iDICT™ interface system's data dictionary when no such entry existed beforehand. In addition, relevant data string links, associations and contextualization parameters are also derived and maintained for all such new data string entries within the data storage means. This mechanism allows the device to adapt to the users usage and environment that dictates type and level of use. The new entries are immediately accessible by normal MT-iDICT™ means. Thus, the MT-iDICT™ interface system adapts in real time making interaction for the user more familiar, and relative information more apparent to use and/or access.

Software application names relative to a letter on a key can be set to macro mode, thus when tapping the key the PSL gives option to start an application from its list (e.g. keys W, X, Y, Z: WORD, XCEL, YAHOO, ZANY KONG).

As shown in FIG. 9, dedicated keys or buttons are provided on the keyboard. The multi-press key/button and the Trans mode keys/buttons are used to toggle between activated and deactivates states respectively. Regardless of whether the translation mode is set to OFF, the Translate− and Translate+ buttons allow the user to manually highlight a section of text and press the Translate+ or Translate− key to perform an appropriate translation without overriding the otherwise automatic operation of the translation mode. Indeed manual use of the Translate+ and Translate− keys in this fashion can also be used when the automatic translation mode has been set to OFF.

The MULTI DEL and MULTI BSPC keys (described above) behave slightly differently when used immediately after a translation has occurred. For instance, when the translation mode is active, the character string "call me asap." automatically expands to "call me as soon as possible." if the character string ends with a non-character SYMBOL (in this case a full stop). The immediate use of the MULTI BSPC key at this point would firstly revert back to "call me asap" before fully functioning as a multiple backspace (i.e. deleting the whole sentence" configured by the user. In the same scenario, a regular backspace key would function as normal and singularly delete characters from right to left.

The keyboard driver also opens a separate installation or run-time configuration window when in multi-press mode giving a range of user-definable options. For example, a user can select the maximum value of n, whereby n is the number of most used words to be retrieved from the dictionary during multi-press mode. A check box is provided to enable or disable the multi-press mode functionality when a key is double pressed only (i.e. without a third press within a predetermined period of time from the second press).

The keyboard driver is of course provided with user-definable speed settings for the double-press and multi-press modes, much like those provided for double-click setting for a mouse. Furthermore, the keyboard driver also provides options for cursor selection in order that a user can visually determine whether or not the double-press or multi-press modes are active. It will be appreciated by those skilled in the art that the double-press and multi-press modes are particularly beneficial to users having limited use of the fingers.

The MULTI DEL and MULTI BSPC keys can be adapted to operate in the translator mode to successively revert from the stored definition/description of a word to the word itself (i.e. upon a single press) and then delete both the definition/description and the word itself (i.e. upon a second press).

The keyboard driver performs the mapping of keyboard signals, which are buffered on a First-In-First-Out (FIFO) basis. FIG. 11 shows two tables that illustrate the mapping of key press events in a FIFO buffer for the typing sequence "Here's another query" (where underlined letters correspond to the diagraphs on the appropriate productivity keys of the first aspect). Although the FIFO buffer will almost always be empty since all key-press events will be mapped and dispatched immediately to the operating system and receptive software application, a temporary buffer to store pending characters is recommended to alleviate any possible operating system of software application delays or latencies or conflicts.

FIG. 11 also shows a schematic operating scenario for a FIFO buffer in "piped multi channel" mode. The multi channel mode operates when the key value FIFO buffer is used simultaneously by two or more software applications. The multi channel mode will be specifically useful for use with the enhanced keyboard driver of the present invention. The piping of the buffer helps avoid buffer complexity, conflict or contention issues particularly during simultaneous use by two or more software applications.

An alternative multi channel mode can also be implemented by duplicating the key value FIFO buffer thus providing a secondary channel for the input of a second software application. The secondary key-value FIFO buffer is always a dynamic replication of the primary key value FIFO buffer. The primary and currently active keyboard application is the only application that can pop/push/flush the primary key value FIFO buffer. A secondary software application cannot pop/push/flush either key value FIFO buffers. The secondary software application may only feed from the secondary key value FIFO buffer. Such rules ensure that no conflict or contention issues occur regarding the key value FIFO buffer. An alternative is to make the key value FIFO buffer shareable whilst still applying the above rules to give control to the primary software application. All other secondary applications simply feed off the key value FIFO buffer.

FIG. 7 shows a calculator portion of a computer keyboard according to a third aspect of the present invention. The calculator portion of the keyboard according to the present invention has been provided with a more sophisticated functionality and arrangement.

The keyboard shown in FIG. 7 comprises an array of conventional numerical and calculator operator keys, a plurality of calculator control-keys and a liquid crystal display (LCD) located on the keyboard itself.

The calculator control-keys comprise: (i) a first control key for selectively displaying the results of calculations performed using the array of numerical and calculator operator keys on the LCD; and (ii) a second control key for selectively sending the results of calculations performed using the array of numerical and calculator operator keys to a computer.

The calculator control-keys are operable in combination with the numerical and calculator operator keys to determine (a) whether calculator-related or special characters are displayed on the keyboard's LCD display and/or on an alternative display such as a Visual Display Unit (VDU) via the computer; and (b) whether the results of mathematical calculations performed by the calculator keys are displayed on the keyboard's LCD display and/or on an alternative display such as a Visual Display Unit (VDU) via the computer.

In addition to the numeric key-values 0-9, the functional indicia of the first subset of keys comprise any or all of the following: +, −, /, *, MR, M+, M−, MC, C/AC, SEND, ENTER, MKUP (Mark Up), %, √ and +/−.

Whereby, the latter four operators are defaults but are programmable during installation or run-time configuration to reflect other standard, financial or scientific mathematical operations.

The calculator control-keys consist of the following two keys each of which can toggle between activated and deactivated states: the "CALC LK" button and the "NUM LK" key. The CALC LK key selectively enables and disables the calculator and numeric keypad functions of the calculator portion of the keyboard. The NUM LOCK key works in the conventional manner whereby when activated it accesses the numeric and operator key values, and when deactivated it accesses the auxiliary key values (i.e. cursor controls, home, Pg Up, Pg Dn, End, Ins and Del). Regardless of the NUM LOCK state, the activation of the LCD calculator via the CALC LK button overrides the NUM LOCK state and localizes the numeric keypad to operate with the LCD calculator. The ENTER and SEND keys permit calculations to be localized or relayed to the computer respectively, and both update the LCD accordingly.

When the computer is itself turned off, the CALC LK key can be used to activate or deactivate the keyboard calculator for use as a standalone desktop calculator. This feature does of course rely on the keyboard having its own battery or solar cell for powering the calculator.

In addition, the calculator is provided with a retention buffer that holds a calculation history of n items including the most recent numeric entries, operators and equated values. It should be noted that the retention buffer is totally separate from the standard calculator memory operated using the conventional memory buttons (i.e. M+, M−, MR, MC). The retention buffer allows a user to scroll through the entries stored in the buffer using the UP and DOWN arrow keys, whereby each scrolled entry is respectively displayed on the LCD display. Such functionality allows the user to regress, recur and/or rectify calculations from any previous point within the buffer. In this way, all new entries from a regressed, recurred and/or rectified point overwrite respective/consequent older entries within the buffer, thus calculations are reciprocated entirely, throughout and accordingly.

Also shown in FIG. 7 are a series of Lock keys (ALT Lock, CTRL Lock, SEQ Lock and DUAL Lock). Selection of the ALT Lock and CTRL Lock keys by a user act as if the conventional ALT and CTRL keys respectively are continually pressed. Similarly, the DUAL Lock key acts as if the DUAL key shown in FIGS. 2a-c is continually pressed. The SEQ Lock key allows sequential typing without the need to hold more than one key down simultaneously. Fore example when SEQ Lock is activated simultaneous pressing of SHIFT and 5 is not necessary to obtain %.

The features of the present invention could equally be incorporated into alternative keyboard styles, for example, the MALTRON® and DVORAK keyboards styles. The keyboard driver is provided with a radio button(s) in order that a user may select toggle between the QWERTY, DVORAK dual-handed, DVORAK left-handed and MALTRON keyboard layouts. FIG. 12 is a table illustrating the key-value mappings between these various keyboard styles.

Modifications and improvements may be made without departing from the scope of the present invention. For example, the rows and/or columns of the array of MCI keys may be slightly offset whilst retaining their overall shape.

The MCI key indicia can be adapted to suit the particular requirements of the application being used (i.e. different languages, computer-programming languages etc.). MCI keys can be arranged in different ways and layouts to cater for a variety of desktop needs, compactness, notebooks, portability and programmability etc. See, for example, the alternative layouts shown in FIGS. 12a-d.

Figure 12A:
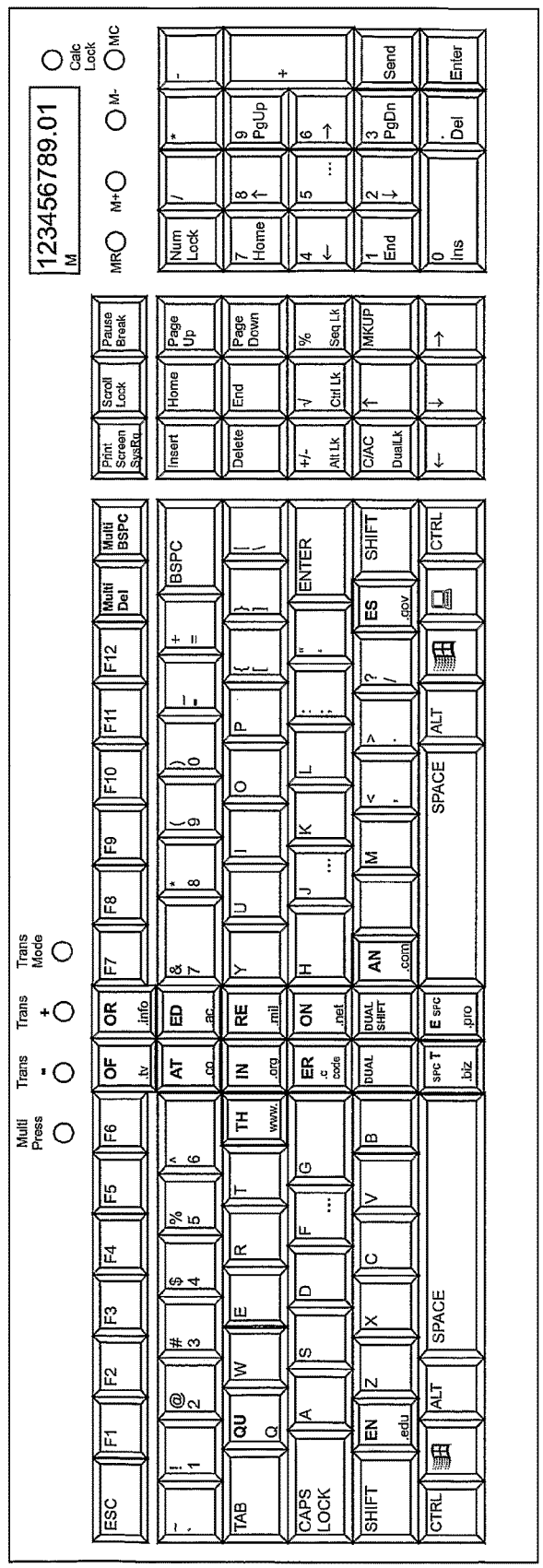
Figure 12B:
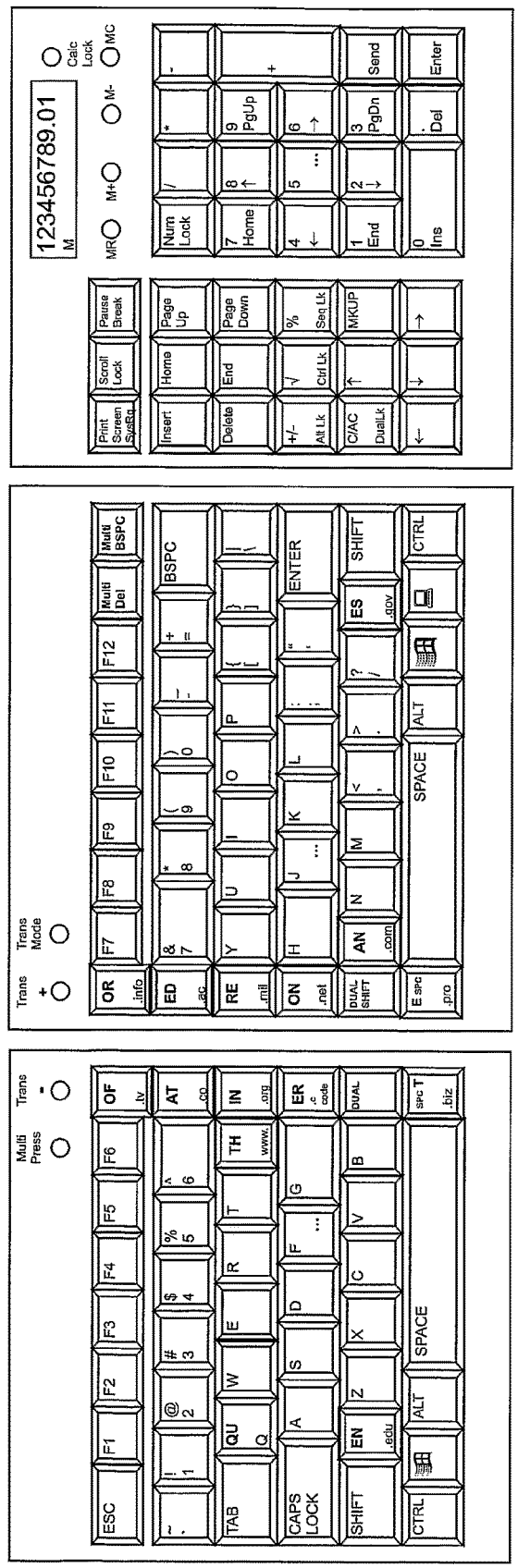
Figure 12C:
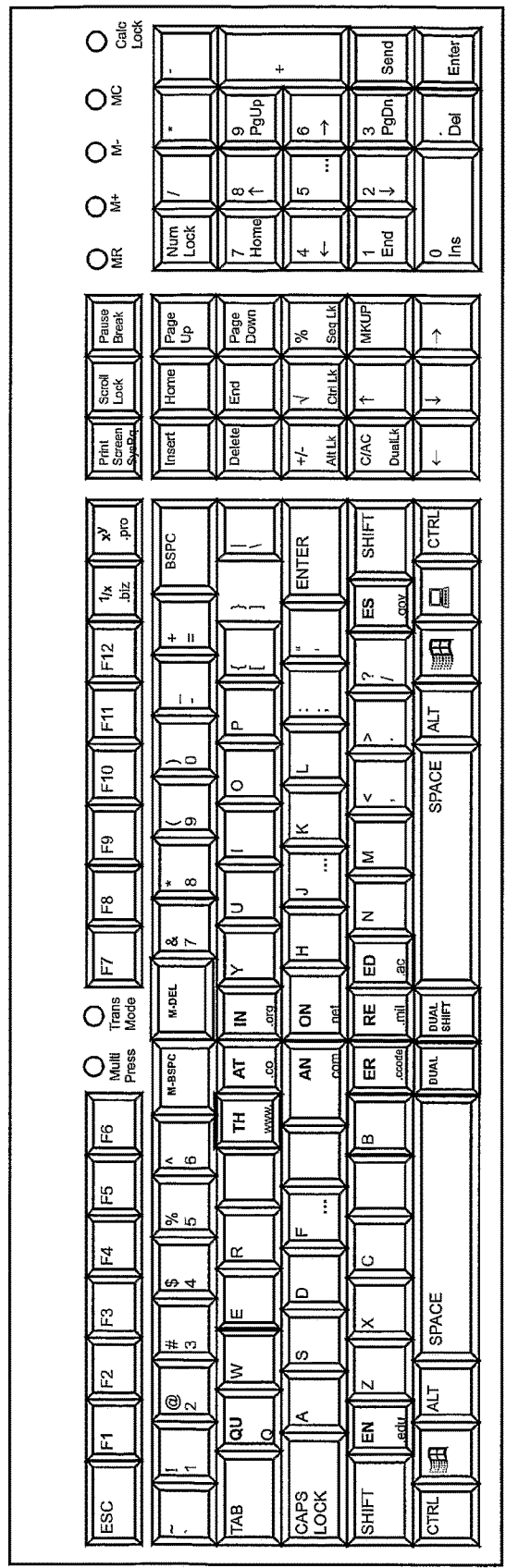
Figure 12D:
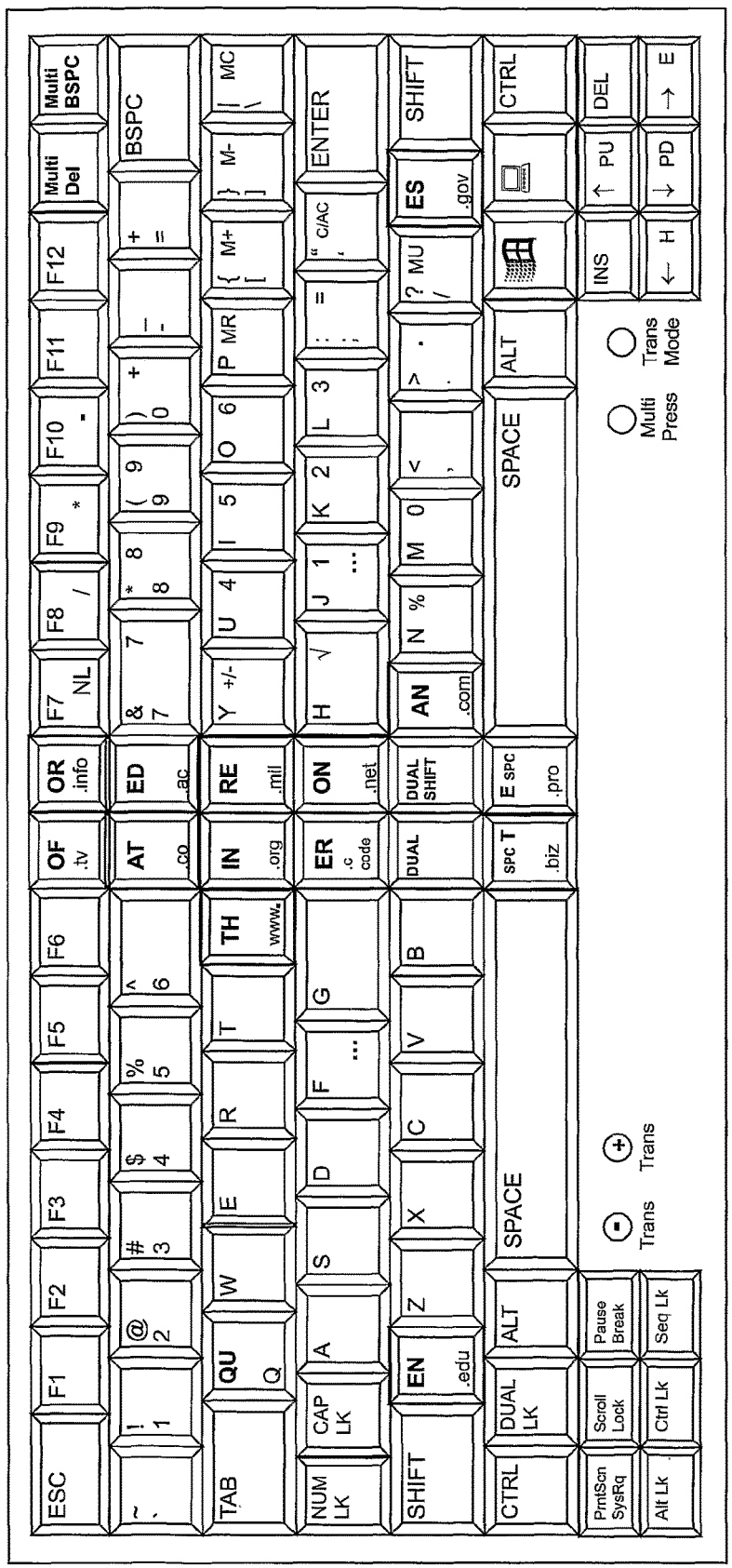

In particular, FIG. 12c shows an alternative keyboard in which the priority order of most frequently occurring diagraphs for English is [th er on an re he in ed nd ha at en es of or] with demotion of [he, nd, ha] due to close association and occurrence with higher priority diagraphs and relative occurrence with most frequently occurring tri-graphs for English [the and tha ent ion tio for nde has nce edt tis oft sth men], and exclusion of [of, or] due to least priority, frequency occurrence and limited real-estate on device.

Furthermore, the Trans– and Trans+ buttons included in the keyboards of FIGS. 2a and 2b have been removed due to diversification of keyboard driver to operate for, and on, all conventional keyboard devices and software applications.

The MCI keys, as opposed to the conventional-QWERTY keys have been re-sized in order to retain regular QWERTY look-and-feel of keys, and also optimize size accessibility and hit-ratio of the MDP-keys.

The Multi-Del and Multi-BSPC keys have been relocated to above the substantially central array of MCI-keys in order to streamline access and permit easy dissection of the keyboard (in a similar way to that shown in FIG. 2b)

Scientific calculator operators 1/x (reciprocal of x) and $x^y$ (x to power of y) are included to the right of the Function keys, while retaining internet TLDs [.biz and .pro] lost from exclusion of [of, or] MCI-keys.

The DUAL and DUAL SHIFT keys have been relocated beside the SPACE bars in order to inert any effect when accidentally hit relative to SPACE bar hits.

The MCI-keys have been re-arranged relative to home keys [F and J] where closest proximity is dependent on priority order of most frequent occurrence of diagraph.

The invention claimed is:

1. An interface system for a personal computer, the interface system comprising:
an array of data input keys having character indicia;
data storage comprising one or more data dictionaries populated with a plurality of data strings and links that link an initial data string of the plurality of data strings to a set of next possible data strings of the plurality of data strings, wherein each link between the initial data string and one of the data strings in the set of next possible data strings corresponds to a probability of occurrence of the initial data string and the one of the data strings within a group of data strings;
a data processor; and
a data display,
wherein the data processor is adapted to facilitate a reduction in the number of key presses required to create a given data string to less than the number of characters within said data string, the data processor configured to:
identify the initial data string in response to an input of the initial data string into the interface using the array of data input keys;
access the one or more data dictionaries;
determine the set of next possible data strings based on the links linking the initial data string to the set of next possible data strings;
prioritize the set of next possible data strings in real-time according to prioritization parameters; and
cause the data display to display the prioritized set of next possible data strings in a pop-up selection list for subsequent selection by a user.

2. An interface system according to claim 1, wherein the processor is configured to filter the number of data strings displayed on the data display for subsequent selection by the user based on success key presses made via the array of data input keys.

3. An interface system according to claim 1, wherein the data input keys within the array have multi-character indicia which are selected to accord with a statistical extrapolation of the most used alphanumerical character combinations in a given language, to thus facilitate a further reduction in the number of key presses required to create a given data string.

4. An interface system according to claim 1, wherein the data input keys within the array have multi-character indicia which are composite keys having at least primary and secondary indicia corresponding to primary and secondary key-values or key-functions.

5. An interface system according to claim 1, wherein the one or more data dictionaries are populated with qualitative and/or quantitative information stored in relation to each data string in the one or more data dictionaries.

6. An interface system according to claim 5, wherein a configuration means is provided to allow a user to selectively enable or disable physical interactivity reduction characteristics of the interface system which facilitate a further reduction in the number of key presses required to create a given data string.

7. An interface system according to claim 6, wherein the physical interactivity reduction characteristics are selectable from the group comprising:
  (i) entering a space after selection of a data string;
  (ii) limitation of displayed data strings to those having a total number of characters greater than a number of key presses;
  (iii) expanding typed or selected mnemonics, abbreviations or acronyms into their corresponding full data strings;
  (iv) performing two-way translations between data strings and user-configurable dictionary definitions or descriptions;
  (v) enabling the selection of a secondary key-value or key-function by means of double-pressing a data input key;
  (vi) enabling the selection from a list of different data strings stored within the data storage by means of double-pressing a data input key, said data string having an initial letter or letters corresponding to the key-value of that key; and (vii) enabling the right-to-left and/or left-to-right deletion of n characters, words, sentences or paragraphs by means of a single key press.

8. An interface system according to claim 7, wherein the secondary key-value or key-function obtained by double pressing a data input key is identical with the SHIFT value of that key.

9. An interface system according to claim 7, wherein each double-press must be completed within a predetermined period of time in order to select the secondary key-value or key-function.

10. An interface system according to claim 7, wherein the secondary key-value corresponds to the secondary indicia of a composite key having multi-character indicia.

11. An interface system according to claim 7, wherein the secondary key-value corresponds to a capitalized conventional key-value.

12. An interface system according to claim 7, wherein there is provided at least one function key operable in combination with a composite key and adapted to access the secondary key-value or key-function.

13. An interface system according to claim 7, wherein the data strings selectable from the list are actively prioritized within the data storage according to user-definable quantitative and/or qualitative information.

14. An interface system according to claim 7, wherein the ability to select a different data string from the list is disabled upon pressing of the SPACE key, or another non-character key.

15. An interface system according to claim 6, wherein the configuration means also allows a user to selectively adjust the prioritization parameters according to the desired qualitative and/or quantitative characteristics of the data stored within the one or more data dictionaries.

16. An interface system according to claim 15, wherein the qualitative and/or quantitative information comprises statistical and/or probability information relating to each data string stored within the data storage.

17. An interface system according to claim 15, wherein all qualitative and quantitative information is dynamically updated in real-time.

18. An interface system according to claim 15, wherein the one or more data dictionaries comprises two or more data dictionaries, wherein the data processor is configured to maintain lookup chains between the two or more data dictionaries such that a given data string in a first data dictionary is mapped to at least one data string in one or more other data dictionaries of the two or more data dictionaries for selection by the user.

19. An interface system according to claim 18, wherein where a given data string in the first data dictionary is mapped to a plurality of data strings in the one or more other data dictionaries, said data strings are prioritized via the configuration means for ease of selection by the user.

20. An interface system according to claim 18, wherein the mapping is performed dynamically.

21. An interface system according to claim 20, wherein the data processor is configured to selectively bypass or reset the dynamically updated qualitative and quantitative information.

22. An interface system according to claim 15, wherein the data processor is configured to maintain associative links between any given data string and up to n other data strings, and based on the maintained associative links, cause the data display to display or project the most relevant longer data string comprised of n+1 data strings for selection by the user.

23. An interface system according to claim 22, wherein selection of a longer data string induces a repetition of associative linking such that a further one or more relevant longer data strings are displayed for selection by the user.

24. An interface system according to claim 22, wherein a plurality of the most relevant longer data strings are made available or displayed in a prioritized list for selection by the user.

25. An interface system according to claim 24, wherein the relevance/prioritization of the, or each, longer data string is determined according to statistical and/or probability information stored within the one or more data dictionaries.

26. An interface system according to claim 25, wherein statistical information relates to the historical inputting and/or selection of data strings.

27. An interface system according to claim 26, wherein the historical inputting and/or selection information can be one or more of the following: (i) frequency of inputting; (ii) frequency of selection (iii) character length; (iv) lexical pattern density; and (v) chronological weighting.

28. An interface system according to claim 25, wherein probability information further comprises occurrence ratios of two or more data strings within a longer data string.

29. An interface system according to claim 24, wherein the data display is configured to display the plurality of the most relevant longer data strings for subsequent selection by the user in list format in descending order of priority.

30. An interface system according to claim 5, wherein the one or more data dictionaries comprises two or more data dictionaries stored among two or more personal computers, and wherein synchronization of the two or more data dictionaries between the two or more personal computers is performed by means of wired or wireless connectivity.

31. An interface system according to claim 5, wherein the one or more data dictionaries comprises two or more data dictionaries stored among two or more personal computers, and wherein synchronization of the two or more data dictionaries between the two or more personal computers is performed by means of downloading from a common database.

32. An interface system according to claim 5, wherein the one or more data dictionaries are manually populated.

33. An interface system according to claim 5, wherein the population of the one or more data dictionaries with data strings and its corresponding qualitative and/or quantitative information is accelerated by uploading onto the data storage the data strings from a personal computer or a remotely connected device.

34. An interface system according to claim 5, wherein the one or more data dictionaries are populated by optically scanning external data strings by means of a scanning apparatus.

35. An interface system according to claim 1, wherein the data processor is configured to derive a data string relative to a currently input letter, letters, and/or text pattern, and wherein the letter, letters and/or text patterns are of entries selected from the one or more data dictionaries.

* * * * *